US007957992B2

(12) United States Patent
Gilbert et al.

(10) Patent No.: US 7,957,992 B2
(45) Date of Patent: Jun. 7, 2011

(54) MODIFICATION OF A DIAGRAM FOR BUSINESS PROCESS OPTIMIZATION

(75) Inventors: Phil G. Gilbert, Austin, TX (US); Damion A. Heredia, Austin, TX (US); Michael N. Nonemacher, Austin, TX (US); Morten H. Moeller, Austin, TX (US); Graham C. Sanderson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 11/566,065

(22) Filed: Dec. 1, 2006

(65) Prior Publication Data

US 2008/0120121 A1 May 22, 2008

Related U.S. Application Data

(60) Provisional application No. 60/866,737, filed on Nov. 21, 2006.

(51) Int. Cl.
*G06F 9/46* (2006.01)
(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 5,890,133 A | 3/1999 | Ernst | |
| 6,058,413 A | 5/2000 | Flores et al. | |
| 6,272,672 B1 | 8/2001 | Conway | |
| 6,278,977 B1 | 8/2001 | Agrawal et al. | |
| 6,437,805 B1 | 8/2002 | Sojoodi et al. | |
| 6,763,353 B2 | 7/2004 | Li | |
| 6,817,008 B2 | 11/2004 | Ledford et al. | |
| 6,892,192 B1 | 5/2005 | Geddes et al. | |
| 6,895,384 B1 | 5/2005 | Dalal | |
| 6,920,474 B2 | 7/2005 | Walsh et al. | |
| 7,076,474 B2 | 7/2006 | Jin | |
| 7,120,896 B2 | 10/2006 | Budhiraja et al. | |
| 7,184,967 B1 | 2/2007 | Mital | |
| 7,222,302 B2 | 5/2007 | Hauser et al. | |
| 7,246,144 B2 | 7/2007 | Walsh et al. | |
| 7,254,594 B2 | 8/2007 | Allen et al. | |
| 7,340,475 B2 | 3/2008 | Chowdhary et al. | |
| 7,350,188 B2 | 3/2008 | Schulz | |
| 7,356,532 B2 | 4/2008 | Wiser et al. | |

(Continued)

OTHER PUBLICATIONS

Mendling et al "EPC markup language (EPML): an XML-based interchange format for event-driven process chains (EPC)", Oct. 2005, Department of Information Systems;pp. 245-263.*

(Continued)

*Primary Examiner* — Romain Jeanty
(74) *Attorney, Agent, or Firm* — Stephen J. Walder, Jr.; Jeffrey S. LaBaw

(57) ABSTRACT

System and method for displaying information regarding a business process. A diagram of the business process may be displayed on a display. The diagram may include a plurality of icons connected by lines, where each of the icons represents a respective step in the business process and the lines indicate flow paths between the steps. Historical data regarding the business process may be received. The historical data may be analyzed to determine information regarding steps and/or flow paths in the business process. Graphical indications associated with one or more icons and/or lines in the diagram may be displayed. The graphical indications may visually indicate characteristics of corresponding steps and/or flow paths in the business process. For example, the graphical indications may indicate lengths of time, costs, or other characteristics associated with various ones of the steps. The graphical indications may indicate path traversals of ones of the flow paths.

17 Claims, 55 Drawing Sheets

U.S. PATENT DOCUMENTS

| | | | |
|---|---|---|---|
| 2005/0086092 A1* | 4/2005 | Kowalski et al. | 705/8 |
| 2005/0251113 A1 | 11/2005 | Kienzle | |
| 2005/0251793 A1 | 11/2005 | Moffat et al. | |
| 2005/0273352 A1 | 12/2005 | Moffat et al. | |
| 2006/0095413 A1 | 5/2006 | Moffat et al. | |
| 2007/0094326 A1* | 4/2007 | Gupta et al. | 709/203 |
| 2007/0220046 A1* | 9/2007 | Moosmann et al. | 707/104.1 |
| 2007/0266394 A1* | 11/2007 | Odent et al. | 719/316 |

OTHER PUBLICATIONS

Toussaint, Alex, "Working with the BEA AquaLogic BPM Suite", dev2dev, http://dev2dev.bea.com/pub/a/2006/09/aqualogic-bpm.html, Aug. 31, 2006, 13 pages.

"Metastorm Expands Business Project Management Suite: Global BPM Leader Releases Version 7 of Metastorm BPM Software", Press Release, Metastorm, Inc., Jul. 11, 2006, 3 pages.

"Metastorm Expands Business Project Management Platform with Release of e-Work 6.5 Executive Dashboards, Advanced Business Rules & BPEL Support Solidify Company's Position as Leading Enterprise BPM Solution", Press Release, Metastorm, Inc., Aug. 16, 2004, 3 pages.

Kemsley, Sandy, "Emerging Trends in BPM: What Happened in 2006, and What's ahead in 2007", Newsletter, Savvion, http://www.savvion.com/newsletter/dec_2006.html, Dec. 2006.

* cited by examiner

MODIFICATION OF A DIAGRAM FOR BUSINESS PROCESS OPTIMIZATION

PRIORITY

This application claims benefit of priority of U.S. provisional application Ser. No. 60/866,737 titled "Business Process Diagram Visualization Using Heat Maps" filed Nov. 21, 2006, whose inventors were Phil G. Gilbert, Damion A. Heredia, Michael N. Nonemacher, Morten H. Moeller, Graham C. Sanderson, Adam B. Cotner, Petko Chobantonov, Alexander J. Moffat, and Matthew A. Howitt, which is hereby incorporated by reference in its entirety as though fully and completely set forth herein.

FIELD OF THE INVENTION

The invention relates generally to a business process management system and, more specifically, to visualizing characteristics of a business process represented by a process diagram.

DESCRIPTION OF THE RELATED ART

Management teams face an increasingly complex and challenging business environment. For example, a typical business may consist of multiple locations, business streams and informational structures. In addition, a business often must handle fluidity in market conditions and changes in accounting requirements. Business performance may involve such aspects as supply chain management, financial compliance, customer service, plant maintenance and other processes. Each of these performance aspects can benefit from operational improvement, or process optimization.

Business process management (BPM) systems have become essential to the management of complex businesses in today's economy. However, current BPM tools do not provide adequate visualization capabilities to enable the user to fully understand the process being performed. Therefore, improved visualization capabilities are needed in BPM software.

SUMMARY OF THE INVENTION

Various embodiments are disclosed of a system and method for displaying information regarding a business process. The information may be displayed in a diagram of the business process.

The method may comprise storing historical data regarding the business process. The historical data may be collected during prior executions of the diagram, i.e., during prior executions of the business process. Various methods may be utilized to collect appropriate data during these prior executions.

A diagram of the business process may be displayed on a display. The diagram comprises a plurality of icons connected by lines, wherein each of the icons represents a respective step in the business process, and wherein the lines indicate flow paths between the steps in the business process. The diagram may be executable to implement the business process.

The user may provide input selecting characteristics of the business process that are desired to be analyzed. For example, a graphical user interface (GUI) may be displayed on the display, and the user may provide input to the GUI. For example, the user may select various scenarios, such as time analysis, path analysis or count analysis.

The method may analyze the historical data to determine information (referred to as "first" information) regarding one or more steps and/or flow paths in the business process. The analysis may comprise averaging and/or totaling various values from the historical data. The analysis may also comprise comparing the characteristics of corresponding steps and/or flow paths in the business process with a threshold value.

The method may then display graphical indications (also referred to as "heat maps") associated with a first subset of icons and/or a first subset of lines in the diagram in response to the analysis. The graphical indications visually indicate characteristics of corresponding steps and/or flow paths in the business process, and are useable to analyze the business process. With respect to icons in the diagram representing steps, the graphical indications may visually indicate relative lengths of time and/or business characteristics of respective ones of the steps. With respect to lines in the diagram representing flow paths, the graphical indications may visually indicate relative counts and/or states of processes for a current time.

The graphical indications may comprise color enhancements, wherein a degree of color enhancement indicates a degree of the characteristics. The color enhancement may comprise a first color, such as red, and a degree of shading (e.g., a degree of hue) of the first color may indicate the degree of the characteristics. Alternatively, an amount of the first color indicates the degree of the characteristics. The graphical indications may take various forms, e.g., for each respective icon and/or line, the color enhancements may be displayed around a perimeter of the respective icon and/or line, may be displayed within the respective icon and/or line, etc.

Embodiments of the invention may also comprise comparing different data sets and displaying graphical indications in the diagram that indicate the differences. For example, the method may compare the historical data and other second data to determine differences in characteristics of steps and/or flow paths in the business process between the historical data and the second data. The second data may be simulated data or other historical data. Also, where the diagram has been modified to represent a modified business process, the second data may relate to the modified business process. The method may then display graphical indications in the diagram associated with icons and/or lines in the diagram in response to the comparison. The graphical indications visually indicate the differences in characteristics of the steps and/or flow paths in the business process between the two sets of data, and are useable to analyze the business process.

In another embodiment, the user may modify the diagram to modify the business process, and operation of the modified business process may be simulated to generate second information. The first and second information may then be compared to determine differences in characteristics of steps and/or flow paths in the first business process and the modified business process. Graphical indications may then be displayed on the display indicating these differences.

BRIEF DESCRIPTION OF THE DRAWINGS

A better understanding of the present invention can be obtained when the following detailed description of the preferred embodiment is considered in conjunction with the following drawings, in which:

FIGS. 4A-4F, 5A-5H, 6A-6C, and 7A-7C are exemplary screen shots illustrating various embodiments of the method illustrated by FIG. 3;

Figure 1:
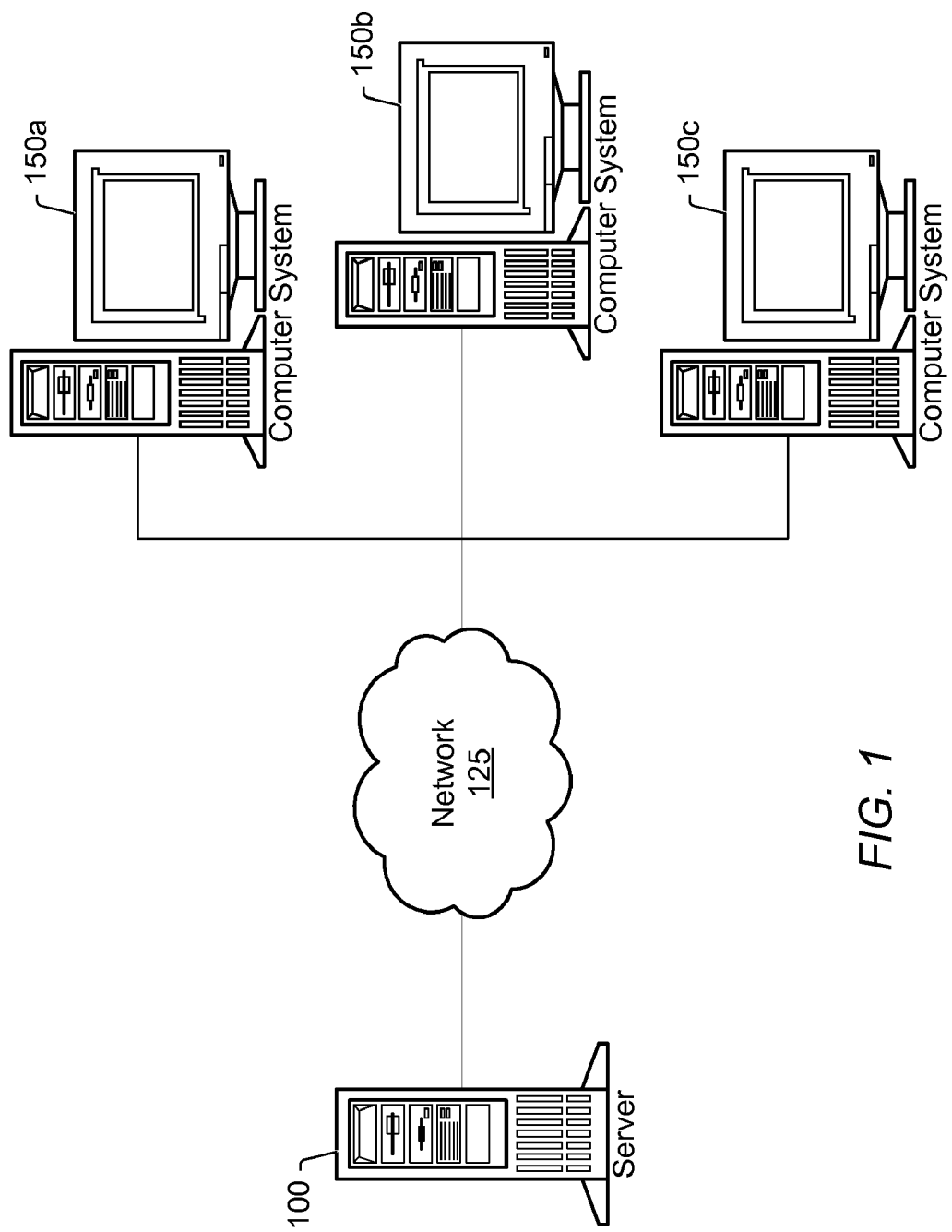
FIG. 1 illustrates a system operable to execute a business process according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Program or Software Program—the terms "program" or "software program" are intended to have the full breadth of its ordinary meaning, and include any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements. A GUI may comprise a single window having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1—Exemplary Server/Client System

FIG. 1 illustrates an exemplary server/client server system operable to implement the methods described herein. More specifically, as shown, server system 100 may couple to computer systems (e.g., clients) 150a, 150b, and 150c (referred to as computer systems 150) via network 125. As shown, the computer systems 150a, 150b, and 150c and the server system 100 may include display devices, e.g., for displaying various graphical user interfaces (GUIs) such as those described herein. More specifically, the display devices may be operable to display GUIs of programs or instances executing on the server 100. The GUIs may comprise any of various types of graphical user interfaces, e.g., depending on the computing platform.

In one embodiment, the server 100 (sometimes referred to as "performance server") may execute business process software ("business process diagram development environment software" or "development software") as described herein, and the server 100 may present various GUI displays to various ones of the client computers 150. In this embodiment, the various client systems 150 may simply execute web browser software. Alternatively, in another embodiment, the client computers may execute business process software as described herein, e.g., in a stand-alone non-web based mode.

The server 100 and/or the computer systems 150 may include at least one memory medium on which one or more computer programs or software components according to one embodiment of the present invention may be stored. For example, the memory medium may store one or more programs which are executable to perform the methods described herein. Additionally, the memory medium may store the development software used to create and/or execute business process management (BPM) diagrams. Alternatively (or additionally) the memory medium may store various other types of software for interacting with the diagram. The memory medium may also store operating system software, as well as other software for operation of the computer system. Various embodiments further include receiving or storing instructions and/or data implemented in accordance with the foregoing description upon a carrier medium.

The server 100 may comprise one physical server computer that implements one or more logical servers. Alternatively, the server 100 may comprise two more different physical servers that may be connected together, e.g., over a LAN or WAN.

The network 125 can be any of various types, including a LAN (local area network); a WAN (wide area network), such as the Internet; or an Intranet, among others. The computer systems 150 and the server 100 may execute programs in a distributed fashion. For example, one or more of the computer systems 150 may execute a first portion of a program (e.g., a client program, applet, or other executable portion) and server 100 may execute a second portion of the program (e.g., a server program which hosts the applet or executable portion). As another example, one or more of the computer systems 150 may display a GUI of a program (e.g., in a browser) which may be mostly executing on the server 100.

Figure 2:
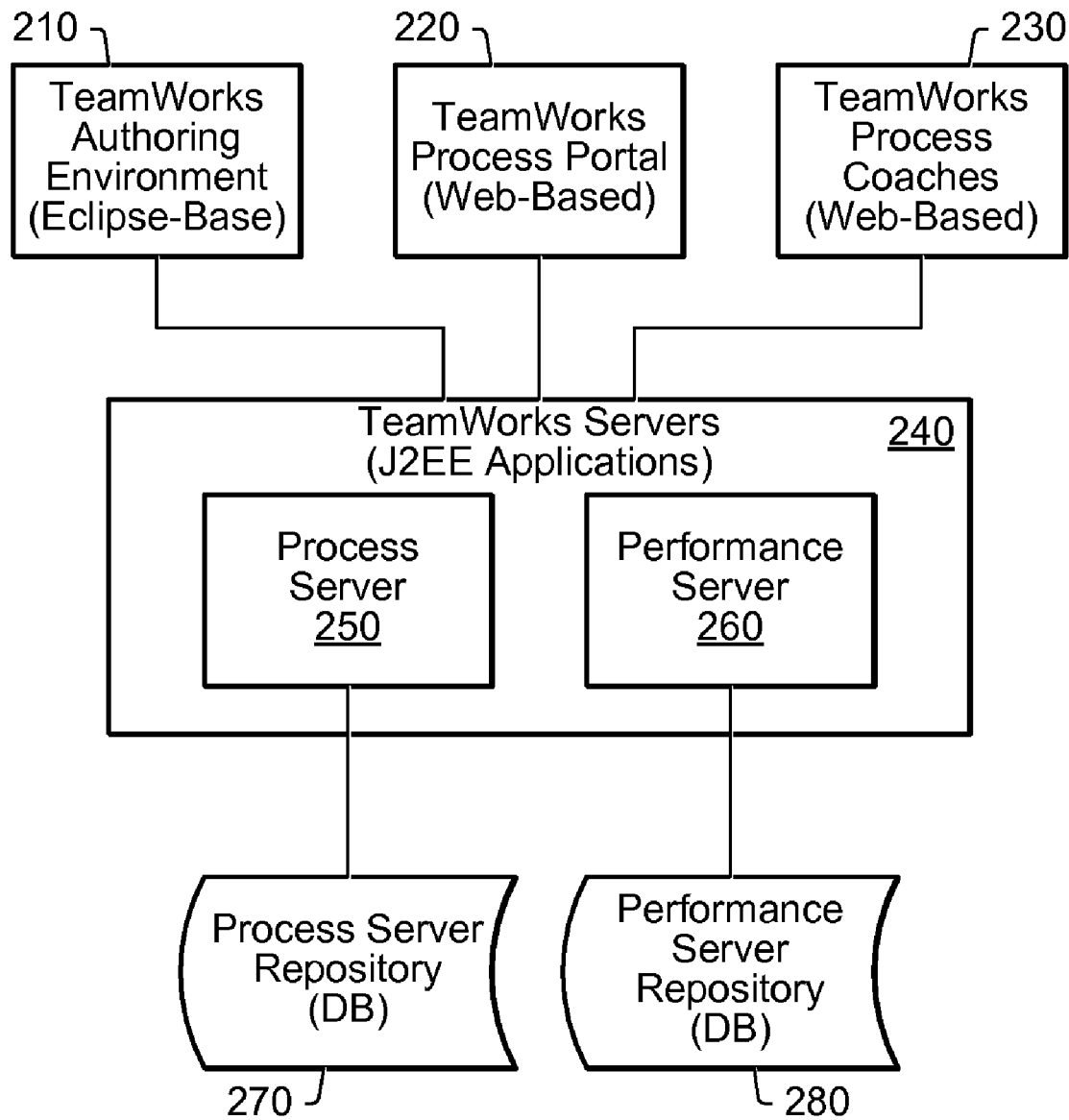
FIG. 2 is a block diagram illustrating a software architecture of a program according to an embodiment of the present invention.

FIG. 2—Software Architecture

FIG. 2 illustrates an exemplary software architecture that may implement various embodiments of the present invention. As shown, the architecture may include various user interfaces, e.g., authoring environment 210, process portal 220, and process coaches 230. The user interfaces may be executed on one or more of the server 100 and the computer systems 150. As also shown, the architecture may include two servers (240), e.g., process server 250, and performance server 260, and two associated databases, e.g., process server repository (DB) 270 and performance server repository (DB) 280. One or more of these servers/databases may be included in the server 100. In other words, the server 100 may include any combination of the servers and/or databases shown in FIG. 2. Alternatively, one or more of the servers and/or databases may be included in a computer system other than the server 100, but may be accessible by the server 100 and/or the computer systems 150, e.g., via the network 150. Thus, FIG. 2 illustrates an exemplary software architecture for implementing some embodiments of the invention.

Business Process Diagram

Various embodiments of the systems and methods described herein include diagrams which relate to a business process. The following sections describe embodiments of diagrams which may be used in conjunction with the methods described herein.

The diagram of the business process (e.g., a business process management diagram) includes a plurality of icons, at least a subset of which are connected by lines (or line icons).

Each of the icons may represent a respective step in the business process, and each of the lines may indicate flow paths between steps in the business process. Thus, the diagram may visually represent or model the business process. The diagram may be referred to as a business process diagram, a BPM diagram, a process diagram, or simply as a "diagram", as desired.

Figure 4A:
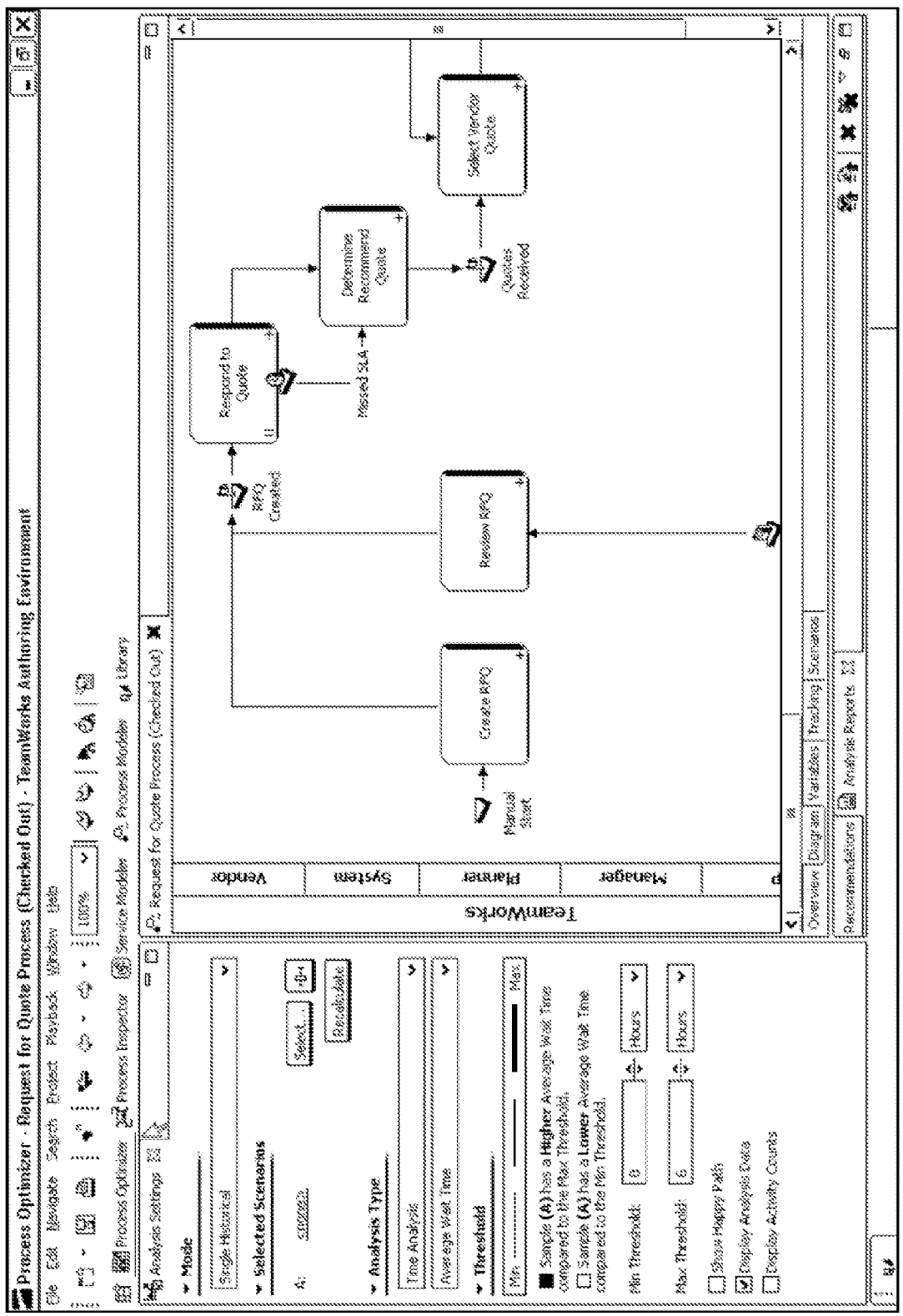

In some embodiments, the diagram may include a plurality of lanes which correspond to different entities performing the various steps. The lanes may comprise horizontal sections within the diagram, or vertical lanes in a "top to bottom" diagram. FIG. 4A illustrates a diagram having lanes, e.g., the Vendor, System, Planner, and Manager horizontal lanes. Thus, the icons in the diagram may be placed in different lanes corresponding to different performers. For example, as noted above, the diagram may have a "manager" lane which means that steps displayed in the "manager" lane (displayed as icons) may be performed by the manager. Thus, the diagram may include lanes which indicate how or by what entity various steps in the process are performed.

In some embodiments, the diagram may be an executable diagram, i.e., the diagram may be executable to perform the business process that the diagram represents. More specifically, the memory medium may store various data structures and/or program instructions that specify the diagram that is displayed on the display. These data structures and/or program instructions may be interpretable by run-time software to implement the business process visually represented by the diagram. For example, in one embodiment, the user may be able to invoke execution of the diagram, e.g., by pressing a "run" or "execute" button (among others). This invocation causes the run-time software to execute, whereby the run-time software interprets the data structures and/or program instructions to perform the business process, wherein the business process is performed as represented by the diagram. Thus, the diagram visually indicates or specifies the business process being performed. Thus, upon invocation or execution the computer may perform the steps and paths visually indicated by the diagram. In another embodiment, the data structures and/or program instructions that specify the diagram may be compiled into an executable program for execution. References in the present specification to "the diagram executing a step" refer to the execution methods described above, wherein data structures and/or program instructions are interpreted (or compiled and executed) to implement the business process shown in the diagram.

In one embodiment, the diagram may be displayed in response to user input, e.g., on a display of one or more of the server 100 and/or the computer systems 150 (among others). Additionally, the diagram may be displayed in a process diagram development environment. For example, the user may open an already existing diagram to be displayed on the display of a computer system. Alternatively, or additionally, the user may manually assemble the diagram using various palettes or tools. Also, the diagram may be assembled at least in part using various diagram creation wizards. In one embodiment, the diagram may be modified, created, and/or executed within the business process diagram development environment. The business process development environment may be executable by one or more of the computer systems described above among others. More specifically, the development environment may be executed on the server 100 and various sub-processes (e.g., child processes, GUIs, applets, etc.) may be executed on one or more of the computer systems 150.

In one embodiment, to create or modify the diagram, the user may "drop" icons from a palette (e.g., included in the business process development environment) which may represent steps of the process. In other words the user may click on an object in the palette (e.g., using a mouse), drag the object over to a particular location in the diagram, and release the object onto the diagram (e.g., by releasing the mouse click). The development environment may determine the type of step that is selected by the user and automatically assign the particular icon to one or more of the lanes in the diagram as appropriate. Thus, in some embodiments, the development environment may intelligently assist the user during creation or modification of the diagram. In some embodiments, the palette may include a plurality of different icons for a variety of different steps. More specifically, the palette may include template icons, e.g., which implement various common steps (e.g., provided by the diagram development software) or user-defined steps (e.g., previously created or modified steps saved by the user).

While placing icons representing steps of the process in the diagram, the user may also connect those icons using a line or connecting tool. For example, the user may select a connecting tool and "draw" a line between an output of one icon and an input of another.

Note that the above described tools and palettes are exemplary only, and that other tools and palettes (among other graphical interfaces) are envisioned. For example, in one embodiment, the user may not drag objects from palettes and/or use tools to connect the objects, but may instead draw the objects on the diagram, interact with the diagram (or another textual interface that corresponds to the diagram) using a keyboard, among other methods. Thus, the user may assemble objects in the diagram via a variety of methods.

Additionally, the user may be able to assign actions associated with the steps of the process (e.g., represented by the icons in the diagram) and/or with the flow paths (e.g., represented by the lines in the diagram). For example, the user may associate one or more processes, GUIs, and/or programs (e.g., which implement the steps of the process) with one or more of the icons and/or lines in the diagram. Thus, the associated processes may perform a portion of the business process visually indicated by the diagram, e.g., during execution of the diagram. In some embodiments, the processes/GUI may include an applet that may be presented to a client machine over a wide area network such as, for example, the Internet. Thus, during execution, the processes/GUI associated with each of the icons (steps) and/or lines (flow paths) in the diagram may be invoked upon reaching each respective step or path. Thus, in some embodiments, the diagram may be assembled by the user and displayed on the display of a computer system (e.g., a local or remote computer system such as those described above among others).

As one example, the diagram may describe or visually indicate a business process for processing purchase orders. One step in the process may include generation of a purchase order; thus once the diagram is executed, the diagram (or a program executed by the diagram) may generate the purchase order. Alternatively, the diagram may invoke a GUI on a computer where a user may manually generate a purchase order as desired. Thus, in one embodiment, the diagram may be displayed and/or executed on a first computer, e.g., the server 100 described above, and may be operable to invoke other processes, programs, and/or GUIs on other computers, e.g., client computer systems 150.

Upon completion of generation of the purchase order, the diagram may execute another step in the process. For example, the diagram may include a first icon representing generation of the purchase order which may be connected by a line (e.g., a flow path) to another icon which may represent a step for populating data in the purchase order. Thus, during execution of the diagram, after completion of a step, the diagram may execute a next step in the process as indicated by the diagram. Correspondingly, upon completion of generation of the purchase order, the purchase order may be populated with data by executing the process or step indicated in the diagram (i.e., the one connected to the generation step). In some embodiments, the populating icon/step may have an associated process which performs a plurality of actions to populate the generated purchase order. For example, during execution of the diagram, upon reaching the populating icon, the associated process may retrieve various information from a database on a computer system and automatically populate the purchase order, e.g., as specified by the user during creation of the diagram.

After generating the purchase order and/or populating the data, a manager approval step may be executed as indicated in the diagram. More specifically, the diagram may include a manager approval icon which may be connected via a line (e.g., flow path) to the icon representing purchase order generation and/or data population of the purchase order. Thus, control may pass from the purchase order generation step to data population of the purchase order step to a manager approval step. During execution of the diagram, upon reaching the icon representing the manager approval step, a process, GUI, and/or program (among others) may be executed which operates to request approval from the manager. In some embodiments, this may involve generating and sending an email to a manager in the company. Alternatively, or additionally a GUI (e.g., an applet, such as for example, a Java™ applet, among others) may be remotely executed on the manager's computer system (e.g., one of the computer systems 150). Thus, upon reaching the manager approval icon during execution of the diagram, various processes may be invoked to get the manager's approval. Note that during execution, highlighting (or other indications) of the icons or lines in the diagram may be used to indicate the current state of the diagram. Thus, during execution, the icons and paths may be highlighted to indicate flow of control through the diagram.

In some embodiments, more than one step may be connected to other steps and conditions may be imposed on the paths between the steps, e.g., as specified by the user. For example, where a step connects to two other steps, control or execution may flow according to conditions of the flow lines or the flow objects (e.g., icons/steps) in the diagram. For example, in the examples described above, the diagram may have an icon representing generation of a purchase order which may connect to icons representing manager approval and purchase order data population. Thus, as one example, when the purchase order is generated, a condition may be associated with the icons or paths in the diagram such that execution flows from purchase order generation to data population if the purchase order is incomplete or needs more data. Alternatively, execution may flow from purchase order generation to manager approval if the purchase order is complete or does not require further data. Thus, execution of the diagram may execute according to conditions, e.g., specified by the user during creation/modification of the diagram. Further exemplary diagrams and processes are presented and described below.

Figure 3:
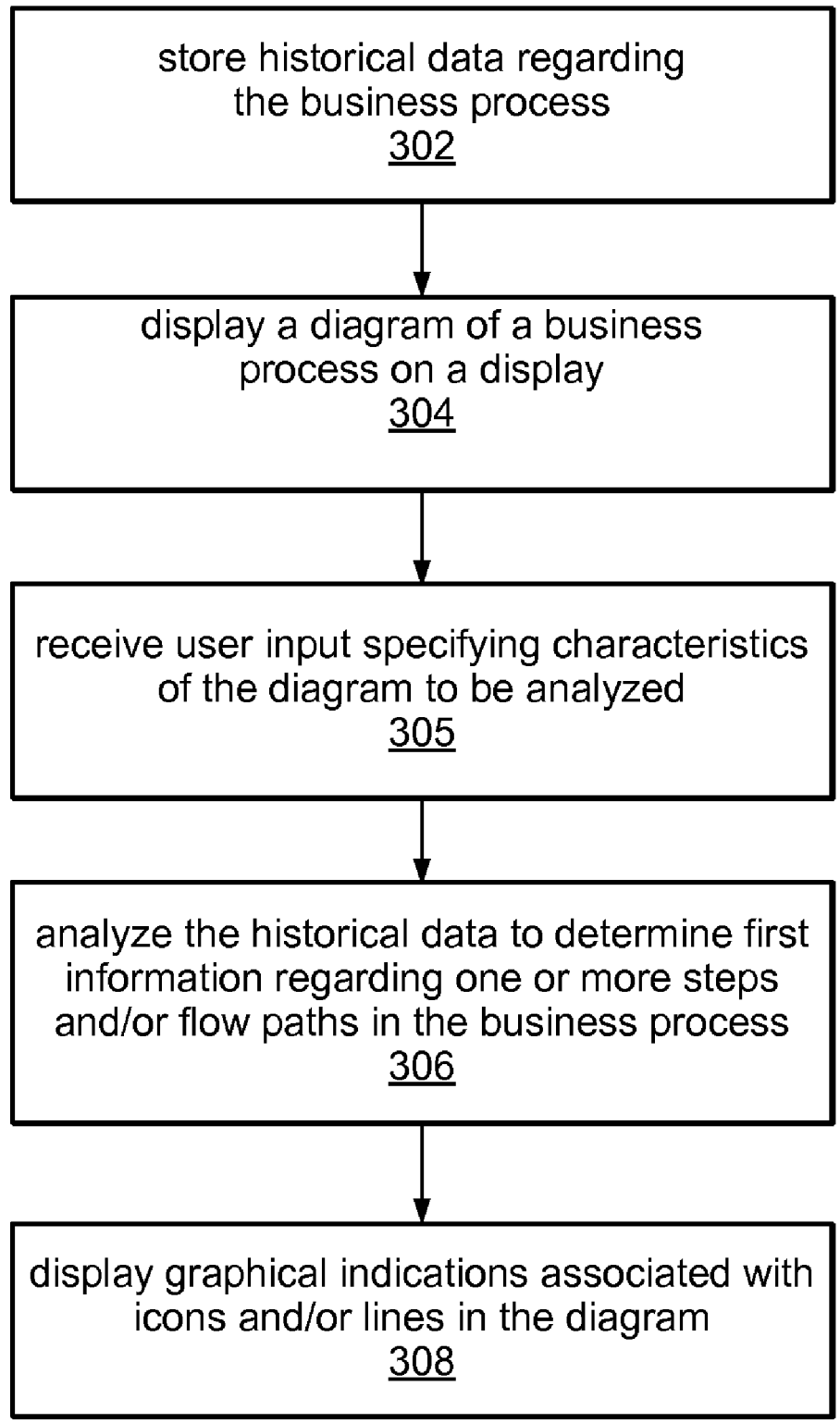
FIG. 3 is a flow chart illustrating one embodiment of a method for displaying information regarding a business process.

FIG. 3—Method for Displaying Information Regarding a Business Process

FIG. 3 illustrates a method for displaying information regarding a business process. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, historical data regarding a business process may be stored and/or received. In some embodiments, the historical data may be stored in a database and may represent executions of the process in a time period or range. The historical data may be stored during execution of a business process diagram (e.g., which represents the business process) over this time. In some embodiments, storing the information may involve determining path traversal information of the process. For example, for an individual step in the process, storing the information may include storing pertinent waiting time information (how long this step has waits before execution), execution time information (how much time this step takes to execute), business cost data (monetary or otherwise), previous step information (what the previous step was), future step information (the next step for each of the processes), and/or other information (further characteristics and analyses are described below). In processes where a step can be reached via a plurality of paths, storing the information may include inferring the previous steps from known information. This calculation or inference may then be stored in as historical data.

More specifically, process data (such as that described above) may be captured in a variety of places. In one embodiment, the data may be captured when "activity created" events occur. An "activity created" event may include the ID of the particular process instance (e.g., where each process instance represents an individual process executing on the diagram), the ID of the activity, the ID of the activity instance, and any business data that is associated with the diagram. Additionally, the date and time that the activity was created may be stored. In some embodiments (e.g., multi-server environments), it may be necessary to store a sequence of events associated with the process instance (e.g., when the clocks of the servers are not matched properly). In other words, it may be necessary to store an auto-incremented number ("sequence ID") where time stamps do not provide an adequate indication of order. The created activity is associated with some resource: a system, a specific user, or a group; correspondingly, this information may also be stored.

When a resource is available and actually starts executing the activity, the method may track an "activity started" event. Similar to the "activity created" event, this event includes the process instance ID, the activity ID, the activity instance ID, any associated business data, and a timestamp and sequence ID, but also tracks the ID of the specific resource that is executing the activity. (This may be different than the ID of the resource that was originally assigned, e.g., if it was assigned to any of a group of people, and one specific person has started executing the activity.)

When the activity is complete, storing the historical data may store an "activity completed" event. This event includes the same pieces of data as the "activity created" event: process instance ID, activity ID, activity instance ID, business data, timestamp, and sequence ID. Additionally, when a path is traversed in the process, storing the historical data may store a "flow traversal" event, which may include the process instance ID, the ID of the flow path, and a timestamp (and possibly a sequence ID), among others.

Storing the historical data may include calculating some meta data. For example, the wait time of a process step may be determined by calculating the length of time between the "activity created" event and the "activity started" event. The execution time may be determined by calculating the length of time between the "activity started" event and the "activity completed" event. Thus, storing the historical data may involve storing activity information and calculating information from that stored information. However, it should be noted that the above descriptions are exemplary only, and other methods for storing the historical data may be used. For example, the historical data may be retrieved from sources (e.g., databases) associated with the process. For example, the historical data may be retrieved by mining information sources of a company that implements/desires to analyze and/or optimize the process represented by the diagram. However, in primary embodiments, the data may have been collected over time using the executable diagram representing the business process.

As indicated above, the historical data may include information regarding lengths of time (e.g., associated with each of the steps in the process), path traversals (e.g., the specific path that was taken throughout the process), values (count information) of attributes of the steps/paths taken during the process (e.g., waiting/execution activities, number of times path was taken, etc.), business data (e.g., costs associated with each step), and/or other information. For example, the historical data may include the amount of time spent waiting for execution and the amount of time executing for each step. More specifically, following the manager approval step described above, the historical information may include the wait time (how long it took for the manager to get to the purchase order to be approved) and the execution time (how long it took the manager to approve or reject the purchase order). Additionally, the historical data may store the monetary and/or human resources associated with various steps/paths in the process. Note that the above-described information is exemplary only, and other attributes/characteristics may be stored. In other words, the historical data may include information regarding any information that may be usable to analyze and/or optimize the process modeled by the diagram. Note further that the descriptions herein regarding historical data may apply equally well to other data regarding the business process (e.g., simulated data).

In 304, the diagram of the business process (e.g., a business process) may be displayed, e.g., on one or more of the computer systems 150 or the server system 100 described above (among others), e.g., in response to user input. As described above, the diagram may include a plurality of icons (e.g., representing steps of the process) that are interconnected by lines (e.g., representing flow paths of the process). As also described above, the diagram may be executable; in other words, the diagram may operate to implement the process visually indicated by the diagram during execution of the diagram. In some embodiments, the user may invoke execution of the diagram by pressing an "execute" or "play" button in the process development environment that may display the diagram. During execution, processes, GUIs, and/or applets (among others) may be invoked as execution flows through each of the icons and lines in the diagram. In other words, upon reaching a specific icon or line during execution of the diagram, processes associated with the icon or line may be executed, e.g., as designed by the user. In some embodiments, these processes may be executed locally or remotely (e.g., on a computer coupled through a network such as the network 125 described above, among others). The diagram may include lanes which indicate performers of the steps of the process. For example, the diagram may include a lane for a computer system such as, for example, the server 100. Correspondingly, the server 100 may perform the steps associated with icons placed in this lane during execution of the diagram.

In 305, user input may be received that specifies characteristics of the historical data that he/she desires to be visually represented on the diagram. For example, the user may select a category of data to retrieve, a time period for the data, and/or various other filters for the retrieved data (e.g., orders more than 40,000 dollars, orders that took longer than one week to process, orders for particular clients, etc.). In one embodiment, the user may select this information using a GUI and a query may be automatically generated in response to the user selections. Subsequently, the query may executed to retrieve historical data (e.g., from a database) according to the constraints specified by the user. The screen shots of FIGS. 4A-F, 5A-H, 6A-C, and 7A-7C illustrate specific examples of this process.

In 306, the historical data may be analyzed to determine information regarding one or more steps and/or flow paths in the business process. For example, the user may select a "recalculate" button on the display, which causes the analysis to be performed. In some embodiments, analyzing the historical data may involve retrieving information, e.g., a subset of the historical data. Additionally, the historical data may be analyzed based on the characteristics specified by the user in 305. For example, where the user input in 305 specifies "average wait time" as the desired characteristic to be analyzed, the analysis may include averaging each of the lengths of times associated with, for example, wait time for each of the steps in the process. Depending on the user input in 305, the analysis may average (or median, mode, total, etc.) other values such as the business cost associated with each step, number of times a particular path was traversed, and/or other values. In some embodiments, the analysis may include more complex calculations, e.g., by inferring information based on the historical data. The analysis may also include calculating time intervals of data. Thus, the historical data may be analyzed to determine information regarding characteristics, behaviors, and/or performance (among others) of steps and/or flow paths of the business process represented by the diagram.

In 308, graphical indications associated with icons and/or lines in the diagram may be displayed, e.g., on the display of one or more of the computer systems described above, among others. The graphical indications may visually indicate characteristics (and preferably a degree of the characteristics) of corresponding steps and/or flow paths in the business process and may be useable to analyze the business process. The characteristics may have been chosen by the user in 305 above. Alternatively, the characteristics may be automatically chosen and visually indicated without prior user input specifying the characteristics. In some embodiments, as noted above, the graphical indications may indicate relative degree of the characteristics. For example, the graphical indications may be displayed as a "heat map" on the diagram. A heat map may visually indicate which of the steps and/or paths in the process are most important (or least efficient), e.g., according to the characteristics being visually indicated. In some embodiments, the heat map may correspond to the color enhancements described in more detail below.

In one embodiment, the graphical indications may include color enhancements for various ones of the flow lines and/or the icons included in the diagram. The degree of color enhancement may indicate the degree of the characteristics. For example, the color enhancements may include a first color (e.g., red), and the degree of shading of the first color (e.g., degree of shading of the hue of the first color) may indicate the degree of the characteristics. In one embodiment, the amount of the first color (e.g., the number of pixels of the color or "thickness" of the color) may indicate the degree of the characteristics. The color enhancements may be displayed around a perimeter of icons and/or lines in the diagram, within icons/lines of the diagram, or other suitable manners that visually indicate the degree of the characteristics.

In the preferred embodiment, the color enhancements may include a first color, such as, for example, red, and the graphical indications may include degrees of shading around the perimeter of the icons and/or lines in the diagram. Thus, in one embodiment, the amount of red shading around the icon and/or line may indicate the degree of the characteristic(s) under scrutiny.

Note that the graphical indications described above are exemplary only. For example, in one embodiment, the graphical indications may include animations on the screen, e.g., where visually indicated icons and/or lines are highlighted using "marching ants" (e.g., where dotted lines move around the object being highlighted). In another embodiment, the icons and/or lines themselves may be re-sized (either in 1 or 2 dimensions) to indicate the relative characteristics, e.g., icons with a lesser degree of the characteristic (e.g., smaller average wait time) may be reduced in size on the diagram, and icons with a greater degree of the characteristic (e.g., larger average wait time) may be increased in size on the diagram. As another example, the borders of the icons may be enlarged or reduced to indicate the degree of the characteristic. As yet another example, "degree icons" may be displayed within each of the icons (like bars of a bar graph), that represent the degree of the characteristic. In other words, the term "graphical indication" is intended to include any manner (other than text) of emphasizing icons and/or lines in the diagram to indicate characteristics and/or degree of characteristics of objects (steps and/or flow paths) in the diagram. In addition to graphical indications, in 308 the method may also display textual indications about the degree of characteristics for icons/lines in the diagram.

In one embodiment, the graphical indications may only be relative to the other steps and/or flow paths represented in the diagram. Thus, the graphical indications may visually indicate which icon and/or flow path represents the most of a particular characteristic, e.g., by using the degree of color described above, among others. More specifically, the graphical indications may visually indicate degree of characteristics using various techniques such as the color methods described above as well as shading techniques (e.g., where more of a characteristic has more shading, possibly around the icon and/or line). Thus, the graphical indications may visually indicate a relative amount of characteristic for individual steps and/or flow paths with respect to the other steps and/or flow paths in the process. Thus, the graphical indications may be indicated relative to other steps and/or flow paths in the business process. More specific examples are provided below.

Alternatively, the graphical indications may be displayed according to thresholds. For example, the graphical indications may indicate which steps and/or flows exceed and/or fall below the specified thresholds. The thresholds may be determined automatically or assigned by the user as desired. In some embodiments, the indications above or below the threshold(s) may not be a simple binary representation, but may indicate a degree to which the respective steps and/or flows exceed and/or fall below the specified thresholds. For example, in one embodiment, the graphical indications may include red shading around icons and/or lines which have values exceeding the threshold and blue (or possibly no) shading around icons and/or lines which have values that fall below the threshold. The degree to which these values exceed or fall below the threshold may be indicated by a degree of color/shading (e.g., using a gradient of the color(s)) of the icons and/or lines. Thus, graphical indications may be indicated relative to thresholds, e.g., specified by the user, rather than relative to other steps and/or flows in the process. In some embodiments, however, the graphical indications may be displayed according to threshold(s) and comparisons to various ones of the steps and/or flows in the process.

Note that, in some embodiments, the indication of the degree of characteristics (and/or deviation from the threshold) may be a continuous gradient (where every different value has a different associated amount of indication) or a discrete gradient (where values are grouped according to discrete sections, e.g., 0-10% deviation, 10%-20%, etc.). Thus, the graphical indications may be displayed on the diagram via a variety of methods. Note that the graphical indications described herein are exemplary only and that other graphical indications and methods for indicating characteristics of the steps and/or flow paths are envisioned.

In some embodiments, the characteristics may include relative lengths of time for respective ones of the steps of the business process. Thus, the graphical indications may indicate which of the steps on the diagram took the longest respective amounts of times. In other words, the graphical indications may indicate a ranking according to the characteristics for each of the steps and/or flow paths. Thus, the user may easily discover which of the steps take the longest amount of time. Alternatively, or additionally, the graphical indications may indicate which of the steps/flow paths exceed or fall below a threshold, and possibly to what extent the steps/flow paths exceed or fall below the threshold. Following the embodiments from above, the graphical indications may be indicated in the diagram by shading the perimeter of various icons, e.g., with more red for the longer (or more excessive of the threshold) the amount of time. The graphical indications may also include using more, for example, gradients of blue for the shorter (or farther below the threshold) the amount of time. Thus, the user may intuitively understand that steps with the most red shading take the longest amount of time, and those with little or no (or possibly blue) shading take a relatively shorter amount of time (e.g., as compared to one another or a threshold).

In some embodiments, the characteristics may include business characteristics. For example, the characteristics may include monetary costs associated with various paths and/or steps of the business process. Thus, in one embodiment, the graphical indications may indicate steps or flow paths that cost the most amount of money, thereby allowing the user to easily view and understand steps or paths that should be optimized. Alternatively, the business characteristics may include human resource costs, e.g., which paths or steps require the most human resources for completion. Note that the above described business characteristics are exemplary only and other characteristics are envisioned.

Additionally, or alternatively, the characteristics may include path traversal information, e.g., percentages associated with the paths traversed in the process. The user may, for example, be able to view a "happy path" and/or percentages associated therewith. For example, in one embodiment, the "happy path" may indicate the ideal path of the process. In some embodiments, the user may be able to select an "exception path" which may be assigned by the user (e.g., during design of the process) or may be defined as those paths which deviate from the ideal or "happy path". In some embodiments, the graphical indications may indicate the most likely path for the entire process or between groups of icons in the diagram. Thus, the graphical indications may indicate information regarding traversed paths and attributes thereof (e.g., a percentage of time any particular path is traversed).

In some embodiments, the characteristics may include count information. Graphical indications of count information may indicate various attributes/activities of the steps and/or paths in the business process on the diagram. More specifically, in one embodiment, the count information may include values associated with execution activities, wait activities, and completion activities associated with one or more of the steps or flow paths. More specifically, the count analysis may relate to the amount of processes that are waiting, executing, or completed at any given time. Thus, the user may specify a count analysis at a given time and the graphical indications may indicate processes with counts over various thresholds (or have larger or smaller amounts of various counts with respect to other steps in the process).

Note that after the visual indications are displayed, in some embodiments, the user may be operable to change various attributes of the diagram (e.g., what characteristics are being displayed). For example, in one embodiment, the method may further include receiving user input modifying desired analyses, characteristics, thresholds, etc. Thus, the user may be operable to change the thresholds of the graphical indications, and corresponding new graphical indications may be displayed on the diagram. Thus, the user may change properties of the graphical indications and the graphical indications may be displayed on the diagram in response to the user input.

Thus, FIG. 3 illustrates a method for displaying information regarding a business process. Exemplary screen shots of a specific embodiment of this method are described below.

Figure 3A:
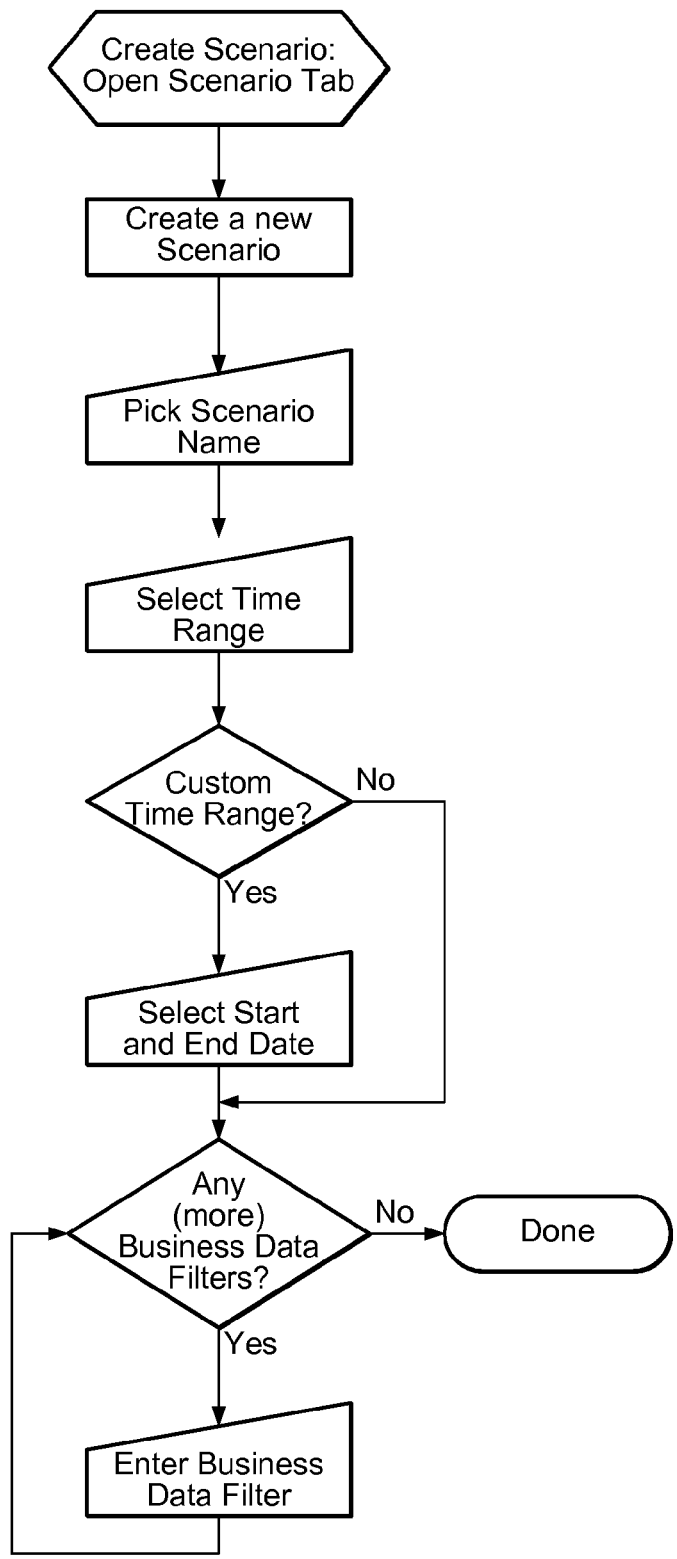
FIGS. 3A-3C are flow charts illustrating embodiments of a method for displaying information regarding a business process.
Figure 3B:
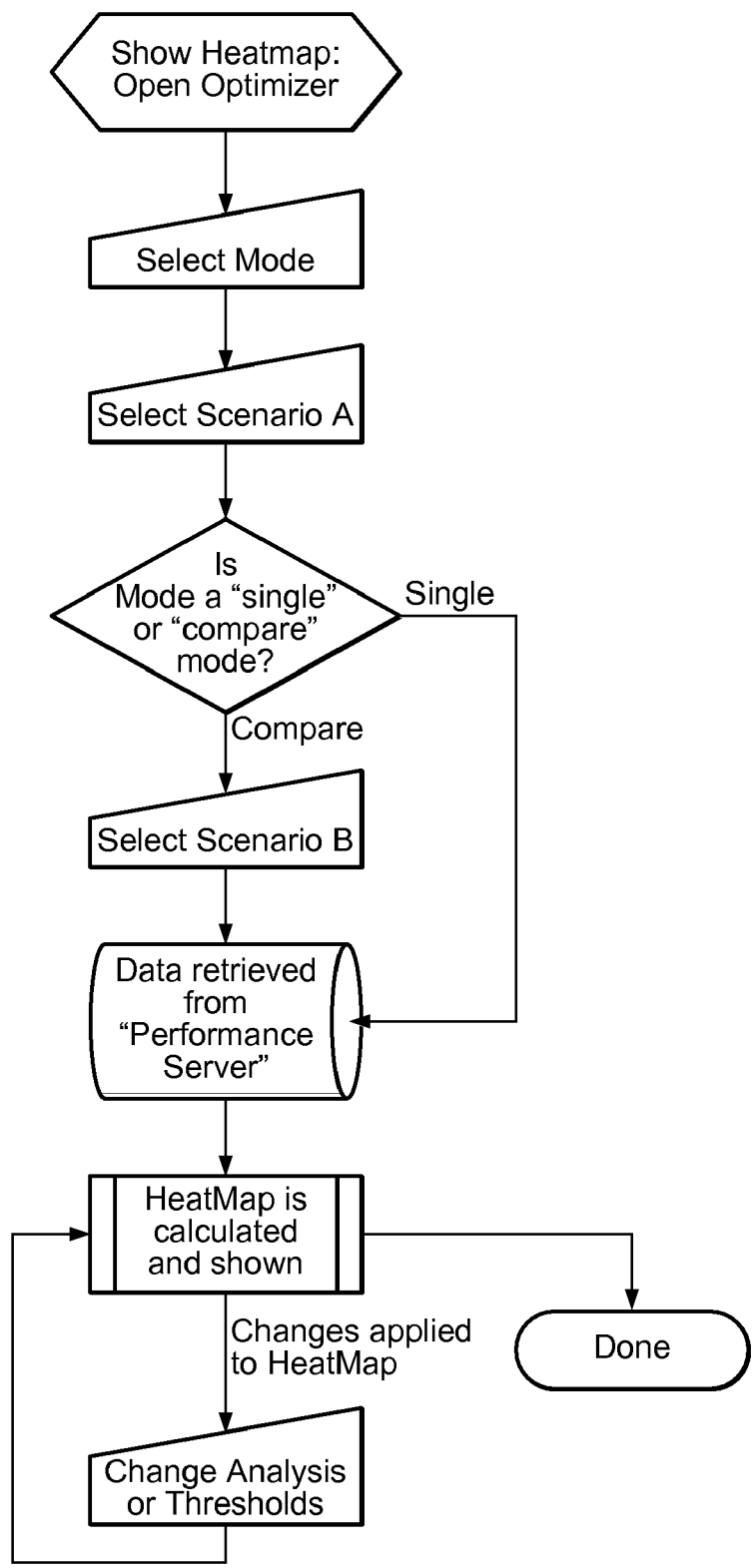
Figure 3C:
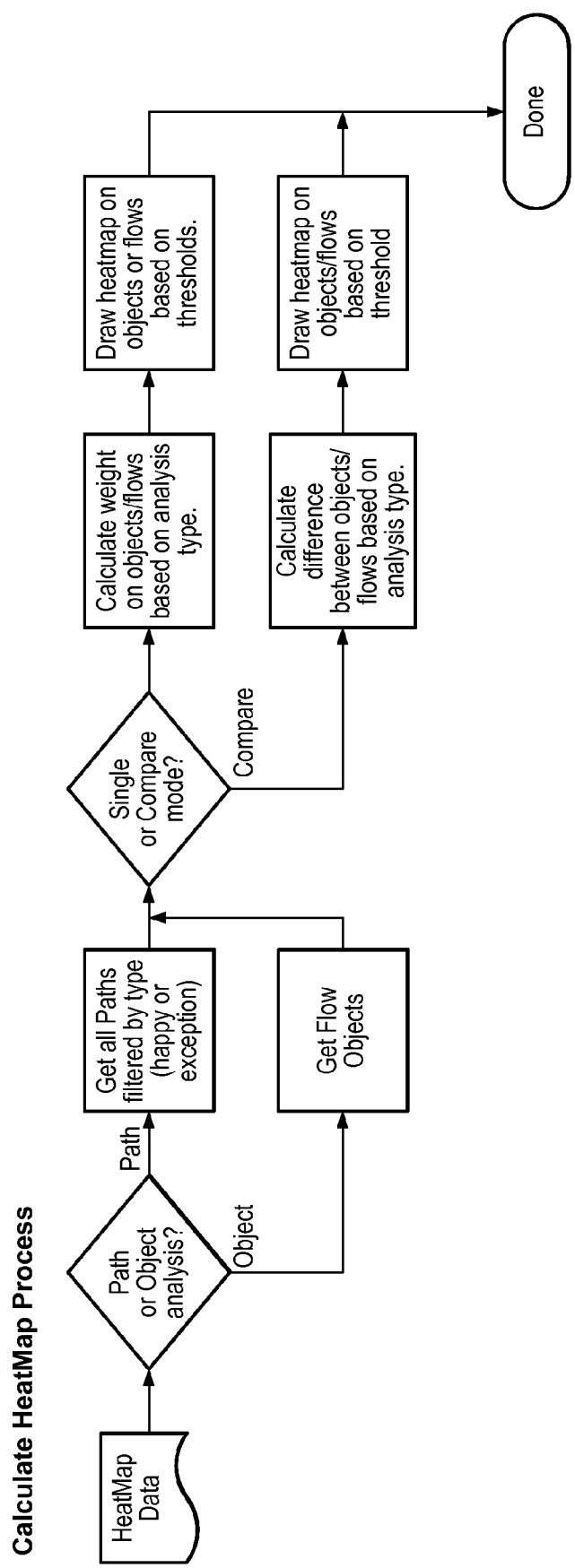

FIGS. 3A-3C—Method for Displaying Information Regarding a Business Process

FIGS. 3A-3C are flow charts of an exemplary method for displaying information regarding a business process similar to FIG. 3 above. More specifically, FIG. 3A relates to selecting/creating a scenario; FIG. 3B relates to selecting an analysis; and FIG. 3C relates to calculating the analysis (for graphically indicating the selections made by the user). Note that FIGS. 3A-3C provide specific embodiments of the method only; in other words, the methods of described herein are not limited to any of the specific elements or descriptions provided in FIGS. 3A-3C. Similar to above, the method shown in FIGS. 3A-3C may be used in conjunction with any of the systems or methods shown or described herein. For example, the methods of FIGS. 3A-3C may apply to FIG. 3 above as well as FIGS. 8-12 described below. In various embodiments, some of the method elements shown may be performed concurrently, in a different order than shown, or may be omitted.

FIGS. 4A-4F, 5A-5H, 6A-6C and 7A-7C—Exemplary Screen Shots

Figure 6A:
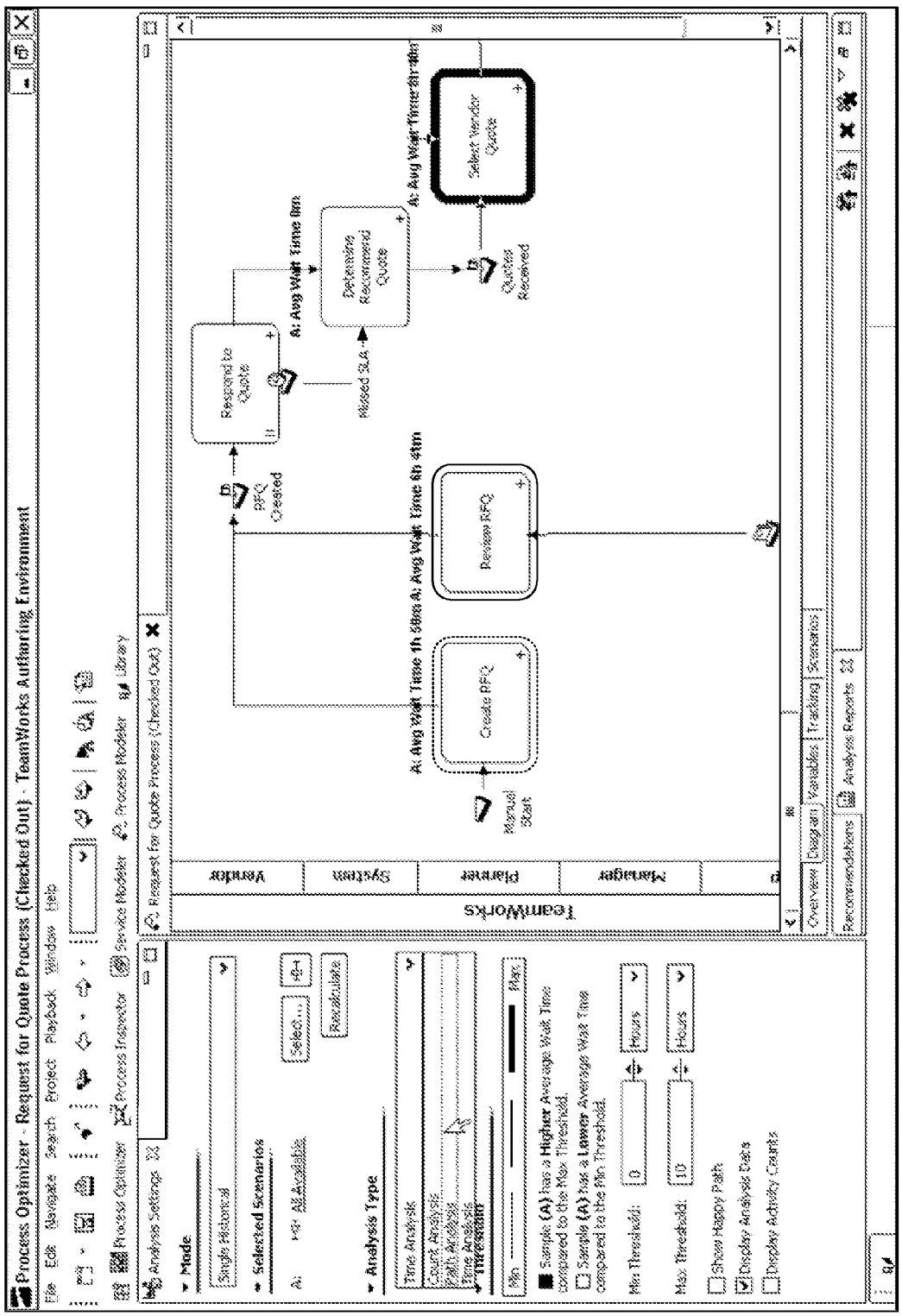
Figure 6B:
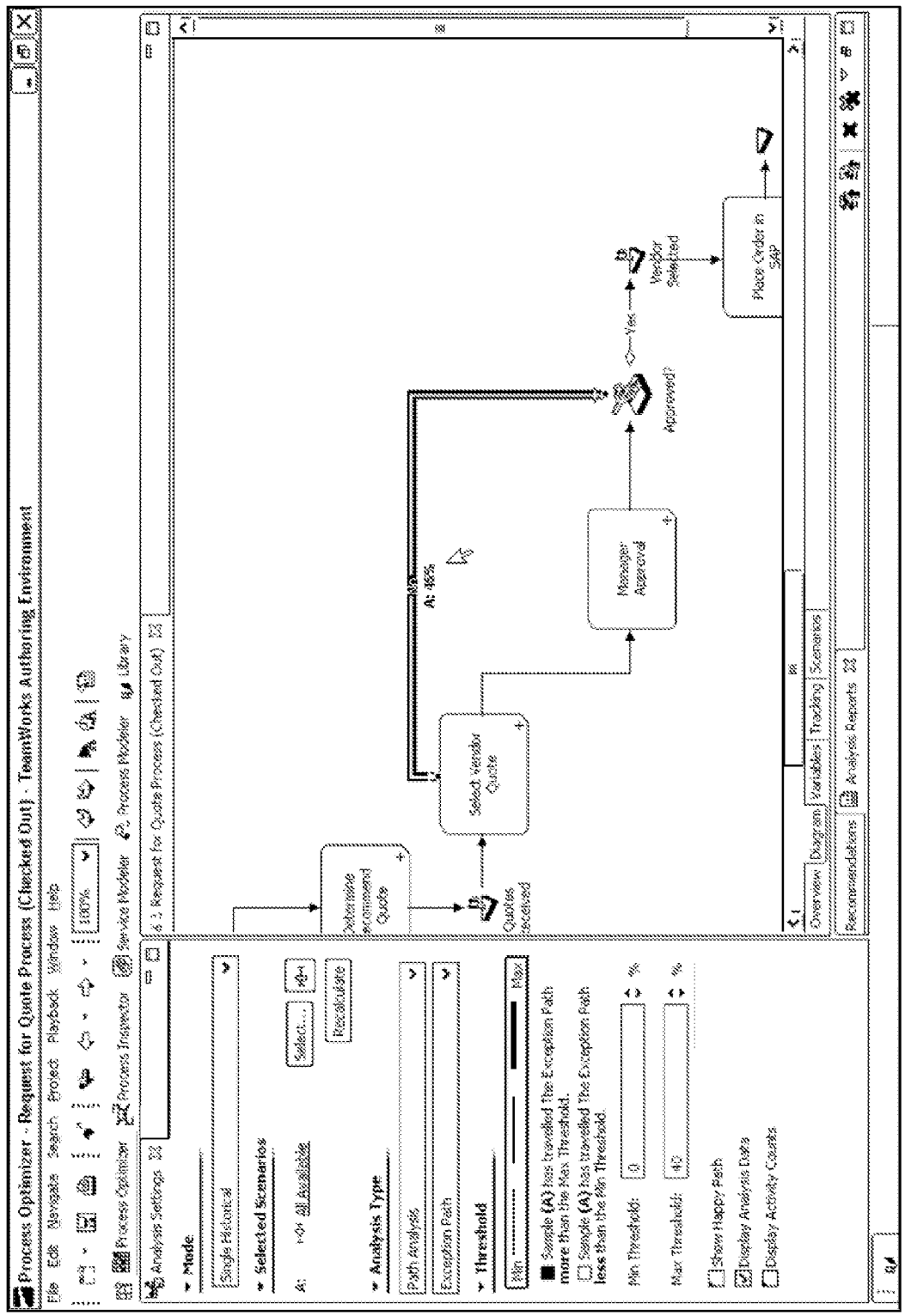
Figure 6C:
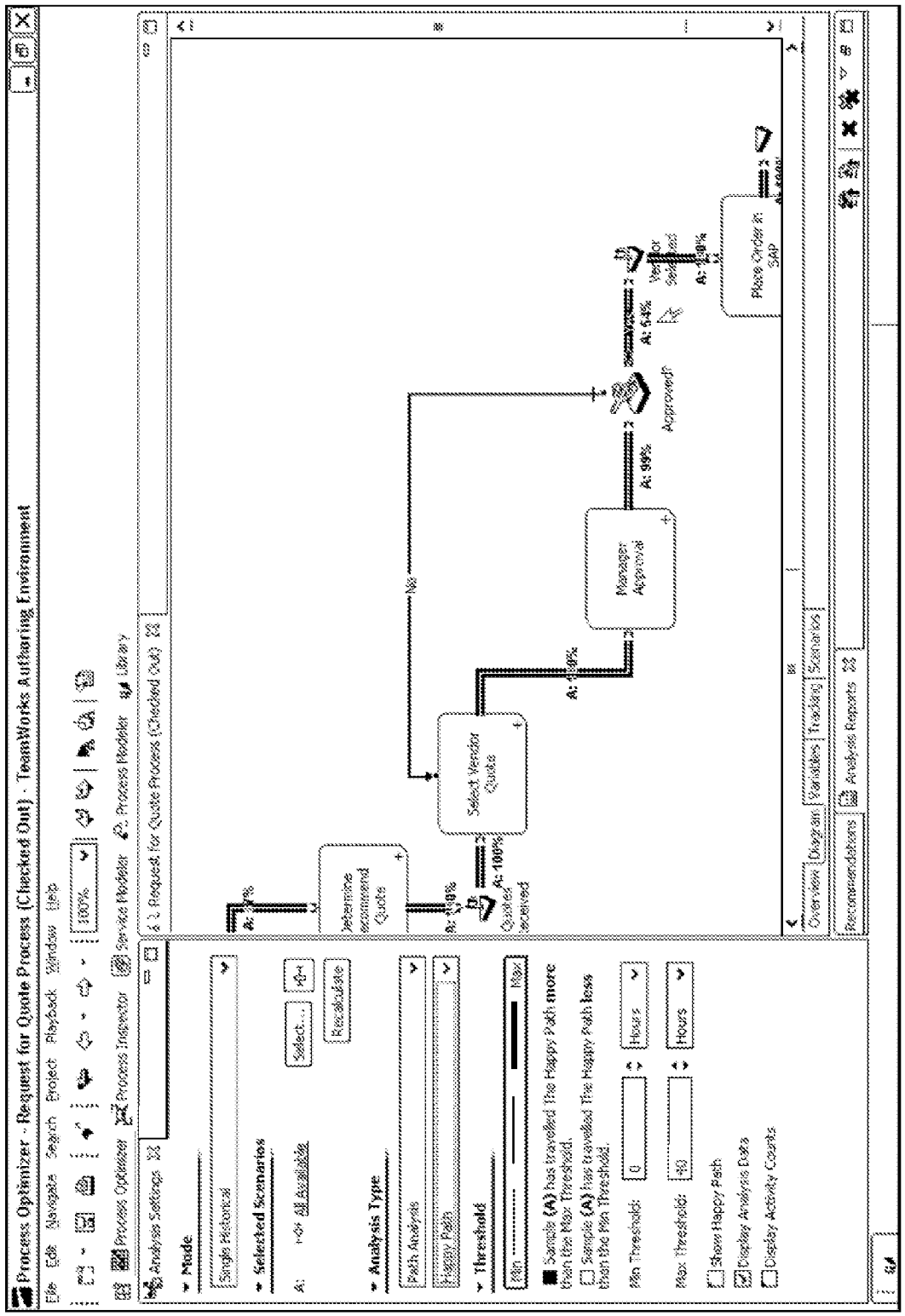
Figure 7A:
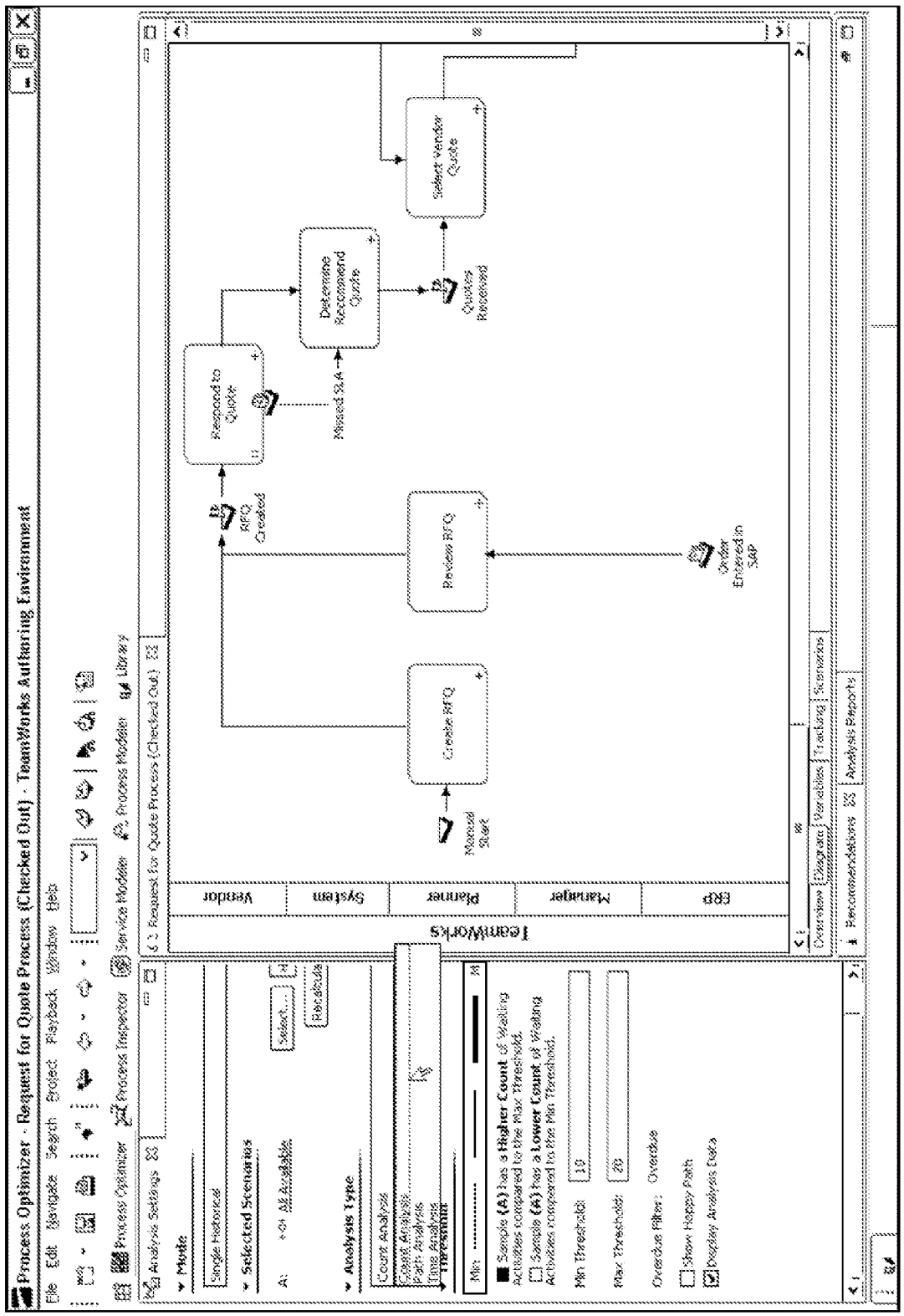
Figure 7B:
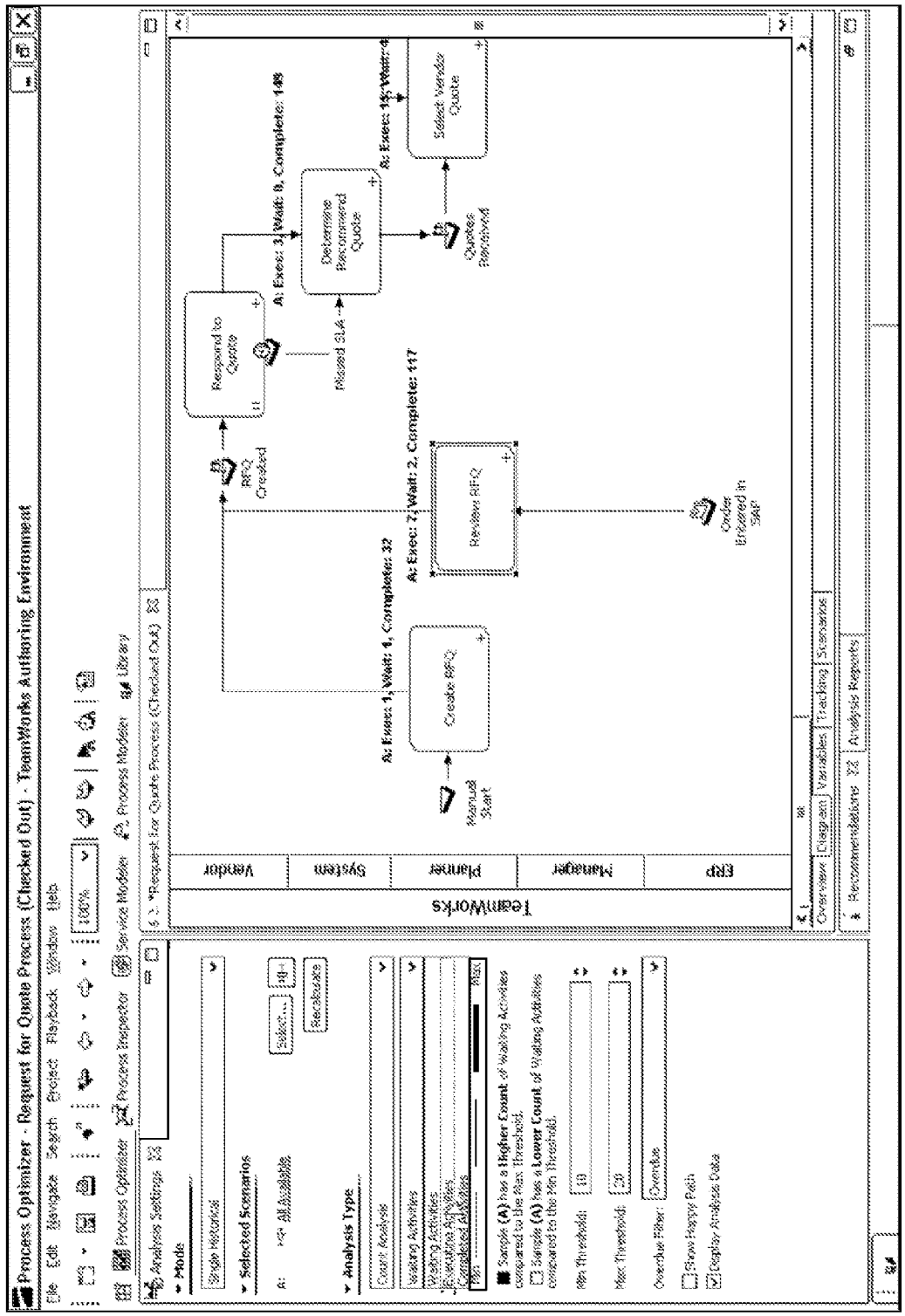
Figure 7C:
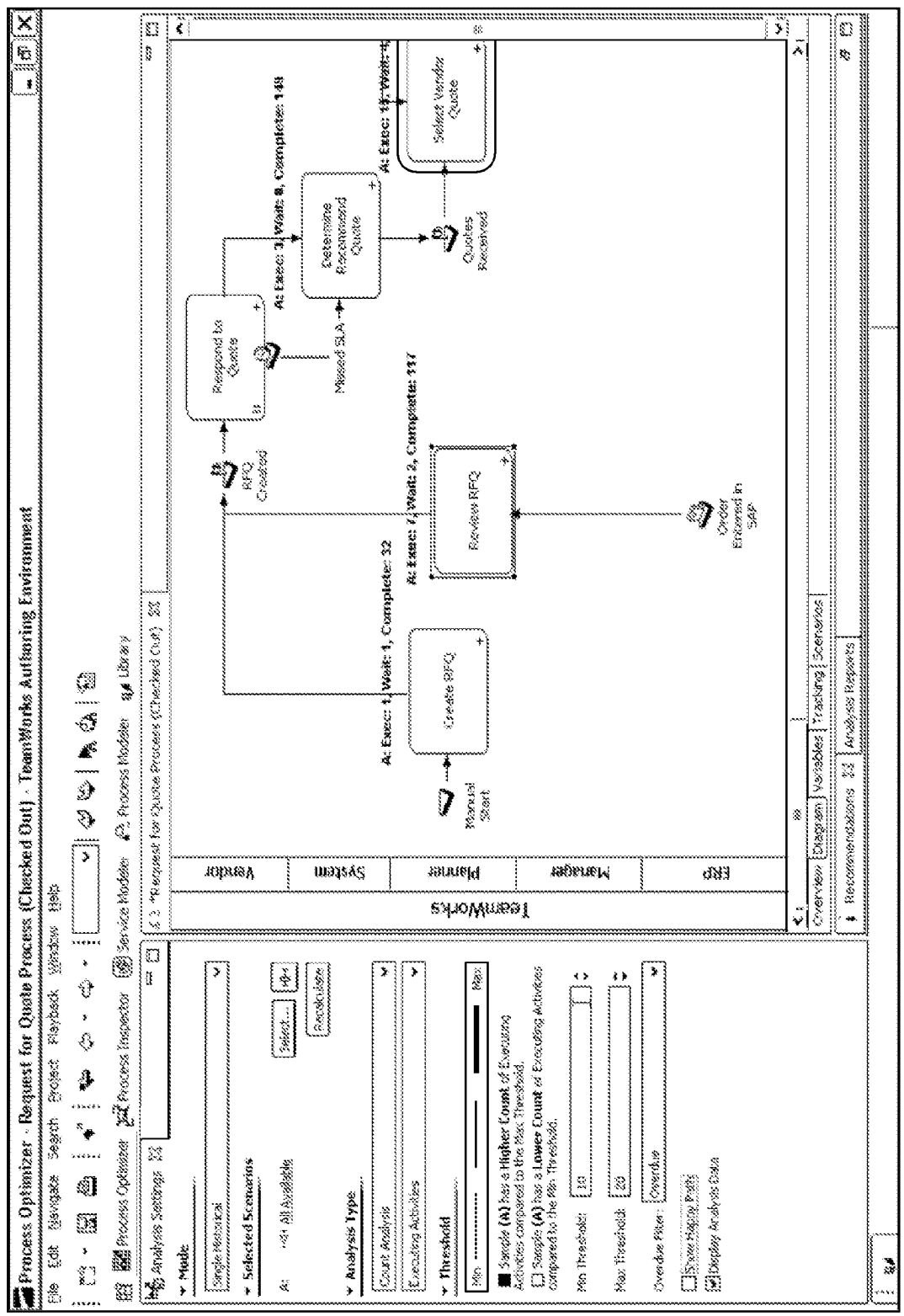

FIGS. 4A-4F, 5A-5H, 6A-6C, and 7A-7C are exemplary screen shots of the method illustrated in FIGS. 3 and 3A-3C. More specifically, FIGS. 4A-4F are a series of exemplary screen shots which show how a user may specify retrieval of information that may be analyzed and displayed. FIGS. 5A-5H are a series of exemplary screen shots showing length of time analysis of a business process. FIGS. 6A-6C are a series of exemplary screen shots showing path analysis of a business process. FIGS. 7A-7C are exemplary screen shots illustrating count analysis of a business process. Note that these analyses (and the specific screen shots illustrated) are exemplary only and other analyses are envisioned. For example, in one embodiment, the method may analyze the information and visually indicate costs associated with steps (e.g., monetary costs), e.g., using the graphical indications (or "heat maps") described herein.

As indicated above, FIGS. 4A-4F are a series of exemplary screen shots which show how a user may specify retrieval of information that may be analyzed and displayed.

As shown in FIG. 4A, the graphical user interface (GUI) includes a diagram display on the right hand side of the figure. On the left hand side, FIG. 4A includes a GUI for enabling the user to configure information for specifying analysis to be performed. The information may take the form of a scenario as shown in FIG. 4A. Additionally, as shown, the GUI may include various fields including a mode field, a select scenario field, an analysis type, and a threshold (e.g., a minimum and maximum threshold). As shown in FIG. 4A, when the user selects the "select" button under "selected scenarios" on the left hand side of the diagram, the screen shot of FIG. 4B appears.

Figure 4B:
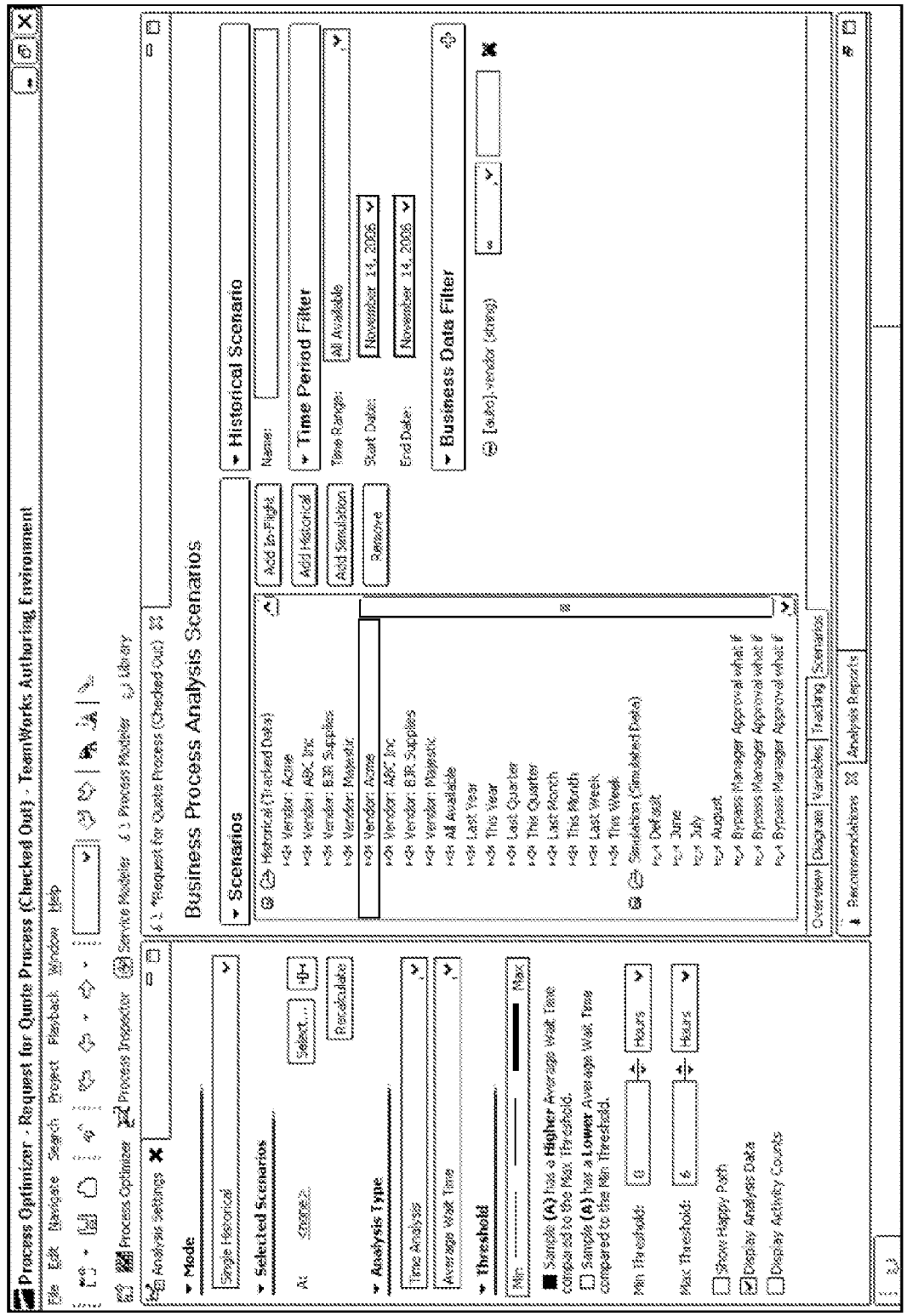

As shown in FIG. 4B, the GUI on the right side includes various business process analysis scenarios that may be selected by the user. As shown, in the scenarios portion of the GUI, the users can select historical (tracked data) corresponding to various vendors and/or time periods. For example, the user may select the historical data corresponding to "vendor: Acme". As shown, when the user selects the vendor Acme under the historical data portion of the GUI, the name "vendor: Acme" appears in the historical scenario field on the right hand side of the diagram. The user may then select a time period filter and/or a business data filter as desired.

Figure 4C:
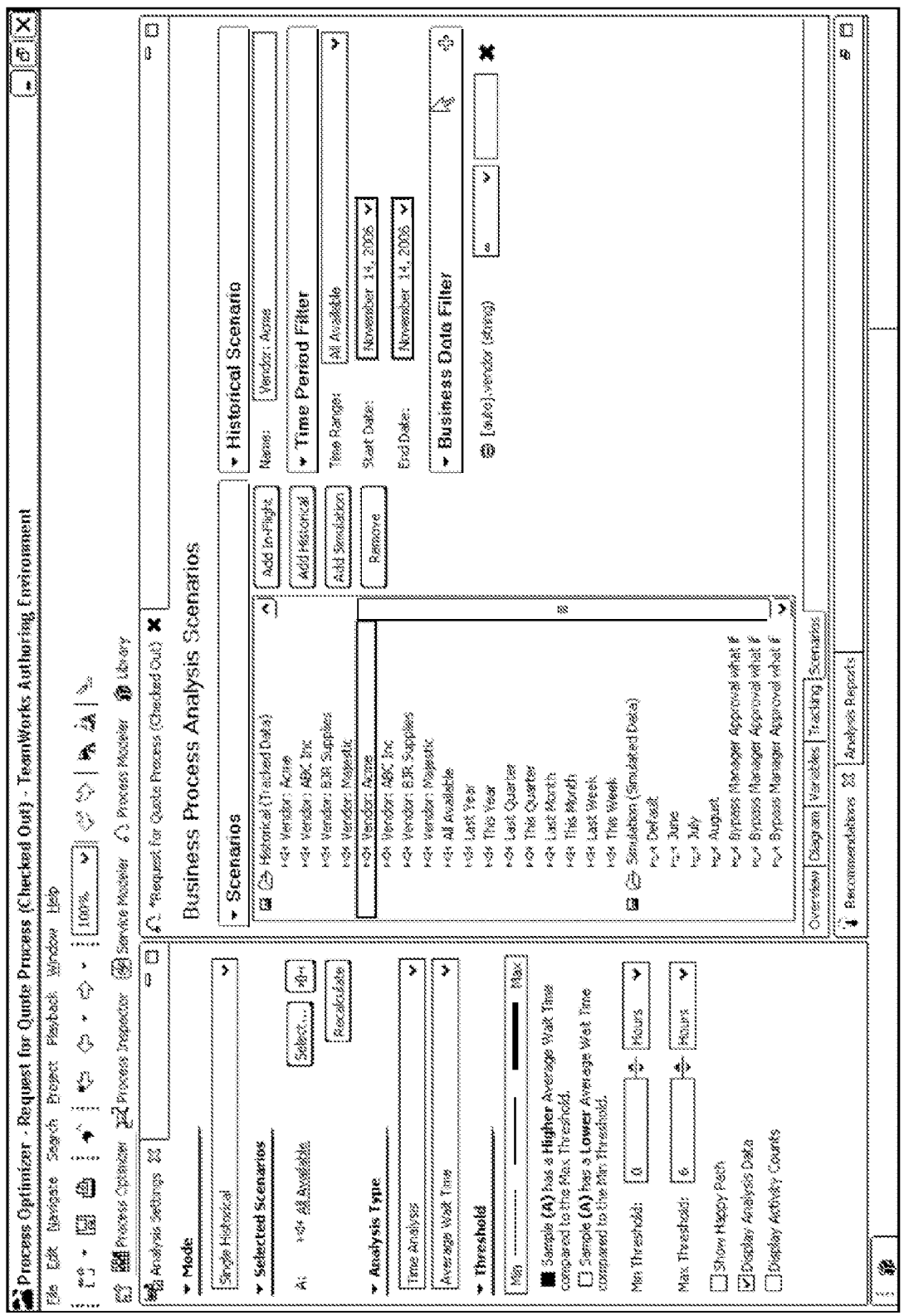

As shown in FIG. 4C, the user has selected the historical data corresponding to "vendor: Acme", and thus the name vendor: Acme appears on the historical scenario field.

Figure 4D:
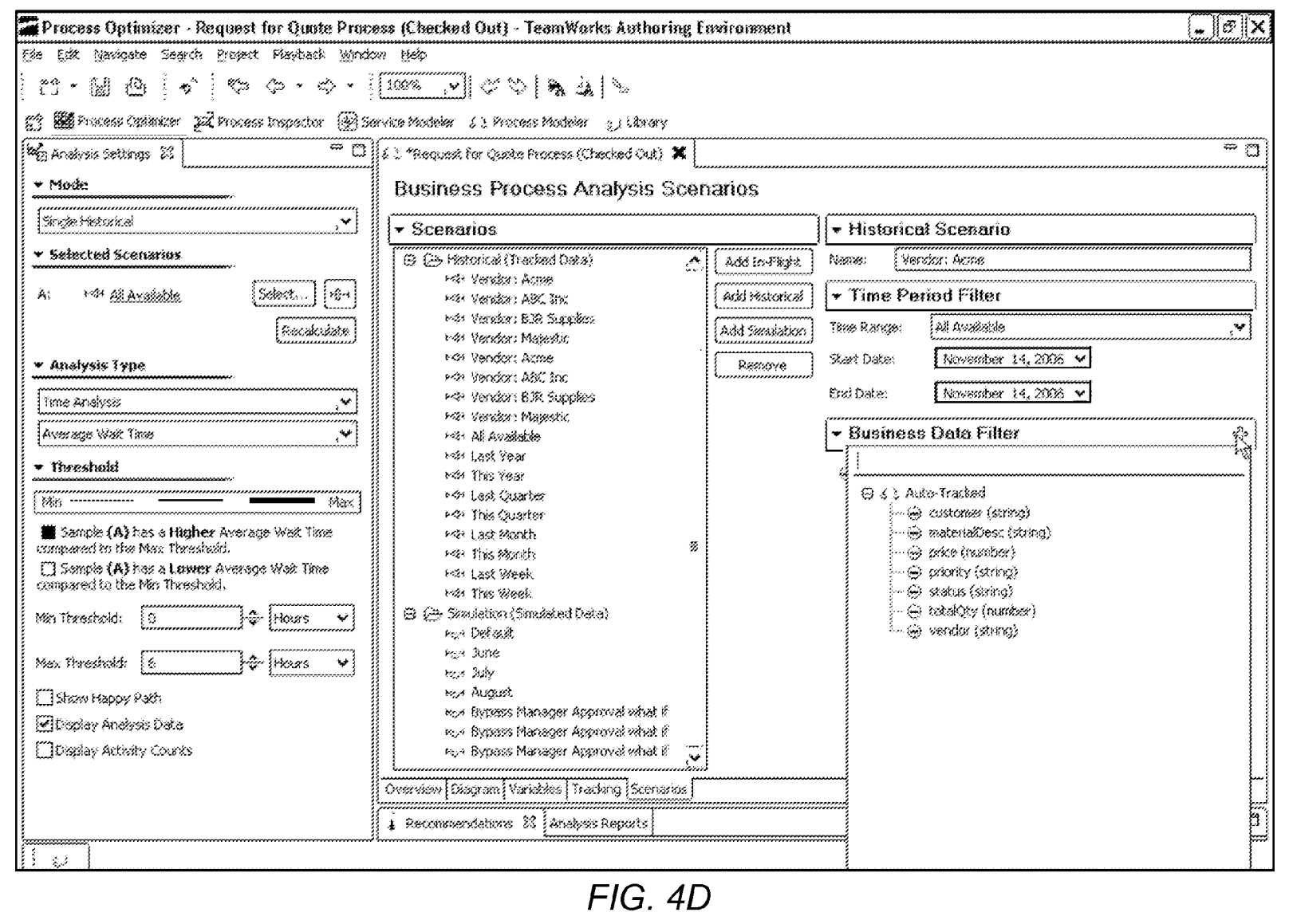

As shown in FIG. 4D, the user selects the business filter data portion of the GUI and, various options may appear, for example, the options may comprise "auto-tracked options" which may include customer, material description, price, etc.

Figure 4E:
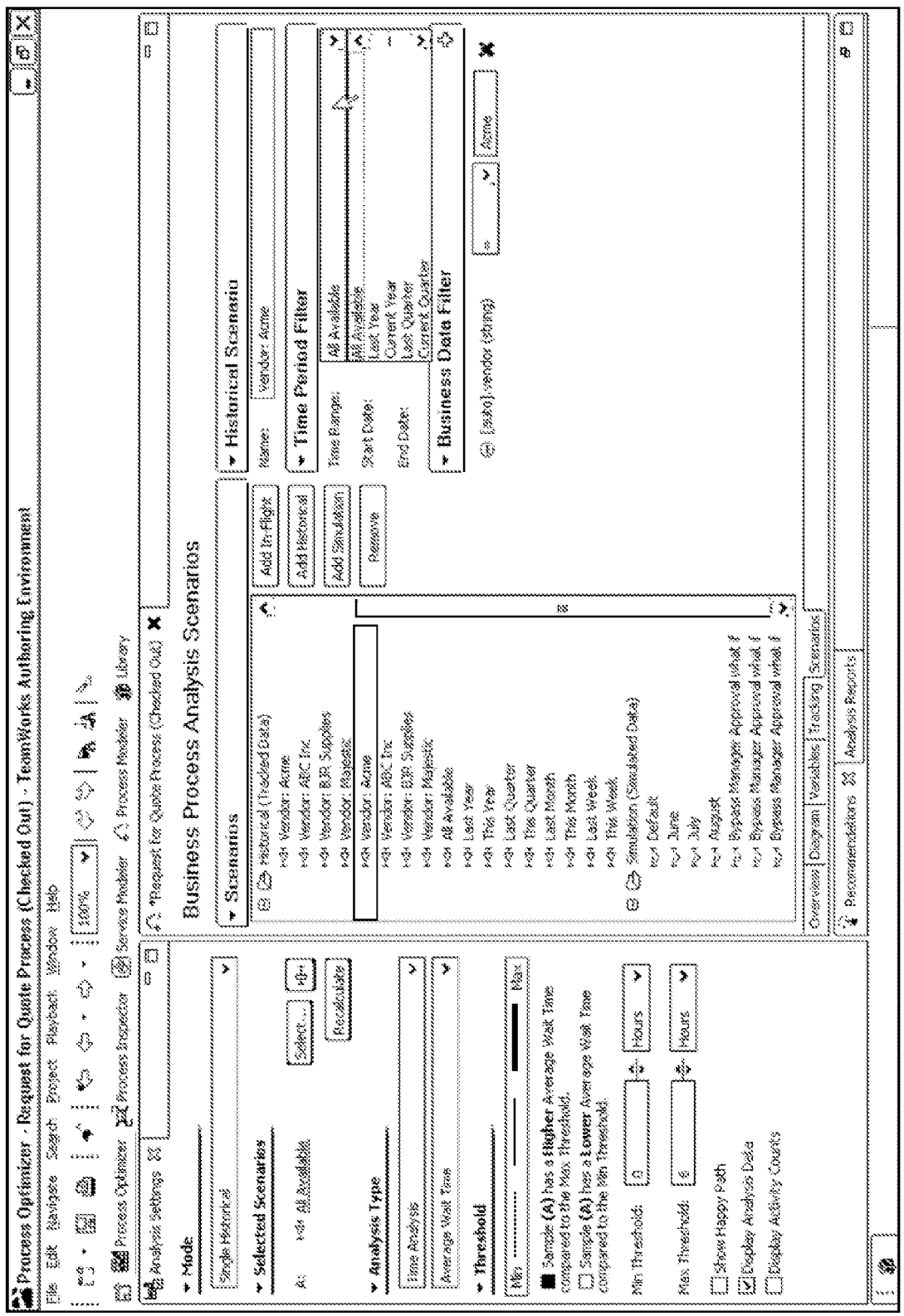

As shown in FIG. 4E, when the user selects the time period filter portion of the GUI, various time ranges may appear such as all available, last year, current year, last quarter, and current quarter. As also shown in FIG. 4E, in response to the vendor selection in the business data filter GUI in FIG. 4D, the vendor filter is set to equal "Acme".

Figure 4F:
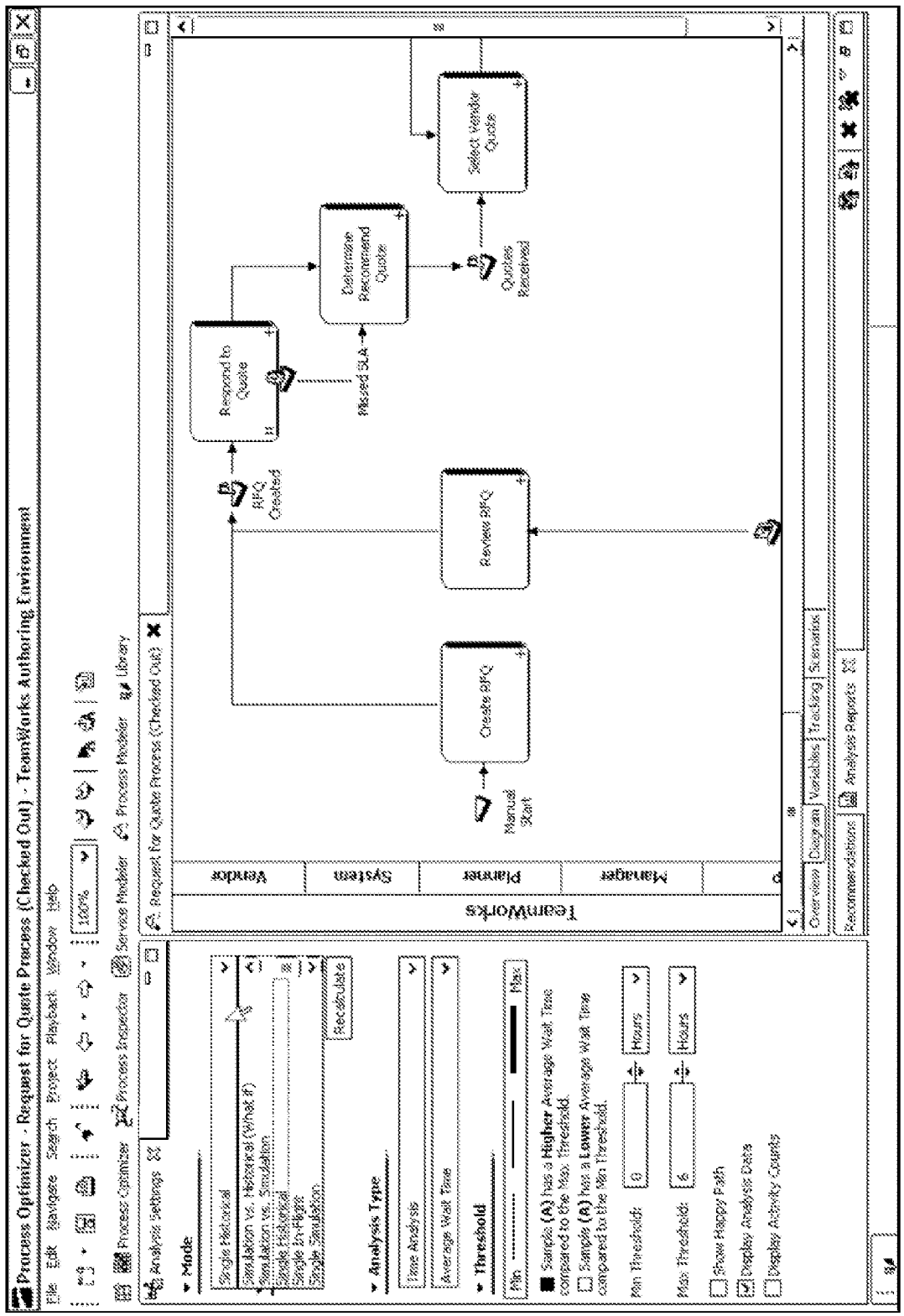

As shown in FIG. 4F, the user may select the analysis from a drop down menu in the GUI on the left side of the Figure. As shown, the user may select from Simulation vs. Historical (What if), Simulation vs. Simulation, Single Historical, Single In-Flight, and Single Simulation. In this example, the user has selected "Single Historical".

As indicated above, FIGS. 5A-5H are a series of exemplary screen shots showing length of time analysis of a business process. FIGS. 5A-5H may follow from FIGS. 4A-4F described above.

Figure 5A:
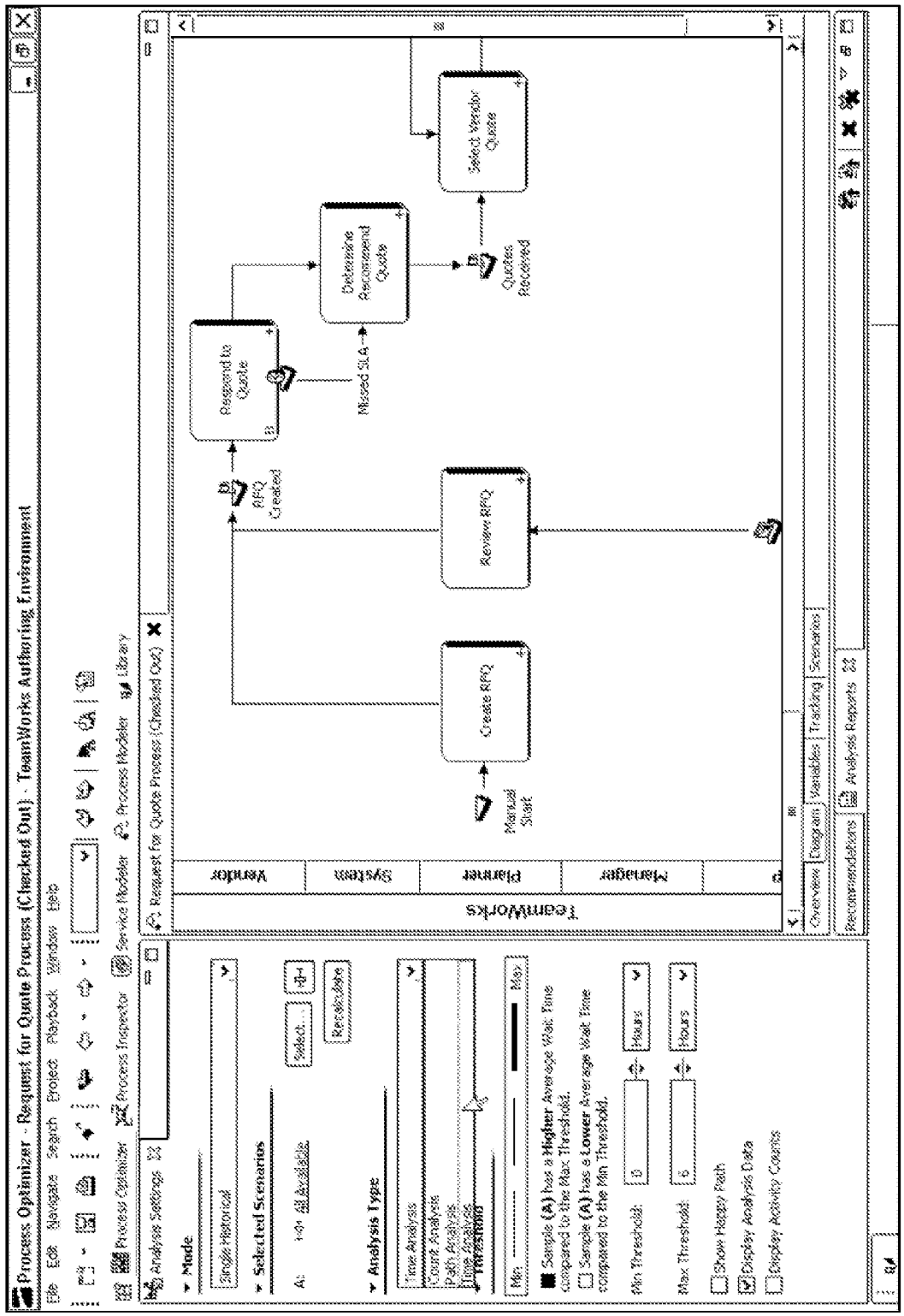

As shown in FIG. 5A, the user has selected "time analysis" for the analysis type portion of the GUI on the left hand side of the screen shot. The GUI illustrates various possible analysis types which may include count analysis, path analysis, or time analysis.

Figure 5B:
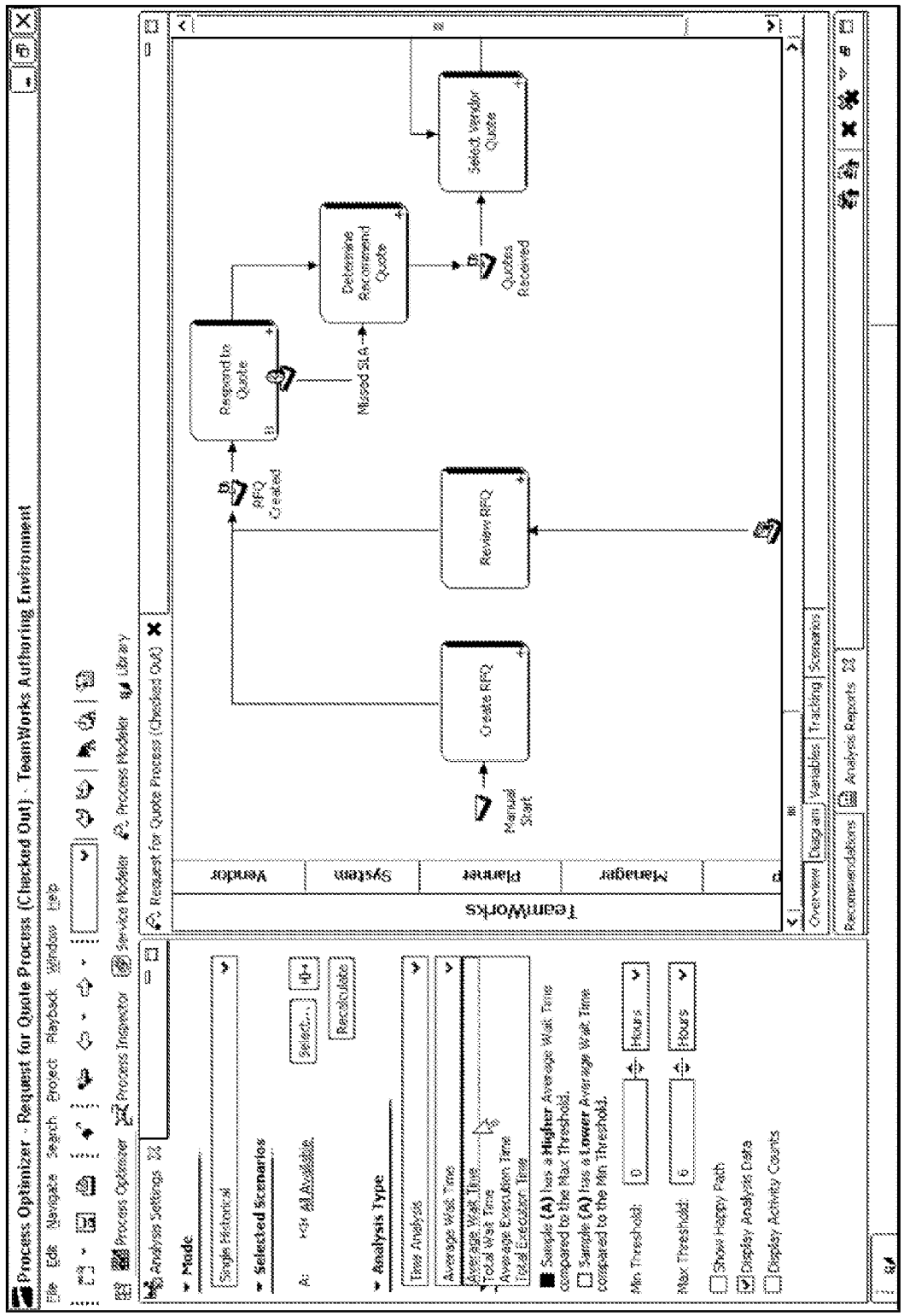

As shown in FIG. 5B, when the user selects time analysis as the analysis type, various time specific entries appear such as average wait time, total wait time, average execution time, and total execution time. As shown, in FIG. 5B the user has selected average wait time in this field.

Figure 5C:
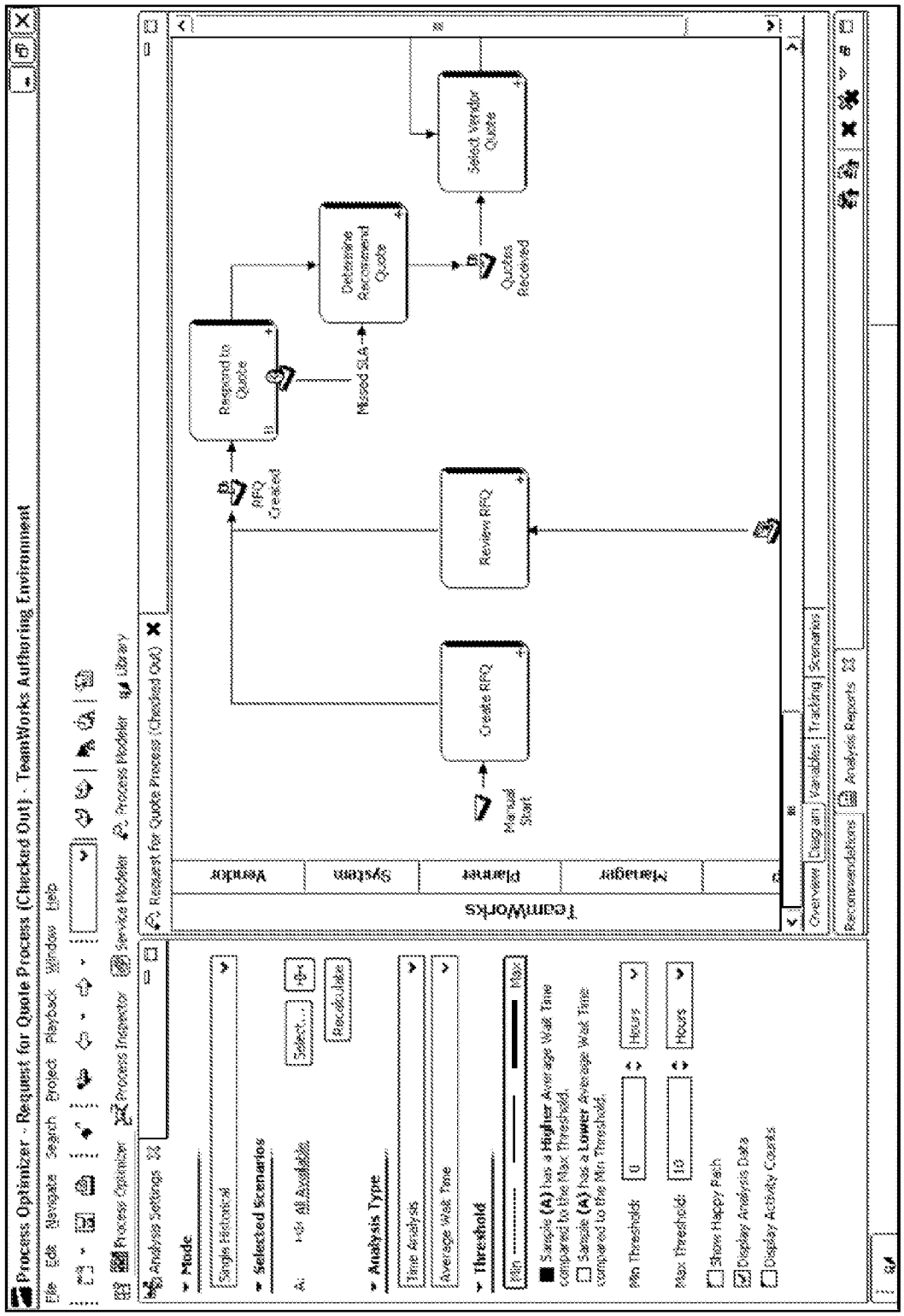

In the screen shot of FIG. 5C, the user is selecting a threshold value. In this case the user has specified a minimum threshold of "0 hours" and a maximum threshold of "10 hours".

Figure 5D:
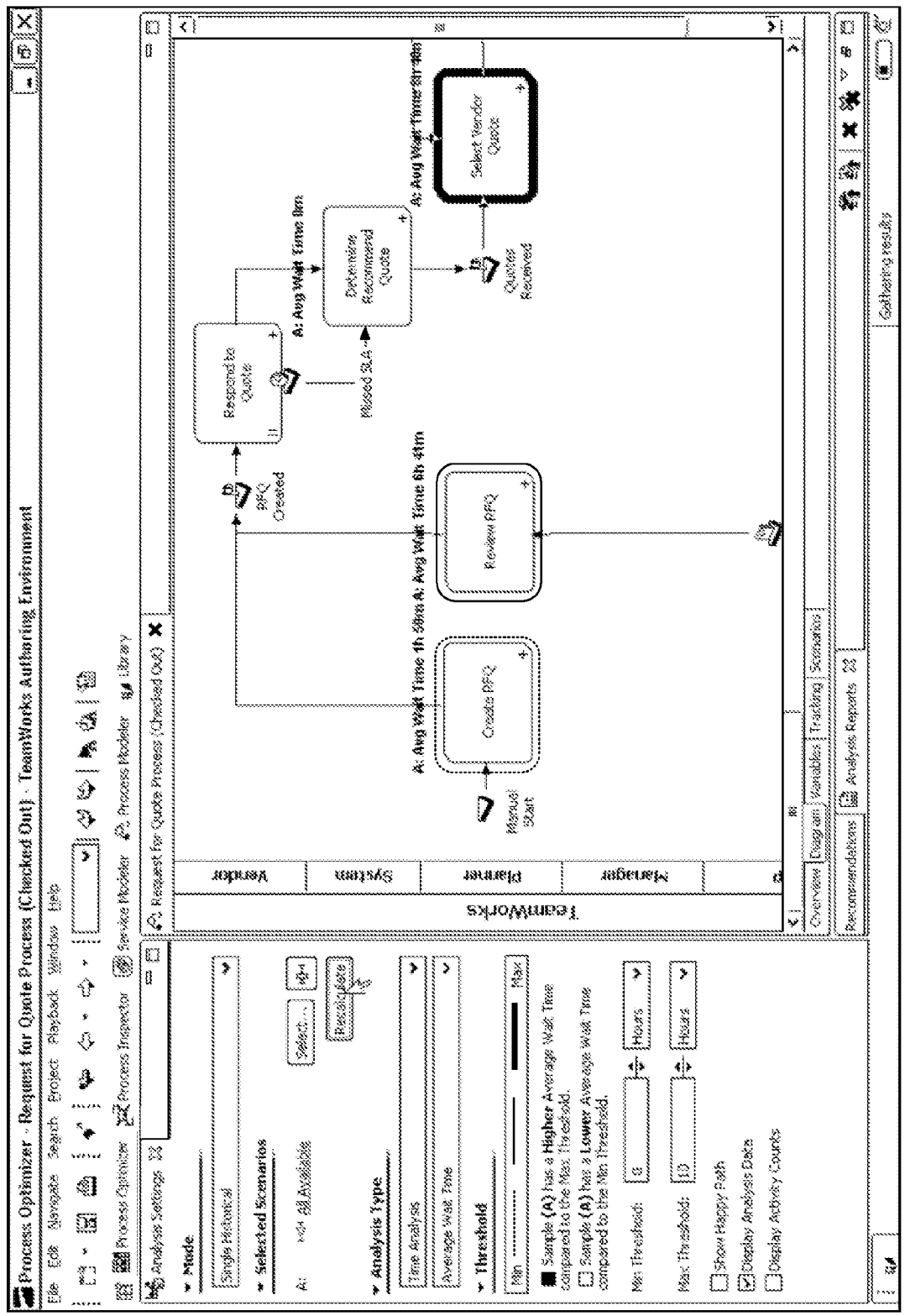

In the screen shot of FIG. 5D, the user selects the recalculate button with his/her mouse, thus causing graphical indications (e.g., color enhancements) to be displayed with respect to icons and/or lines in the business process diagram.

As shown in FIG. 5D, the graphical indications may take the form of "heat maps" including color enhancements displayed around the perimeter of icons in the diagram that indicate information regarding the time analysis performed. Thus, in FIG. 5D when user the user selects the recalculate button, the software program (e.g., the process development environment) performs time analysis of the various steps (associated with icons in the diagram) to determine the average wait time of each of the steps in the process and then generates graphical indications corresponding to respective ones of the icons to indicate the average wait time to the user.

In FIG. 5D, underneath the threshold tab of the left hand side of the GUI, a gradient is displayed from "min" to "max". As shown, and as specified in FIG. 5C, the user has selected the "min" threshold as zero hours and the "max" threshold as ten hours. In the preferred embodiment, the GUI uses the color red and more specifically uses a color hue gradient of the color red to indicate the degree of average wait time. Thus, a lighter hue of the color red indicates a lower average wait time and a darker hue of the color red indicates a higher average wait time. Thus, although not presented in the black and white FIG. 5D, underneath the tab threshold, the "min" begins with a white color, i.e., a very light hue of the color red and then as the gradient goes from left to right, from "min" to "max", the hue of the color red becomes increasingly darker, i.e., from light pink to dark pink, to light red to dark red. Thus, from left to right the color is white at the term "min" and is finally dark red at the term "max". As shown in FIG. 5D, the graphical indications may appear as shading that appear around the perimeter of each of the respective icons and may indicate the relative average wait time per this hue gradient.

In the diagram shown in FIG. 5D, each of the icons has shading around the perimeter of the icon to indicate the average wait time. The degree of the hue of the color red in the shading visually indicates to the user the amount of the average wait time. In other words, as the color hue shading becomes darker or more red around the respective icon, this indicates the respective icon has a longer average wait time relative to those icons which have a lighter hue color shading around its respective perimeter. In the exemplary diagram of FIG. 5D, the "select vendor" icon has a dark red shading around its perimeter indicating a longer average wait time of 8 hours, forty minutes, the "review RFQ" icon has a lighter hue color shading around its perimeter to indicate a lesser average wait of six hours, forty-one minutes, the "Create RFQ" icon has a very light pink shading around its perimeter which indicates a much lower average wait time of one hour, fifty minutes, and the "determine recommend quote" icon has essentially a pure white shading around its perimeter to indicate its average wait time of zero minutes. It is noted that the hue gradient or degree of hue color in these shadings, these heat maps around the icons, is representative of black and white FIG. 5D as either a solid black perimeter, a black line outline, a dotted outline, or a white outline.

Figure 5E:
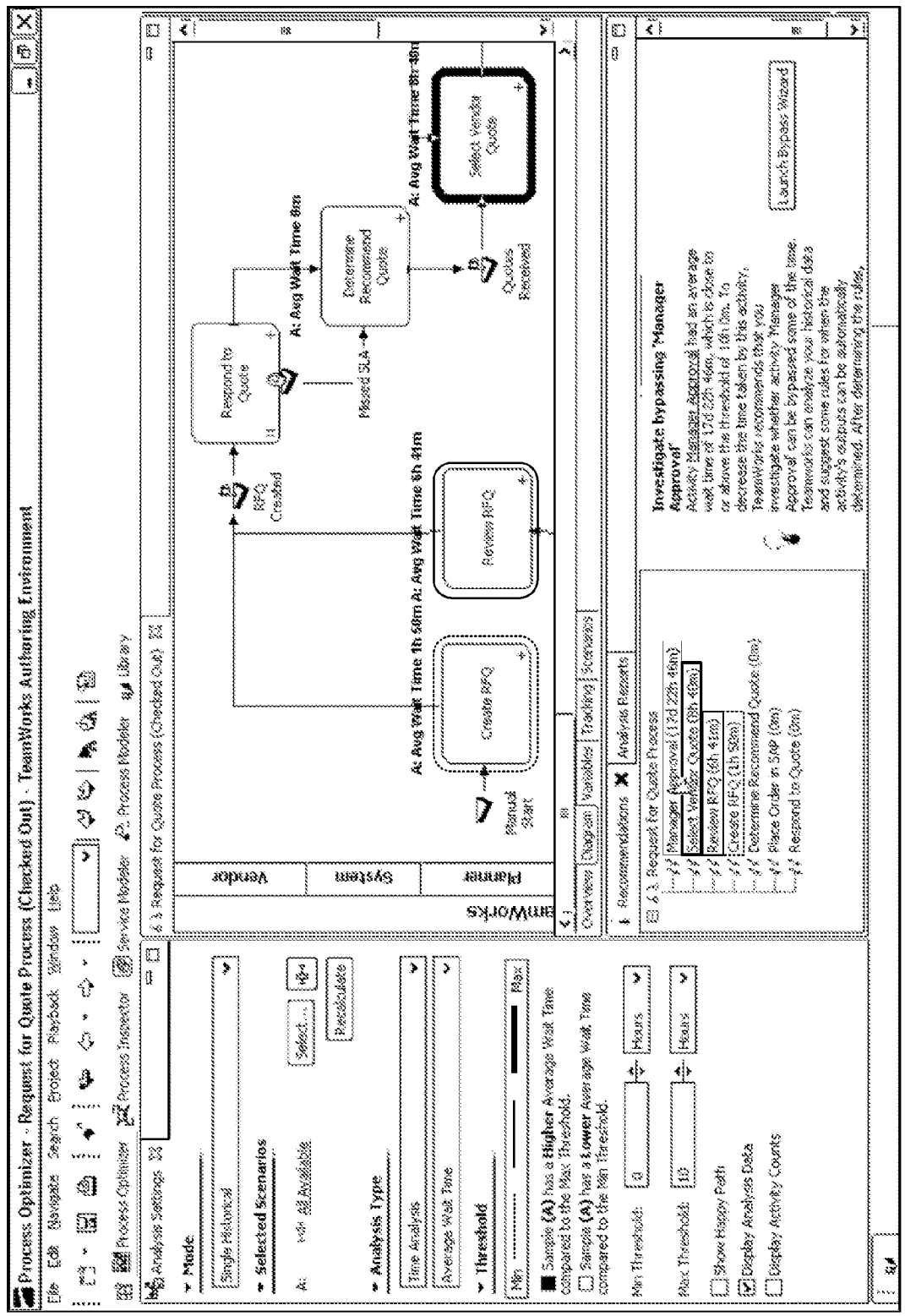

When the user selects the recommendations tab at the bottom of FIG. 5D, the screen shot of FIG. 5E appears. As shown in FIG. 5E, the recommendations tab lists textual names of the various icons that appear in the diagram. These textual names are shaded with graphical indications similar to those that appear with respecto to the respective icons in the diagram. Thus, for example, the "manager approval" text is shaded with the darkest hue of red, the "select vendor" text is shaded with a somewhat lighter hue of red, the "review RFQ" text is shaded with a lighter hue relative to "select vendor", "create RFQ" text is shaded with a very light "light pink" hue of red, and the "determine recommend quote", "place order in SAP", and "response to quote" text items have no hue color shading at all due to their average wait time of zero minutes. As shown in FIG. 5E, when the user selects the manager approval textual item in the recommendations tab, on the right hand side of this GUI, text appears which is titled "Investigate bypassing 'manager approval'". This text provides information related to the manager approval icon and also provides an option to launch an optimization or bypass wizard (described in more detail below) which can be used to automatically modify the diagram to improve the business process and reduce the average wait time caused by this particular step.

Figure 5F:
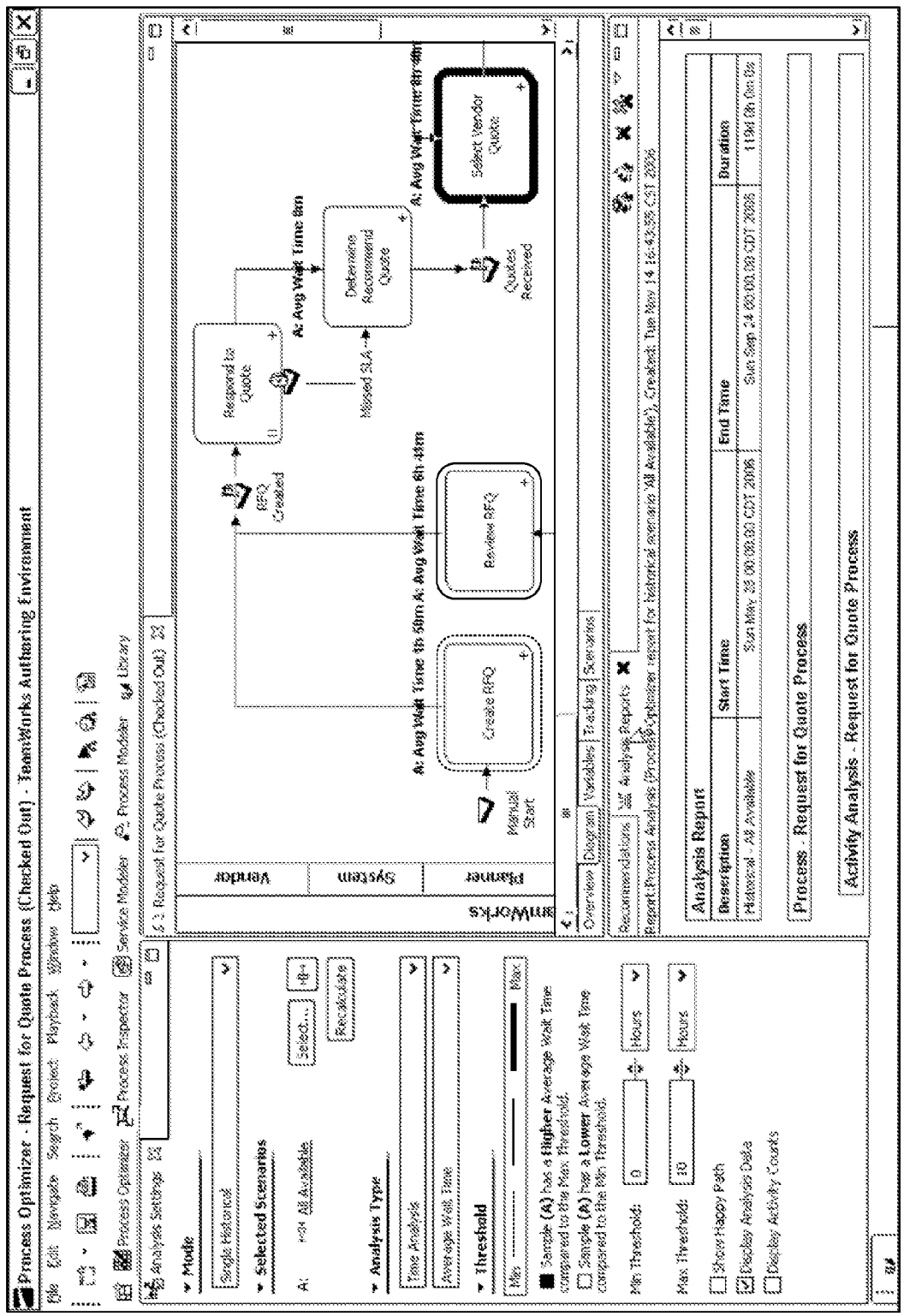

As shown in FIG. 5F, when the user selects the analysis report tab of the GUI, the analysis report GUI right hand side of the Figure appears as shown. This GUI provides information on the data used in the analysis, e.g., all available historical data, and the start and end time of the historical data used.

Figure 5G:
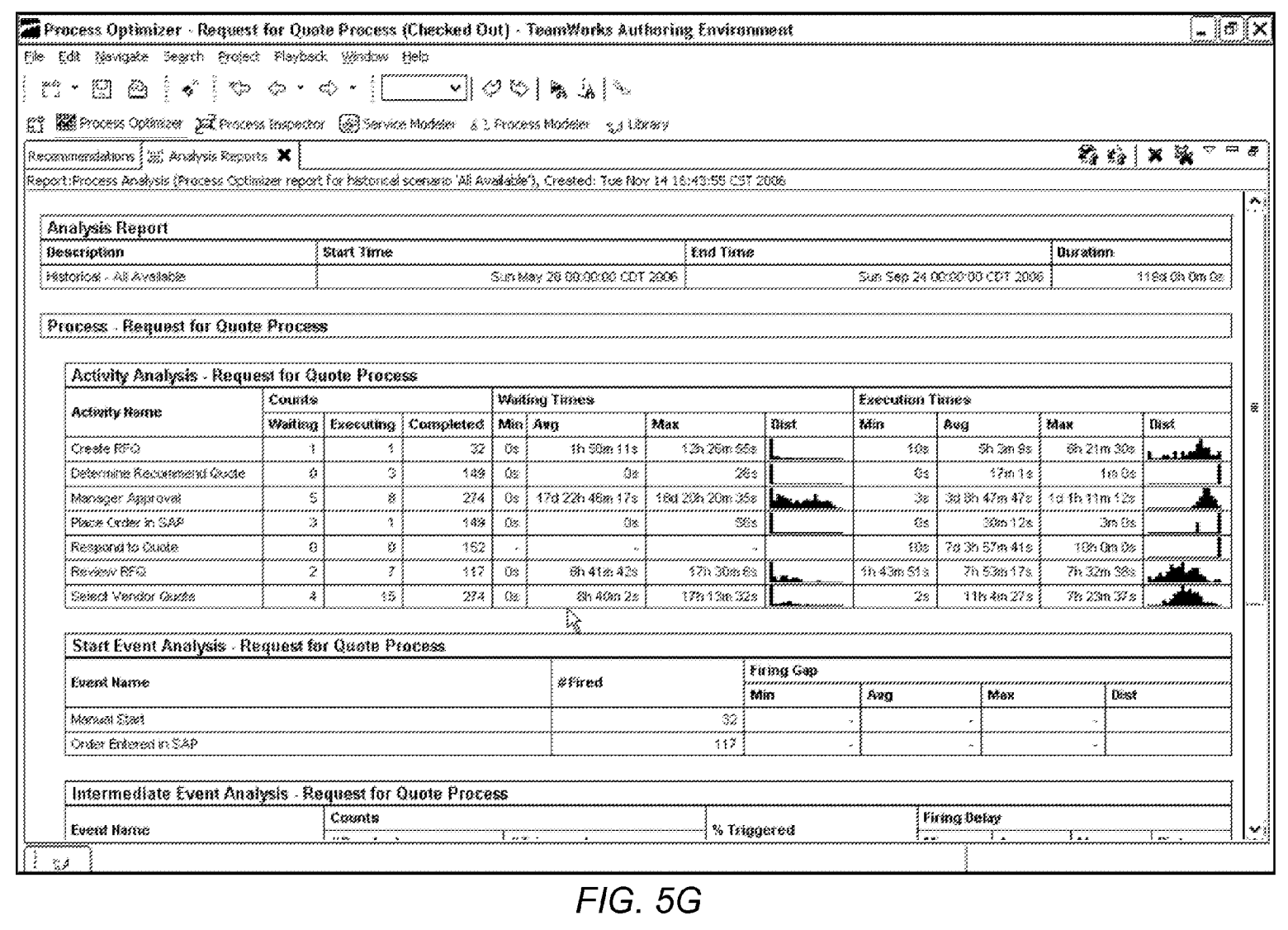
Figure 5H:
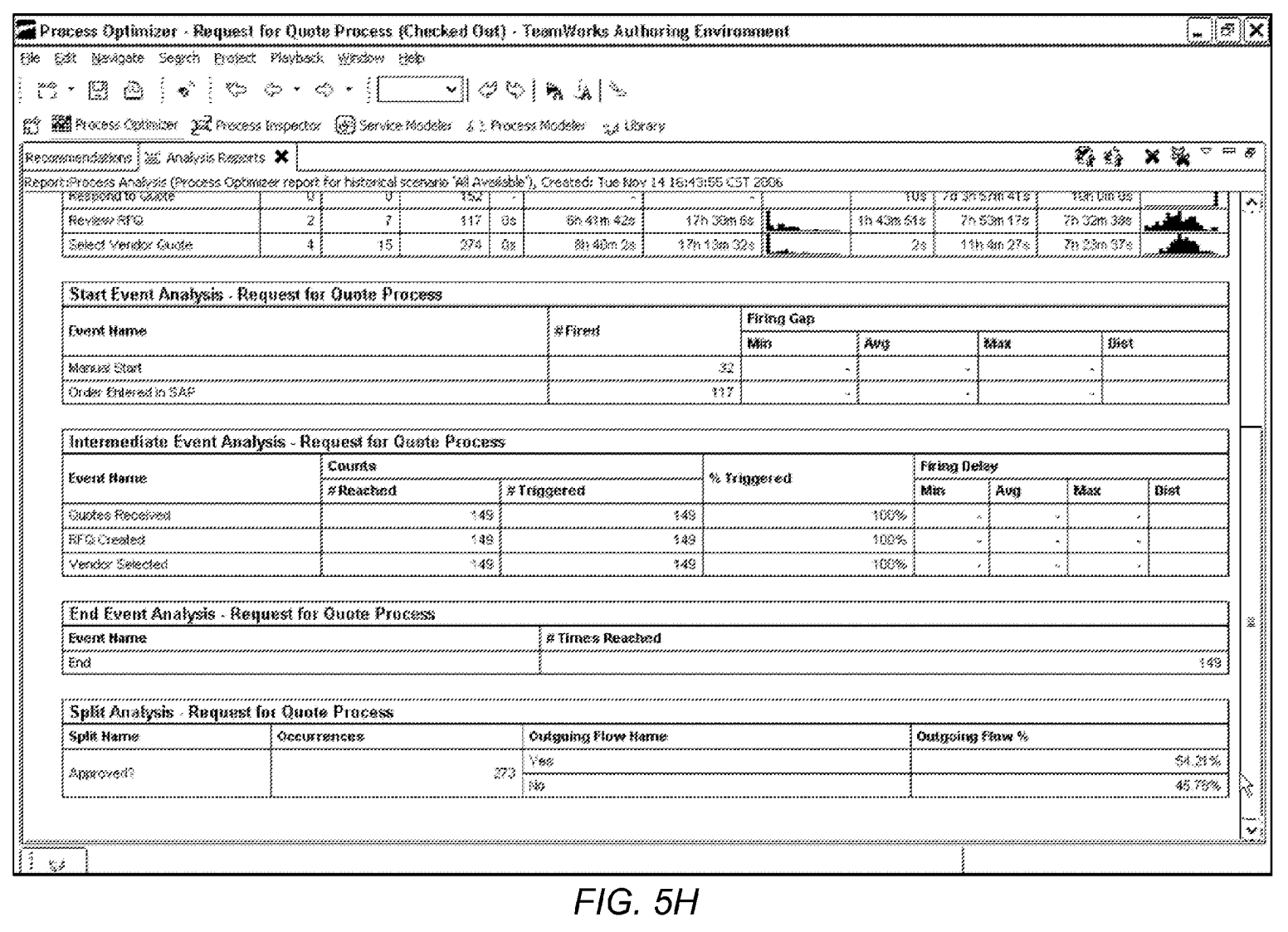

FIGS. 5G and 5H illustrate more fully the analysis report described in FIG. 5F.

Thus, FIGS. 5A-5C illustrate various examples of one embodiment for visually indicating time analysis information using historical data.

As indicated above, FIGS. 6A-6C are a series of exemplary screen shots showing path analysis of a business process.

As shown in FIG. 6A, the user may select path analysis in the GUI in the left hand side. Similar to descriptions above regarding the time analysis, the user may use this analysis to view specific path analysis of the process using historical data.

As shown in FIG. 6B, the user may choose the path analysis sub-field "exception path" in order to view paths that follow the exception path. As also shown, the thresholds are set with a minimum threshold of 0% and a maximum threshold of 40%. In this case, the flow path between "approved?" and "select vendor quote" is highlighted (in this case in red, shown with a black border in the black and white Figure) as having followed the exception path 45% of the time.

As shown, in FIG. 6C, the user has selected the happy path analysis in the left-hand GUI. Thus, the resulting graphical indications on the diagram highlight the "happy path" (e.g., the ideal path) for the process. In this specific case, the "happy path" is highlighted in blue (shown in black in the Figure).

FIGS. 6A-6C illustrate various examples of one embodiment for visually indicating path information using historical data.

As indicated above, FIGS. 7A-7C are exemplary screen shots illustrating an exemplary count analysis of a business process.

As shown in FIGS. 7A and 7B, the user may select "count analysis" as the analysis type. Correspondingly, in 7B the options "waiting activities", "executing activities", and "completed activities" may appear in the second field under "analysis type". As shown in 7B, the user has selected "executing activities".

Finally, in FIG. 7C, the diagram includes both graphical and visual indications corresponding to the selected analysis. Graphically, "select vendor quote" is highlighted with a light pink color (shown as a black outline) graphically indicating the value of 15 for executing activities (in comparison with the minimum threshold of 10 and the maximum threshold of 20 selected in the GUI on the left side. Further textual indications visually indicate other count information including waiting and completing activities. Thus, FIGS. 7A-7C illustrates one embodiment of a count analysis of a process.

Figure 8:
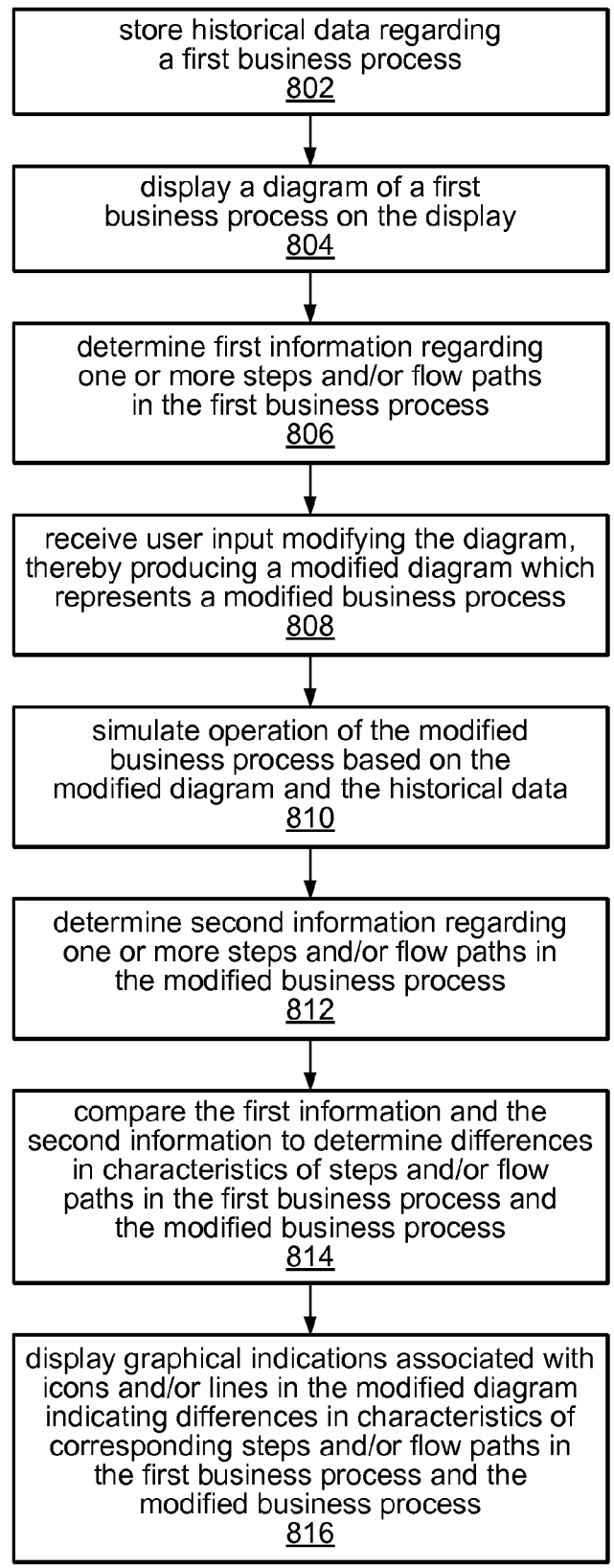
FIGS. 8 and 8A are flow charts illustrating embodiments of a method for displaying information regarding modifications to a business process.

FIG. 8—Displaying Information Regarding Modifications to a Business Process

FIG. 8 is a flowchart of an exemplary method for displaying information regarding modifications to a business process. The method shown in FIG. 8 may be used in conjunction with any of the systems shown in the above Figures, among other devices. In various embodiments, some of the method elements shown may be performed concurrently, in a different order than shown, or may be omitted. Additional method elements may also be performed as desired. As shown, this method may operate as follows.

In 802, data regarding a first business process may be stored (e.g., in response to user input, similar to descriptions above). The data may comprise historical data, simulation data, and/or other data associated with the first business process. As described above (regarding FIG. 3), the data may be stored in response to executing a diagram which represents the first business process. Alternatively, the data may be retrieved from external sources and stored in a memory medium. The data may include information regarding lengths of time (e.g., associated with each of the steps in the process), path traversals (e.g., the specific path that was taken throughout the process), values (business data) of attributes of the steps/paths taken during the process (e.g., waiting/execution activities, number of times path was taken, etc.), count information, and/or other information. As also described above, the data may be received in response to user input. As indicated above, the user may specify constraints such that the data represents only a portion of the data that may be stored, e.g., in a database on a memory medium coupled to, for example, the server 100. Alternatively, the data may be received automatically and may not have been constrained by the user.

In 804, a diagram of the first business process may be displayed on a display, e.g., on the displays of one or more of the computer systems 150 and/or the server 100. Similar to the above descriptions regarding FIG. 3, the diagram may be displayed in response to user input. The diagram may include a plurality of icons (e.g., representing steps of the process) that are interconnected by lines (e.g., representing flow paths of the process). As also described above, the diagram may be executable; in other words, the diagram may operate to implement the process visually indicated by the diagram during execution of the diagram.

In some embodiments, the user may invoke execution of the diagram by pressing an "execute" or "play" button in the process development environment that may display the diagram. During execution, processes, GUIs, and/or applets (among others) may be invoked as execution flows through each of the icons and lines in the diagram. In other words, upon reaching a specific icon or line during execution of the diagram, processes associated with the icon or line may be executed, e.g., as designed by the user. In some embodiments, these processes may be executed locally or remotely (e.g., on a computer coupled through a network such as the network 125 described above, among others). The diagram may include lanes which indicate performers of the steps of the process. For example, the diagram may include a lane for a computer system such as, for example, the server 100. Correspondingly, the server 100 may perform the steps associated with icons placed in this lane during execution of the diagram.

In 806, first information regarding one or more steps and/or flow paths in the first business process may be determined. This determination may be similar to the analysis described above regarding 305 and 306 of FIG. 3. In other words, in 806 the user may specify characteristics to be analyzed (as in 305), and the data (or a time period thereof) may be analyzed to determine these specified characteristics. For example, the first information regarding (a subset of) steps and/or flow paths of the first business process may be determined by analyzing the data stored in 802. In some embodiments, similar to above, the first information may involve averaging data or inferring information from, for example, the data stored in 802, e.g., via calculations. Similar to above, determining the first information may include receiving/storing a portion of the data and analyzing that portion. Thus, the data may be analyzed to determine the values of the (user specified) characteristics described above (among others) associated with a subset of the steps and/or flow paths of the business process (represented by the icons and/or lines in the diagram).

In 808, user input modifying the diagram may be received. The modified diagram may thereby represent a modified business process. In some embodiments, the user may manually modify the diagram, e.g., using various input devices, tools, palettes, or other interfaces (such as those described above, among others). Thus, the user may add additional steps, change interconnections in the diagram, change conditions of the diagram, and/or modify parameters of icons and/or lines in the process, among other changes. Additionally, or alternatively, the user may invoke an optimization wizard which may suggest and possibly automatically modify the diagram for the user. Further descriptions regarding this optimization wizard are described in more detail below. Note that the above modifications are exemplary only and other modifications (or methods thereof) are envisioned.

In 810, operation of the modified business process may be simulated based on the modified diagram and the data. In some embodiments, simulating the modified business process may include analyzing and/or determining probabilities associated with various paths in the process. These probabilities may be used to generate accurate simulated data for the process. However, note that the above-described embodiments are exemplary only, and simulation of the modified business process may be performed via a variety of methods. In other words, the data may be used via numerous ways in order to simulate actual operation of the modified business process, e.g., for comparison to other business processes.

In 812, second information regarding one or more steps and/or flow paths in the modified business process may be determined. Similar to above, the second information may be determined by analyzing data resulting from the simulation in 810. For example, in embodiments where the simulation produces data, e.g., data similar to the data stored in 802, the processes described in 806 may be used. However, in alternate embodiments, other determination/analysis steps may be performed to determine the second information. The second information may indicate information regarding lengths of time associated with steps in the process (e.g., waiting time, execution time, path traversal time, etc.), business costs (e.g., monetary or human resources), deviations from the "happy" or ideal path in the process, and/or various other attributes or characteristics associated with each of the steps and/or flow paths in the process. For example, the second information may indicate the average time required for each of the steps in the process, among others.

In 814, the first and second information may be compared to determine differences in characteristics of steps and/or flow paths in the first business process and the modified business process. In some embodiments, the comparison may be performed in response to user input, e.g., specifying characteristics to be determined. However, comparing the first and second information may be performed exhaustively in order to allow for any future comparisons without further recalculations. In various embodiments, the degree of the comparison between the first and second information may vary from as little as needed for displaying (as in 816) or exhaustive. The comparison of the first and second information may include comparing wait time, execution time, business costs, traversal time, number of times a path was traversed, and/or other characteristics for individual steps/flow paths in the process. Thus, the comparison of the first and second information may reveal differences (e.g., benefits) between the business process and the modified business process.

In 816, graphical indications associated with icons and/or lines in the modified diagram may be displayed. The graphical indications may indicate differences in characteristics of corresponding steps and/or flow paths in the first business process and the modified business process. In some embodiments, the specific differences being visually indicated may be specified by the user. For example, the user may select a "time analysis" in order to view graphical indications of average lengths of times associated with each of the steps/paths in the process. Other characteristics may be selected and visually indicated, as desired. In some embodiments, the displayed characteristics may be automatically chosen, e.g., by the diagram, or the development environment for modifying the diagram. For example, the characteristics may be automatically determined by analyzing which values or characteristics changed from the business process to the modified business process. More specifically, if the only characteristics that changed involved average lengths of time, those characteristics may be automatically compared and/or visually indicated in the diagram without receiving user input choosing those characteristics. In some embodiments, the characteristics may be automatically ranked (e.g., according to which values/characteristics changed the most from the first business process to the modified business process) and the top ranked characteristics may be visually indicated to the user. Thus, the visually indicated characteristics may be chosen and displayed via a variety of methods.

Similar to above, the graphical indications may include color enhancements, e.g., using degree of color, possibly around the perimeter of the objects in the diagram, and/or other indications. The graphical indications may include displaying a "heat map" on the diagram, e.g., using at least one color. For example, the diagram may indicate steps where the modified business process exhibited more or less of the characteristic(s) in question. For examples, a first color (e.g., red) may be used to indicate a less desirable amount of characteristic, and a second color (e.g., blue) may be used to indicate a more desirable amount of characteristic. Thus, where length of time is being visually indicated, if an individual step of the modified business process has a lower average time associated with it, its icon in the diagram may be indicated with blue. Alternatively, if the modified business process step has a longer average time associated with it, its icon may be indicated with red. Similar to above, the degree to which the characteristic varies from the first business process to the modified business process may be indicated with a degree of color. Thus, those steps that indicate more of a change in characteristic may have a darker color than those that have a lesser change in characteristic. Similar to above, the graphical indications may indicate relative differences among the steps and/or flow paths in the process and/or may indicate differences from the steps and/or flow paths to threshold(s).

Note that modifying the diagram and simulating the resulting change may be referred to as a "what-if" scenario. In other words, this modification, simulation, and comparison allows the user to view possible changes had the process been performed differently. Thus, the user may easily discover the answer to possible optimizations by calculating these "what-if" scenarios, thereby allowing the user to easily determine which modifications would have resulted (and therefore should result) in a more efficient process).

Figure 8A:
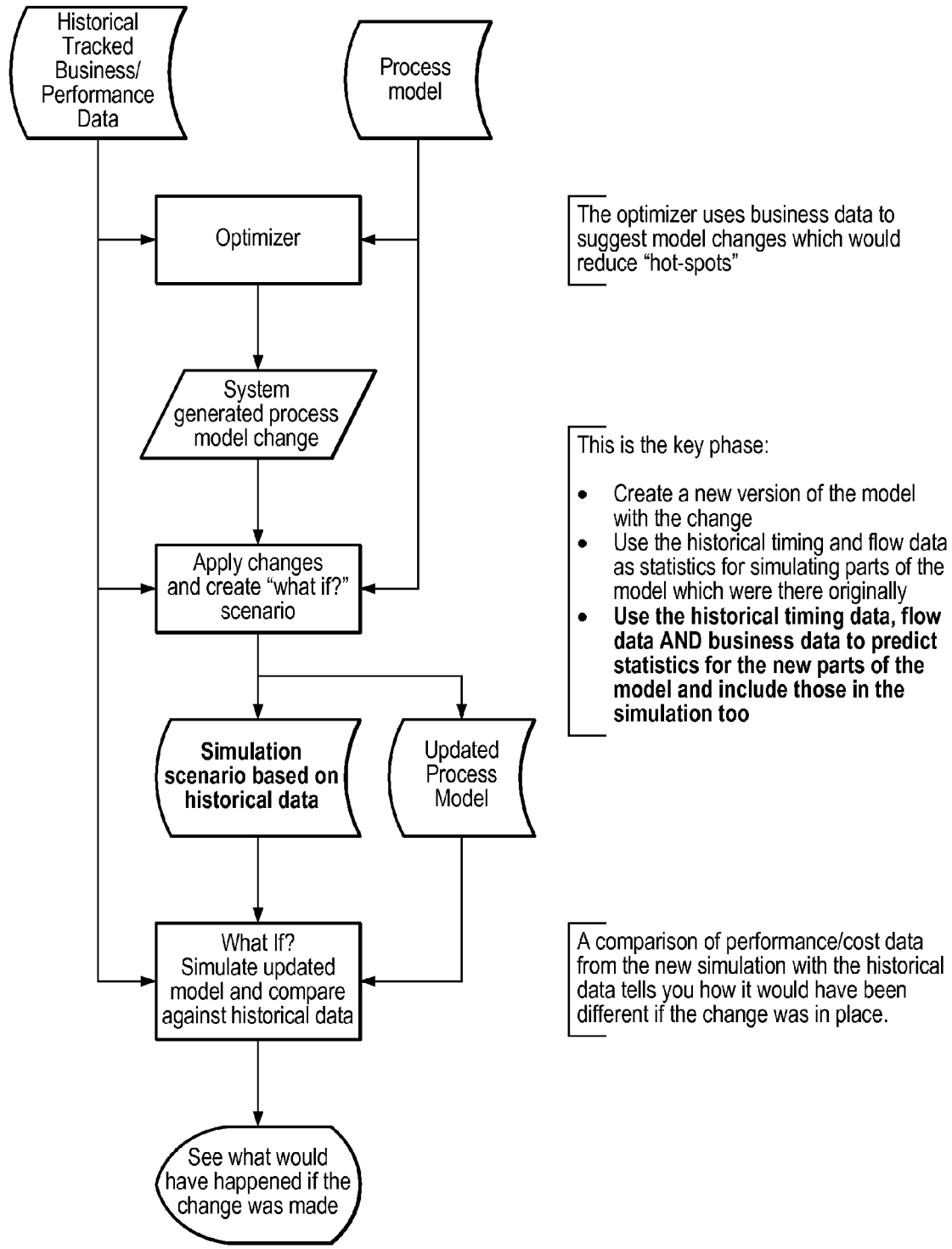

FIG. 8A—Exemplary Method for Guided Optimization of a Business Process

FIG. 8A is a flowchart of an exemplary method for displaying information regarding modifications to a business process similar to FIG. 8 above. Note that FIG. 8A provides a specific embodiment of the method only; in other words, the guided optimization described herein is not limited to any of the specific methods or descriptions provided in FIG. 8A. Similar to above, the method shown in FIG. 8A may be used in conjunction with any of the computer systems or devices shown in the above Figures, among other devices. In various embodiments, some of the method elements shown may be performed concurrently, in a different order than shown, or may be omitted. Additional method elements may also be performed as desired.

Figure 9A:
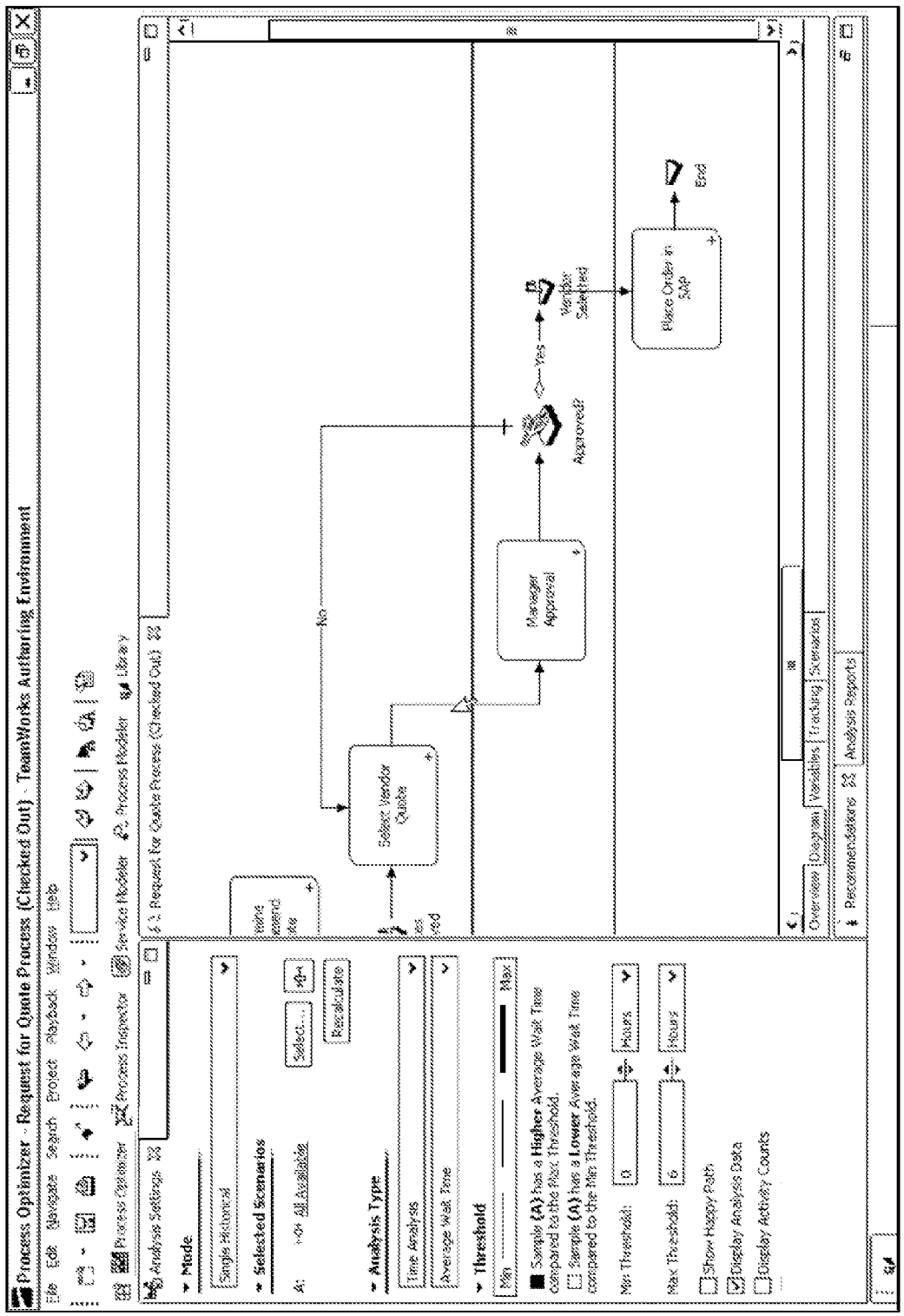
FIGS. 9A and 9B are exemplary screen shots illustrating an embodiment of the method illustrated by FIG. 8.
Figure 9B:
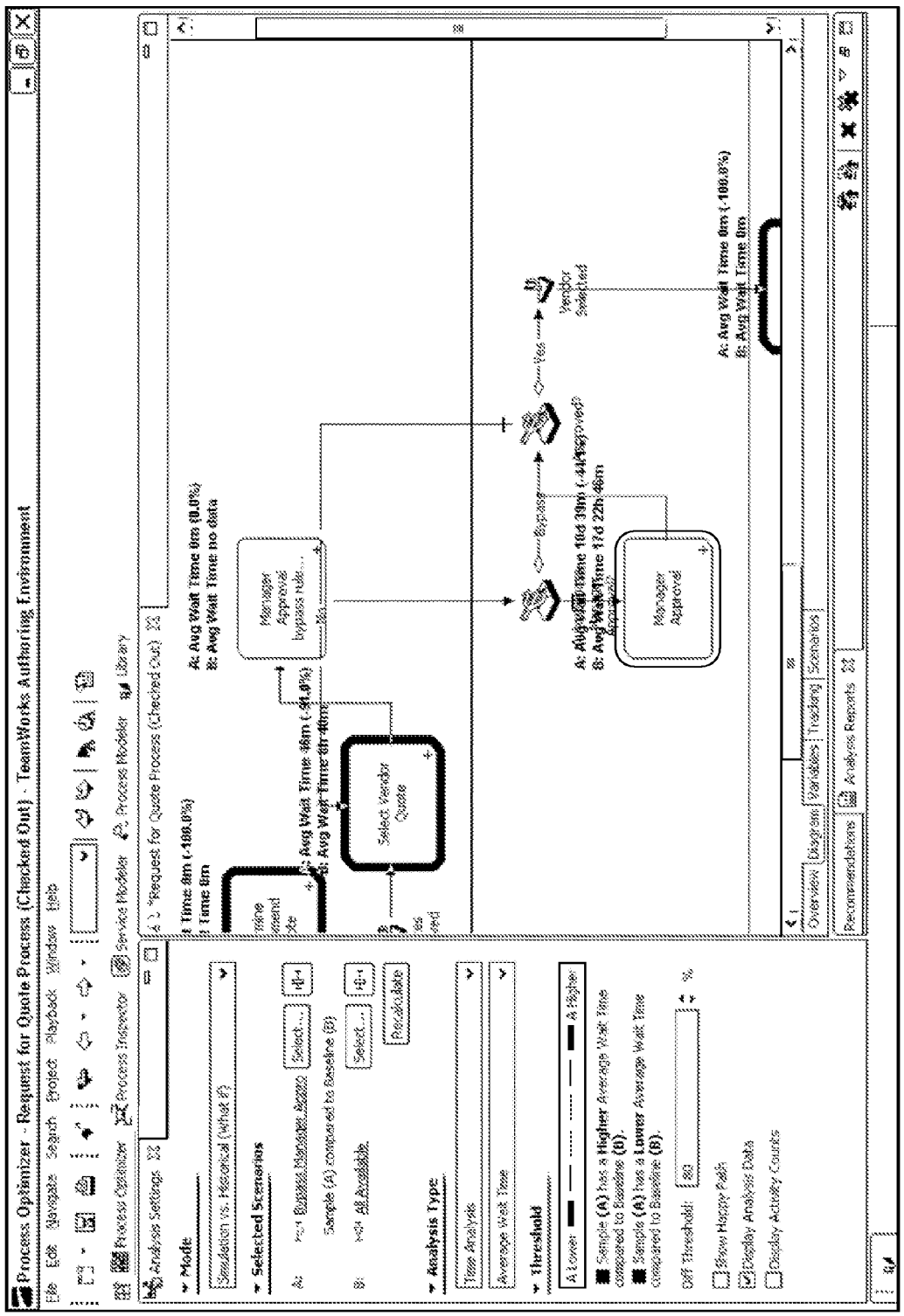

FIGS. 9A and 9B—Exemplary Screen Shots

FIGS. 9A and 9B are exemplary screen shots of the method illustrated in FIG. 8. More specifically, FIGS. 9A and 9B are two exemplary screen shots which show how a user may modify a business process diagram and compare the results. It should be noted that these screen shots are exemplary only and other lay outs, options, and/or graphical indications (among others) are envisioned.

FIG. 9A illustrates an exemplary diagram before user modification. In this case the diagram visually indicates an original business process. FIG. 9B illustrates a modification made to the Figure, e.g., manually by the user, or automatically, possibly using the optimization wizard described in more detail below. As shown, the diagram of FIG. 9B includes graphical indications that compare the original process and the modified process. In this case, the average wait time of the manager approval decreased 44.1% and the average wait time for "select vendor quote" decreased 91%. In this screen shot the corresponding color indications (in blue) visually indicate these differences (illustrated in FIG. 9B using black and outlined in black to indicate degree of blue in the screen shot). Thus, FIGS. 9A and 9B illustrate an exemplary modification and resulting graphical indications indicating differences in characteristics (in this case average wait time) for the original business process and the modified business process.

Figure 10:
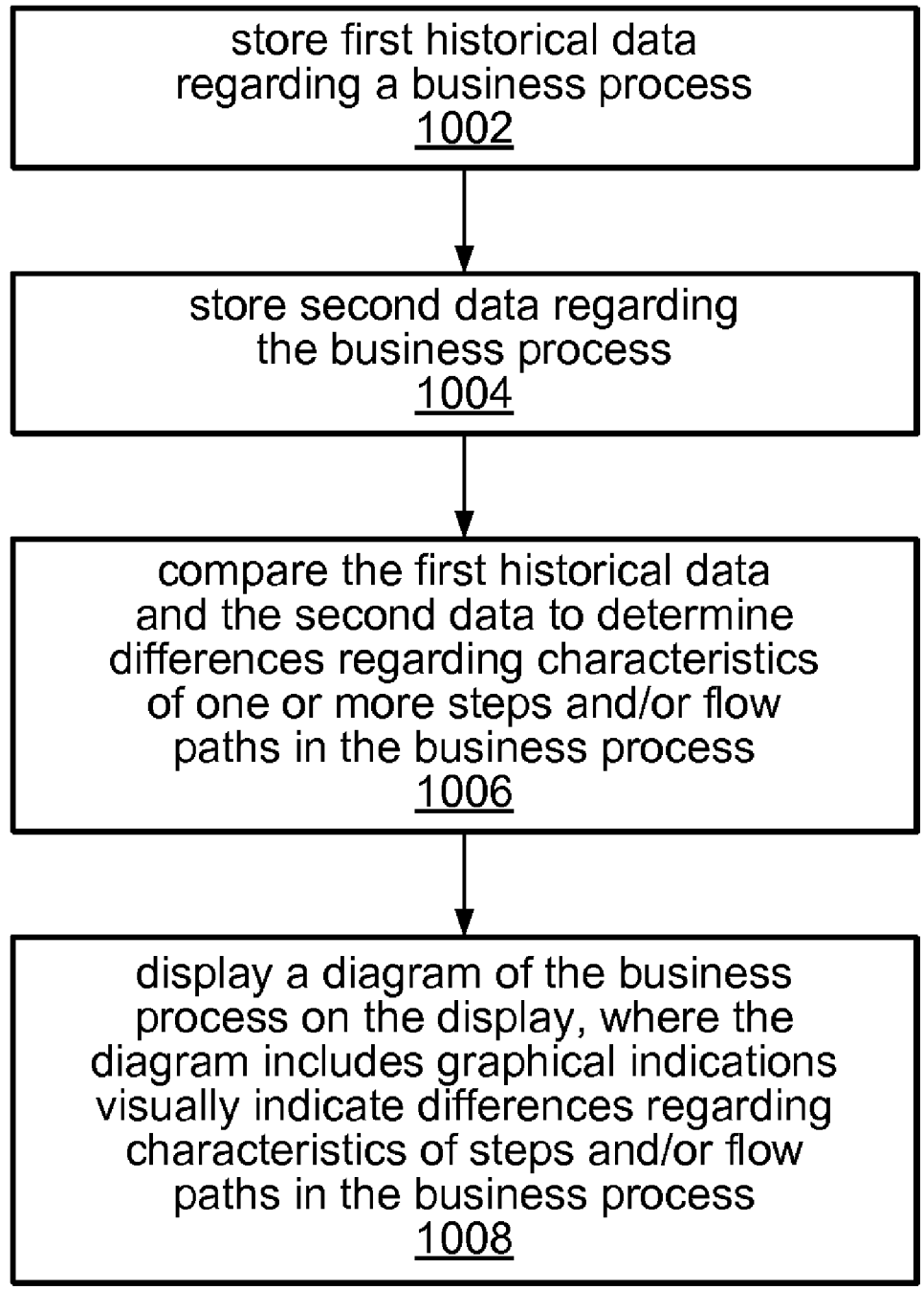
FIG. 10 is a flow chart illustrating one embodiment of a method for displaying information regarding different data sets related to a business process.

FIG. 10—Method for Comparing Data Regarding Different Data Sets

FIG. 10 illustrates a method for displaying information regarding different data sets related to a business process. The method shown in FIG. 10 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1002, first data regarding a business process may be stored/received. The first data may include historical data, simulation data, and/or other data related to the business process. Similar to descriptions above, the data may be received from data stored during execution of a diagram representing a business process. Alternatively, or additionally, the data may be retrieved from external sources such as a database which stores information of the business process. The data may include information regarding the various characteristics described above, among others. Additionally, the data may be retrieved from a time period. As described above, the first data may be received in response to user input, e.g., defining various filters and constraints for the data. Thus, in one embodiment, the user may specify that the first data may be received based on various criteria, e.g., to define a query that may be executed to return the desired information.

In 1004, second data regarding the business process may be stored/received. Similar to above, the second data may include portions of historical information, simulation information, and/or other information related to the business process. In one embodiment, the first data and the second data may both be received from a same store of information (e.g., historical information). Alternatively, or additionally, the second data may be received from simulated data, e.g., from a different process, similar to descriptions above regarding FIGS. 8 and 9. However, the second data is not limited to the types of data described above, and may be any type of data regarding the business process. In other words, the second data may be any type of data that may be usable to compare to the first data, e.g., to analyze/optimize the business process. Similar to above, the second data may include information regarding various ones of the characteristics described above, among others. Additionally, as described above, the second data may be received in response to user input, e.g., defining constraints for the second data from a larger pool of data. However, the first data and second data may also be received automatically.

In some embodiments, the first data may involve data from a first time period, and the second data may involve data from a second time period. For example, the first data may be data for the process in, for example, the month of April, while the second data may be data regarding the process in the month of June. Thus, in some embodiments, the first data may be from a first time period and the second data may be from a second time period.

Alternatively, or additionally, the first data and/or the second data may be filtered according to other characteristics. For example, following the examples above where the business process relates to purchase orders, the first data may relate to orders over 35,000 dollars whereas the second data may relate to orders under 1,000 dollars. In some embodiments, as indicated above, the data may relate to actual data of the business process, and the second data may be simulated data, e.g., of a modified business process, similar to descriptions above regarding FIG. 8. Thus, the first data and the second data may be received from different sources and subject to different criteria, as desired.

In 1006, the first data and the second data may be compared to determine differences regarding (user specified) characteristics of one or more steps and/or flow paths in the business process. In some embodiments, comparing the first data and the second data may involve analyzing the first data and the second data and comparing the results of the analysis. Similar to descriptions above, analyzing the first data and/or the second data may involve calculating averages or inferring various characteristics (such as those described above, among others) in order to analyze the differences between the data. Thus, comparing the data may involve calculating values to be compared for the first data and the second data.

In some embodiments, comparing the data and the second data may involve comparing the characteristics described above. For example, the lengths of times associated with individual steps may be compared between those of the first data and the second data. Following the example above where the first data is from a first period of the business process and the second data is from a second period of the business process, the comparison may be usable to compare the differences in operation of the business process between two different time periods.

In 1008, a diagram of the business process may be displayed, e.g., on a display of a computer system such as those described above, among others. The diagram may include a plurality of interconnected icons where the icons represent steps in the business process and the lines indicate flow paths of the process. The diagram may include graphical indications which visually indicate differences regarding characteristics of steps and/or flow paths in the business process, e.g., based on the comparison performed in 1006. The graphical indications may be presented similar to those described above regarding FIGS. 3-9. For example, the characteristics of the first data (e.g., for the individual steps and/or flow paths of the business process) may be compared to the characteristics of the second data and visually indicated on the diagram, e.g., using color enhancements, gradients of color, etc. Similar to above, the degree of characteristics may be indicated by gradients of color or by multiple colors. For example, red may be used to indicate a negative deviation from the first data while blue may indicate a positive deviation from the first data. Thus, some color enhancements may indicate better behavior/performance using characteristic(s) as a meter and other color enhancements may indicate worser behavior/performance. Following the length of time examples from different time periods (above), blue color enhancements, e.g., around the perimeter of various icons and/or lines, may indicate that less time was required on average for those respective steps/paths (e.g., as compared from the time period of the second data to the time period of the first data), and red color enhancements may indicate that more time was required on average. Thus, the diagram may be displayed and may visually indicate differences between the first data regarding the business process and the second data regarding the business process. The graphical indications may be used to analyze the business process.

FIGS. 11A-11D—Exemplary Screen Shots

FIGS. 11A-11D are exemplary screen shots of the method illustrated in FIG. 10. More specifically, FIGS. 11A-11D are exemplary screen shots which show how a user may compare different data sets related to a business process in a diagram. It should be noted that these screen shots are exemplary only and other lay outs, options, and/or graphical indications (among others) are envisioned.

Figure 11A:
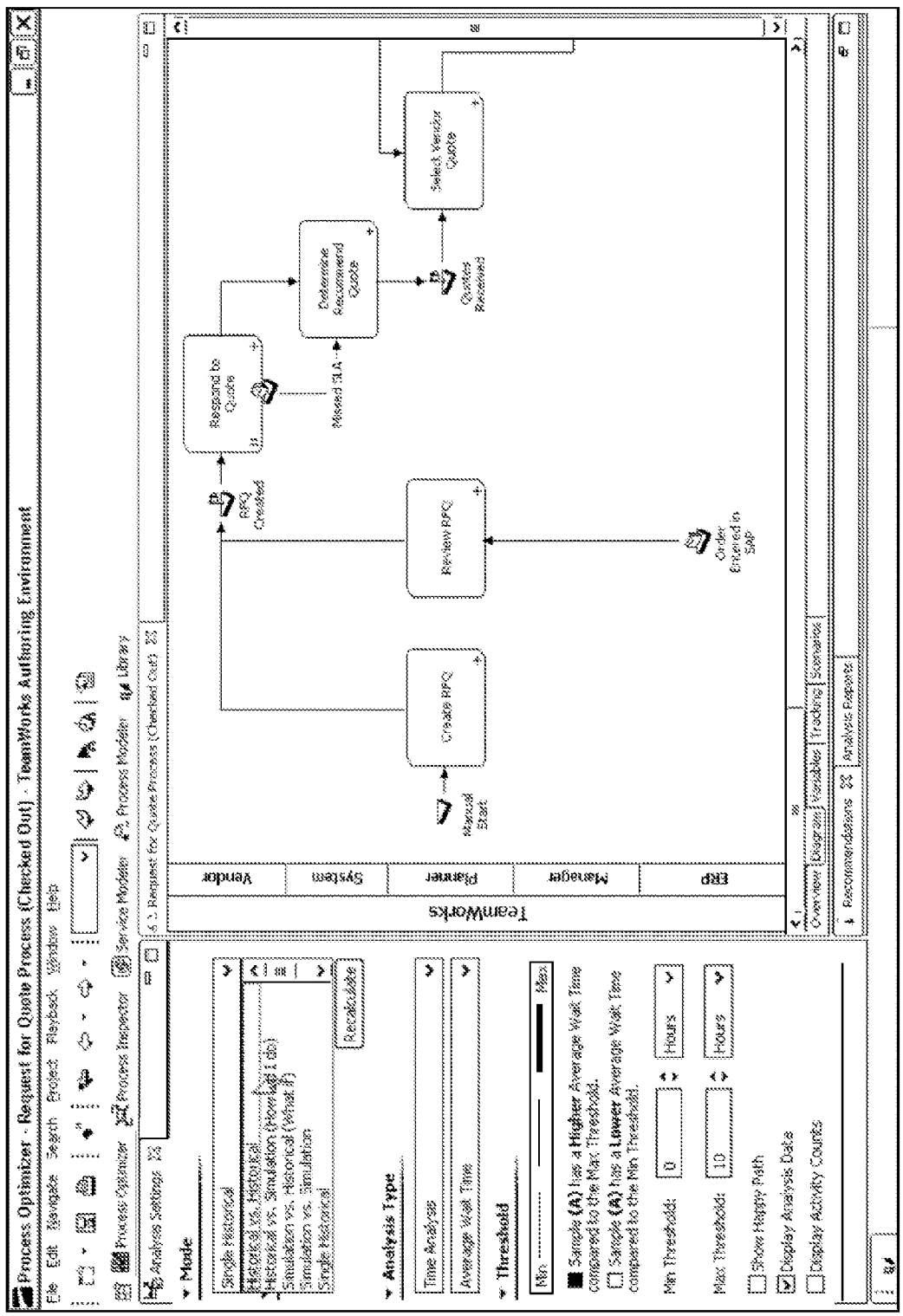
FIGS. 11A-11D are exemplary screen shots illustrating an embodiment of the method illustrated by FIG. 10.
Figure 11B:
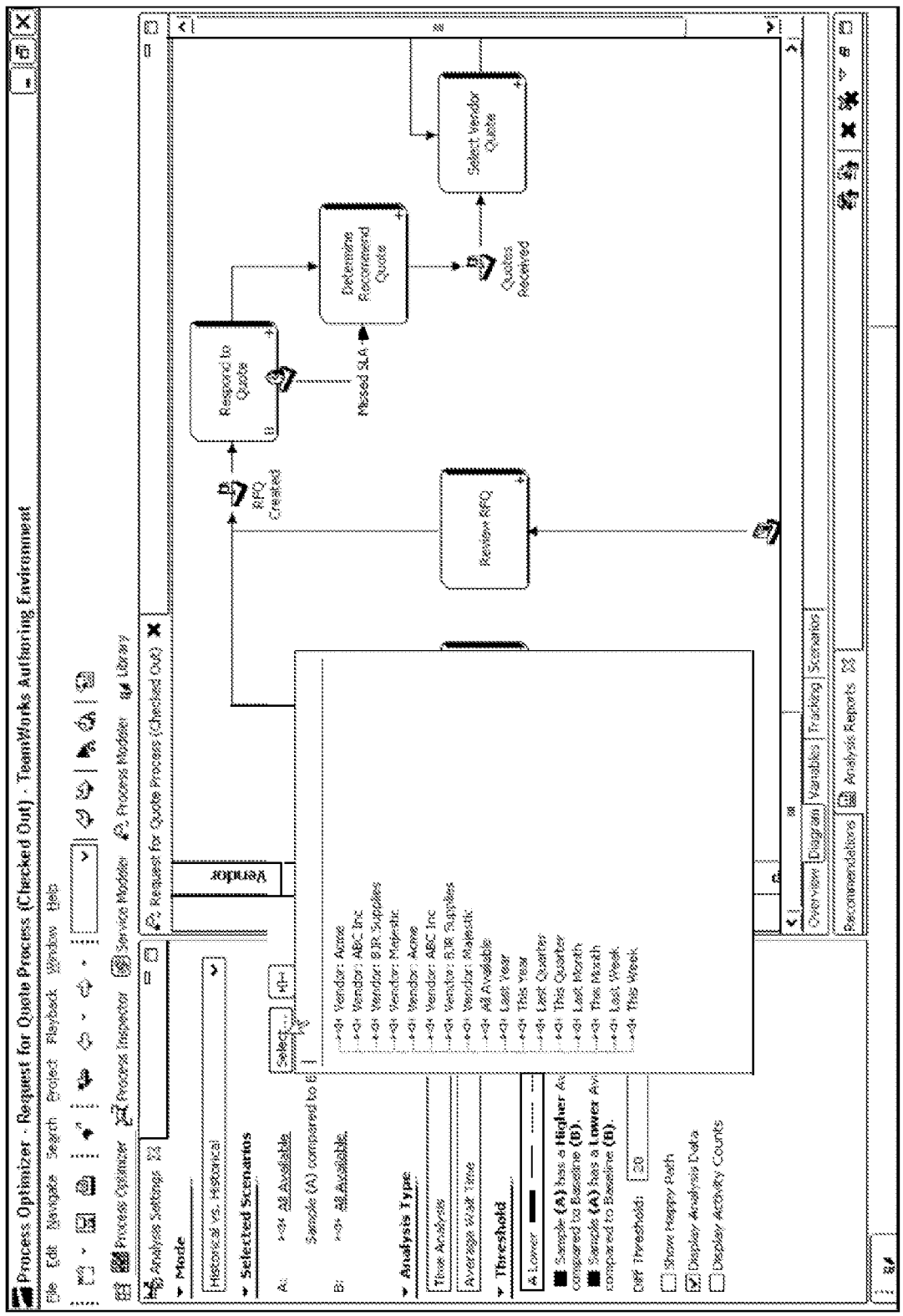
Figure 11C:
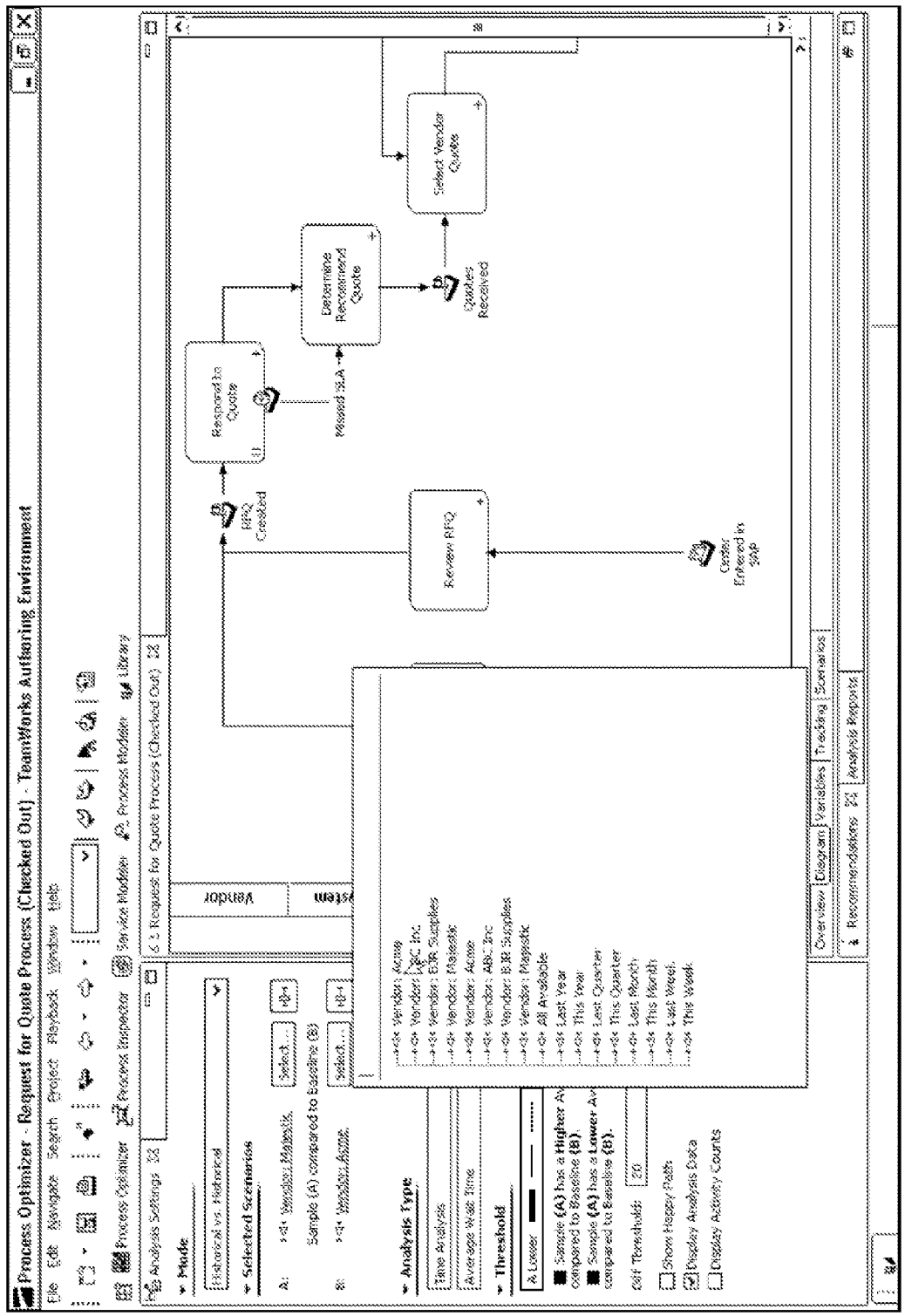

As shown in FIG. 11A, the user may select "Historical vs. Historical" in the mode section of the GUI on the left side. In FIG. 11B, the user may select a scenario. As shown in FIG. 11C, the user has selected "Vendor: Majestic" for scenario A and "Vendor: Acme" for scenario B.

Figure 11D:
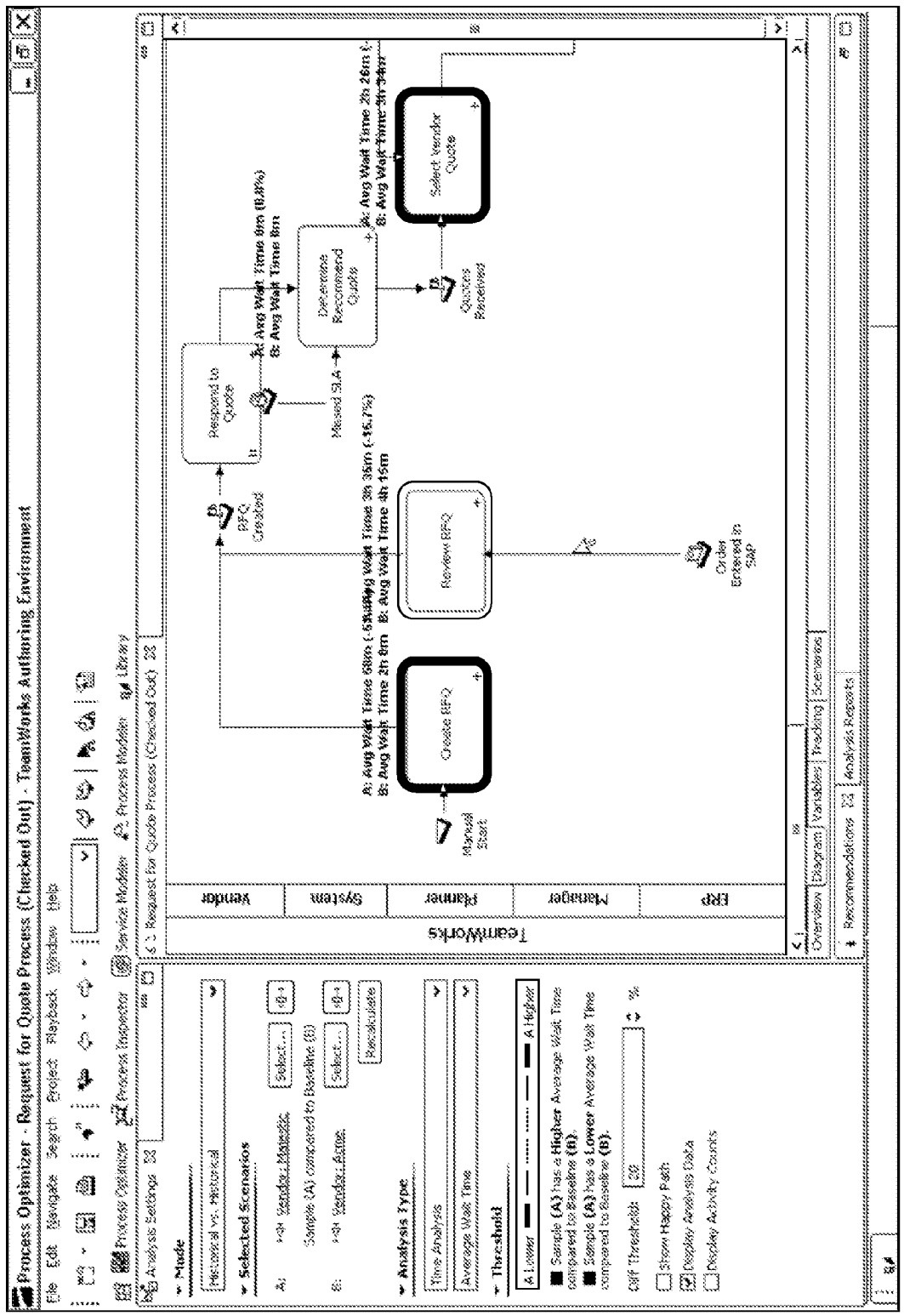

As shown in FIG. 11D, after pressing "recalculate" in the left hand GUI, the graphical indications may indicate the comparison between the chosen scenario A (Majestic) and scenario B (Acme). Similar to the descriptions above regarding FIGS. 8-10, the color indications (in this case, blue indicating that scenario A has a lower average wait time and red indicating scenario A has a higher average) visually indicate that "select vendor quote", "review RFQ", and "create RFQ" all have lower average wait times for scenario A than scenario B. Thus, FIGS. 11A-11D are exemplary screen shots which show how a user may compare different data sets related to a business process in a diagram.

Figure 12:
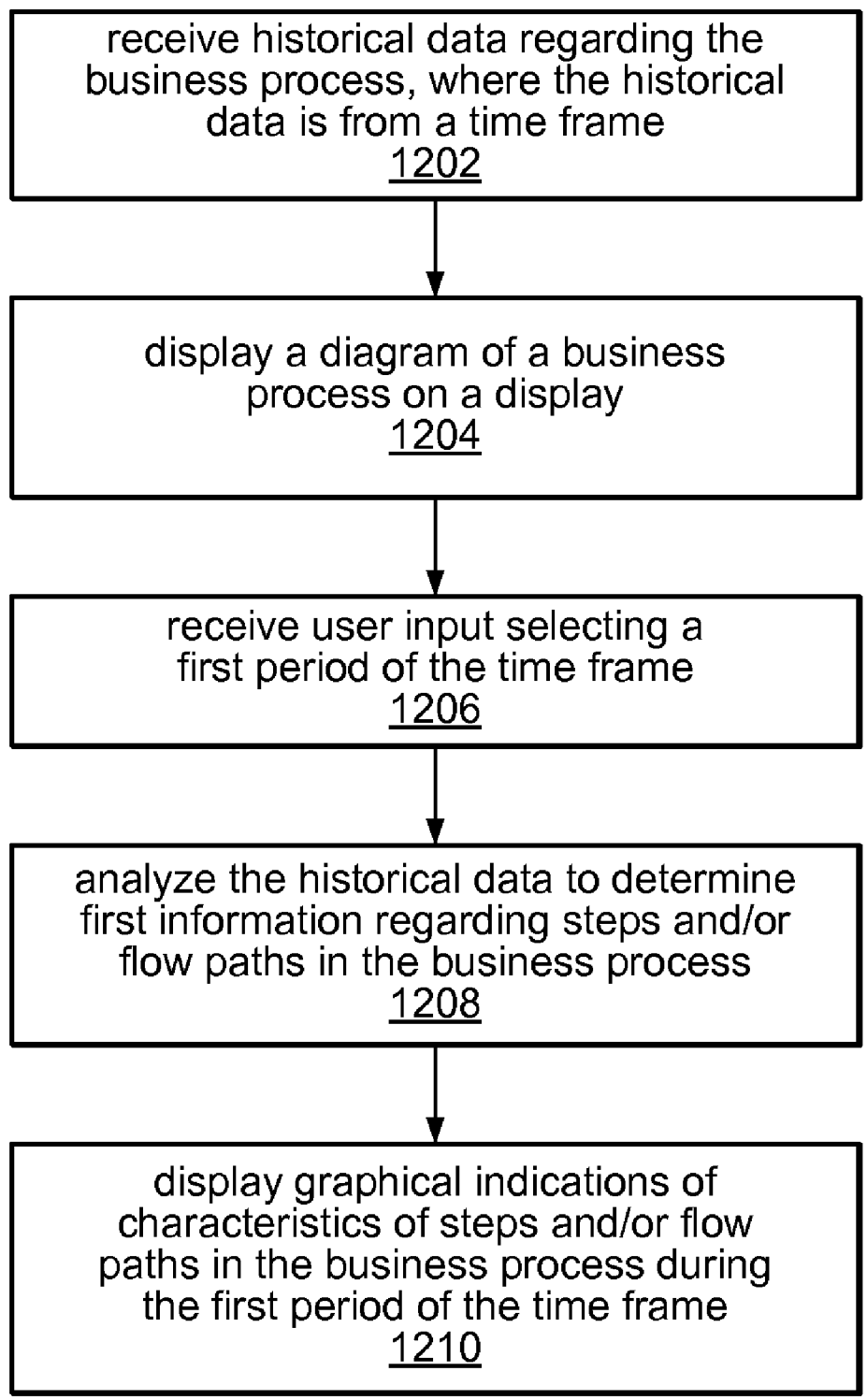
FIG. 12 is a flow chart illustrating one embodiment of a method for displaying information regarding a business process.

FIG. 12—Method for Displaying Information Regarding a Business Process

FIG. 12 illustrates a method for displaying information regarding a business process. More specifically, the method of FIG. 12 allows the user to specify and view different time portions regarding historical information of a business process. The method shown in FIG. 12 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1202, historical data regarding a business process from a time range may be stored. As described above (regarding FIG. 3), the historical data may be received in response to executing a diagram of the business process. Alternatively, the historical data may be retrieved from external sources and stored in a memory medium. The historical data may include information regarding lengths of time (e.g., associated with each of the steps in the process), path traversals (e.g., the specific path that was taken throughout the process), values (business data) of attributes of the steps/paths taken during the process (e.g., waiting/execution activities, number of times path was taken, etc.), count information, and/or other information. As also described above, the historical data may be received in response to user input. As indicated above, the user may specify constraints such that the historical data represents only a portion of the data that may be stored, e.g., in a database on a memory medium coupled to, for example, the server 100. Alternatively, the historical data may be received automatically and may not have been constrained by the user.

The historical data from the time period may include the entirety of the historical data for the business process (i.e., over the time range) or some portion thereof, e.g., as specified by a user. In other words, the time period may include any time period from which the historical data can be received. Receiving the historical data from the time period may result in allowing the user to specify any portion of the time period without requiring retrieval of more information, e.g., from a database. Thus, the historical data may be received from the time period in order to allow a more efficient user interaction (described in more detail below).

In 1204, a diagram of the business process may be displayed, e.g., on a display of the computer systems described above, among others. Similar to the above descriptions regarding FIG. 3, the diagram may be displayed in response to user input. The diagram may include a plurality of icons (e.g., representing steps of the process) that are interconnected by lines (e.g., representing flow paths of the process). As also described above, the diagram may be executable; in other words, the diagram may operate to implement the process visually indicated by the diagram during execution of the diagram. In some embodiments, the user may invoke execution of the diagram by pressing an "execute" or "play" button in the process development environment that may display the diagram. During execution, processes, GUIs, and/or applets (among others) may be invoked as execution flows through each of the icons and lines in the diagram. In other words, upon reaching a specific icon or line during execution of the diagram, processes associated with the icon or line may be executed, e.g., as designed by the user. In some embodiments, these processes may be executed locally or remotely (e.g., on a computer coupled through a network such as the network 125 described above, among others). The diagram may include lanes which indicate performers of the steps of the process. For example, the diagram may include a lane for a computer system such as, for example, the server 100. Correspondingly, the server 100 may perform the steps associated with icons placed in this lane during execution of the diagram.

In 1206, the historical data may be analyzed to determine information regarding steps and/or flow paths in the business process. In some embodiments, the analysis may include receiving/storing a portion of the historical data stored in 1202. The analysis of the historical data (or portion thereof) in

1206 may be similar to the analysis described above in 306 of FIG. 3. In some embodiments, similar to above, the analysis may involve averaging data or inferring information from the historical data, e.g., via calculations. In some embodiments, the historical data may be analyzed to determine the values of the characteristics described above (among others) associated with a subset of the steps and/or flow paths of the business process (represented by the icons and/or lines in the diagram).

Similar to above, the historical data may be analyzed over a plurality of characteristics and time sub-periods of the time period in order to allow the user to specify any sub-portion of the time period without requiring recalculations (e.g., retrieval of more data and/or more analysis of the historical data).

In 1208, user input selecting a first sub-period of the time portion may be received. The user input selecting the first sub-period of time may be received via a plurality of methods. For example, in one embodiment, the user may simply specify a sub-time period textually, e.g., using various text boxes in the diagram development environment. Alternatively, or additionally, the user may manipulate a graphical timeline, e.g., using one or more sliders on the timeline. For example, the user may slide the slider on the timeline (e.g., by dragging and dropping the slider on the timeline) and may thereby select a first sub-period of time. Where one slider is used, the diagram development environment (or other interface to the diagram) may infer or use a default value for the sub-time period around that selected time. More specifically, adjusting the single slider may pinpoint a particular time or may actually correspond to an average time around that particular time. Thus, in one embodiment, the interface to the diagram may automatically assign a range of times in response to the user selecting a single sub-period of time in the time period. In some embodiments, this may be performed by using a default value or by using a percentage of the entire time period. Alternatively, where there are two sliders on the timeline, the time sub-period may be decided based on the position of the two sliders. For example, a first slider may indicate a first end point of the time period and a second slider may indicate a second end point of the time period. Note that the above described embodiments for specifying the first time sub-period are exemplary only and that other methods are envisioned. Additionally, in one embodiment, the user may simply hit a "play" button which begins playback from a specified time sub-period (or a default time period) in the time period.

In 1210, graphical indications may be displayed regarding characteristics of steps and/or flow paths in the business process during the first sub-period of the time period. The graphical indications may be similar to the graphical indications described above regarding FIG. 3. For example, the graphical indications may include color enhancements, e.g., using gradients of colors around the perimeters of the icons and/or lines in the diagram. Thus, graphical indications may be displayed in the diagram which visually indicate characteristics of steps and/or flow paths in the business process. The graphical indications may be usable to analyze the process during the first sub-period of the time period. Note that the graphical indications may be displayed in real time. In other words, in some embodiments, the user may specify the time sub-period, e.g., using the methods described above, among others, and the graphical indications may be displayed substantially at the same time.

In some embodiments 1208 and 1210 (and possibly 1206) may be performed a plurality of times, e.g., to view changes in the characteristics of the business process over time. In some embodiments, performing 1208 and 1210 a plurality of times may not require receiving more data or analyzing the historical data. In other words, the user changing the specified time sub-period in the time period may result in graphical indications being displayed in the diagram without a substantial wait time, e.g., occurring "live". As a specific example, the user may be able to simply drag a slider in the graphical timeline and the diagram may be updated in real time in response to the movement of the slider. As indicated above, in one embodiment, the user may simply press a "play" button and the slider may move along the timeline. Correspondingly, the graphical indications may appear and change in an animated fashion. The graphical timeline may include other controls such as a stop, rewind, fast forward, and/or pause buttons.

Note that the embodiments described above with regard to historical data may be performed with simulated data. For example, the graphical timeline may be used with simulated data of a business process instead of or in conjunction with the historical data received in 1202.

Additionally, similar to above, in some embodiments, the user may be able to select two different time sub-periods in the time period, e.g., using a one or two graphical timeliness For example, in one embodiment, the user may load two different scenarios, e.g., corresponding to different filters (e.g., time periods, vendor names, price range, etc.) of the business process, and two graphical timelines may be displayed for the different scenarios. In this example, the user may manipulate the timelines independently, and the diagram may include graphical indications indicating the differences of steps and/or flow paths in the diagram (similar to the graphical indications described above with regard to FIGS. 8-11).

FIGS. 13A-13J—Exemplary Screen Shots

FIGS. 13A-13J are exemplary screen shots of the method illustrated in FIG. 12. More specifically, FIGS. 13A-13J are exemplary screen shots which show how a user may specify and view different time portions regarding historical information of a business process. It should be noted that these screen shots are exemplary only and other lay outs, options, and/or graphical indications (among others) are envisioned.

Figure 13A:
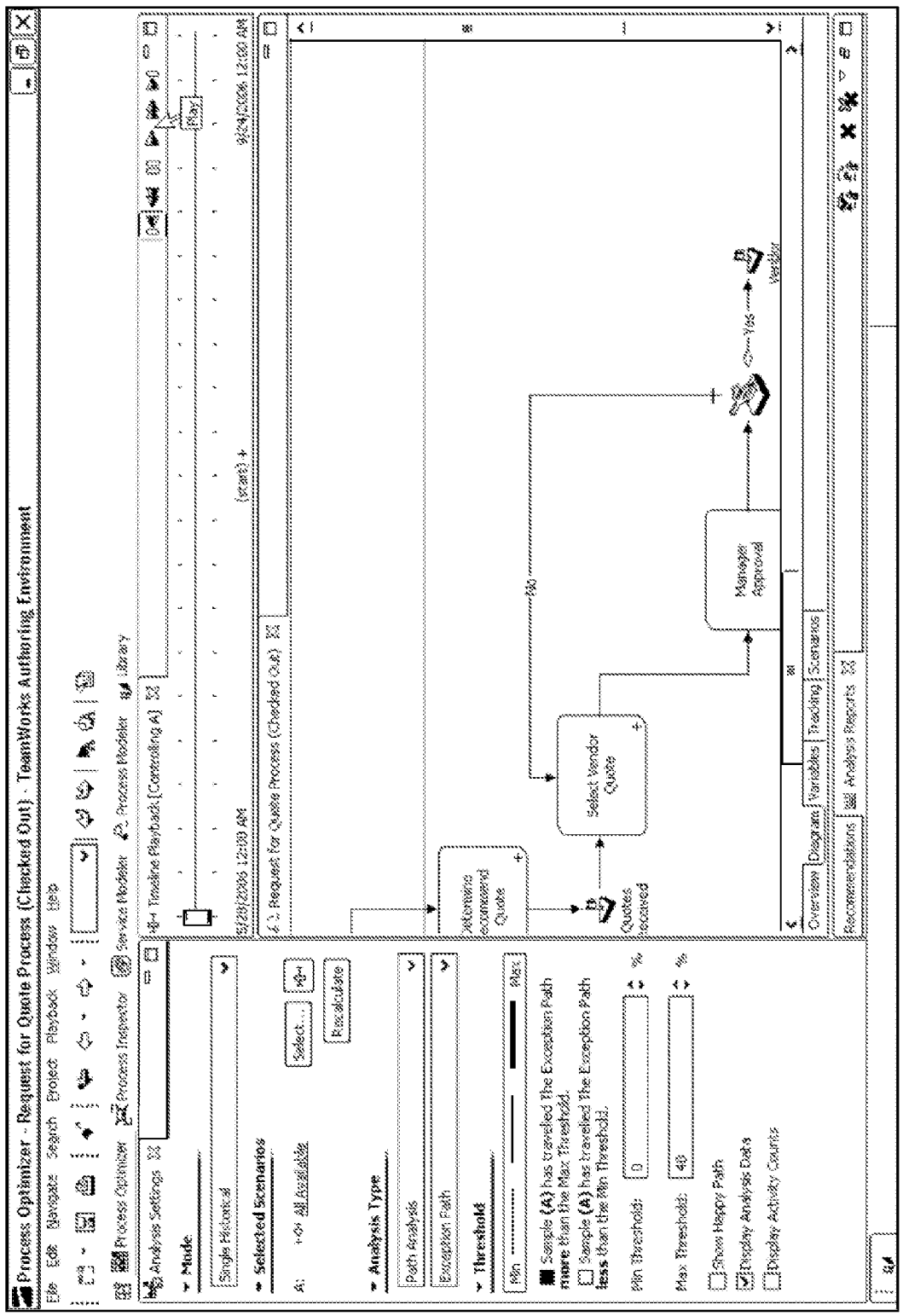
FIGS. 13A-13J are exemplary screen shots illustrating an embodiment of the method illustrated by FIG. 12.

As shown in FIG. 13A, a graphical timeline is displayed in the top portion of the GUI. As described above, the user may drag the slider in the graphical timeline or may use the transport in the Figure (including the rewind, pause, play, and fast forward buttons) to view changes in the path analysis over time. In this particular instance, the user has selected play. Note that the user could alternatively manually change the graphical timeline to achieve similar results. Thus, in the first time frame (May 28, 2006, 12:00 AM) no path has followed an exception pathway.

Figure 13B:
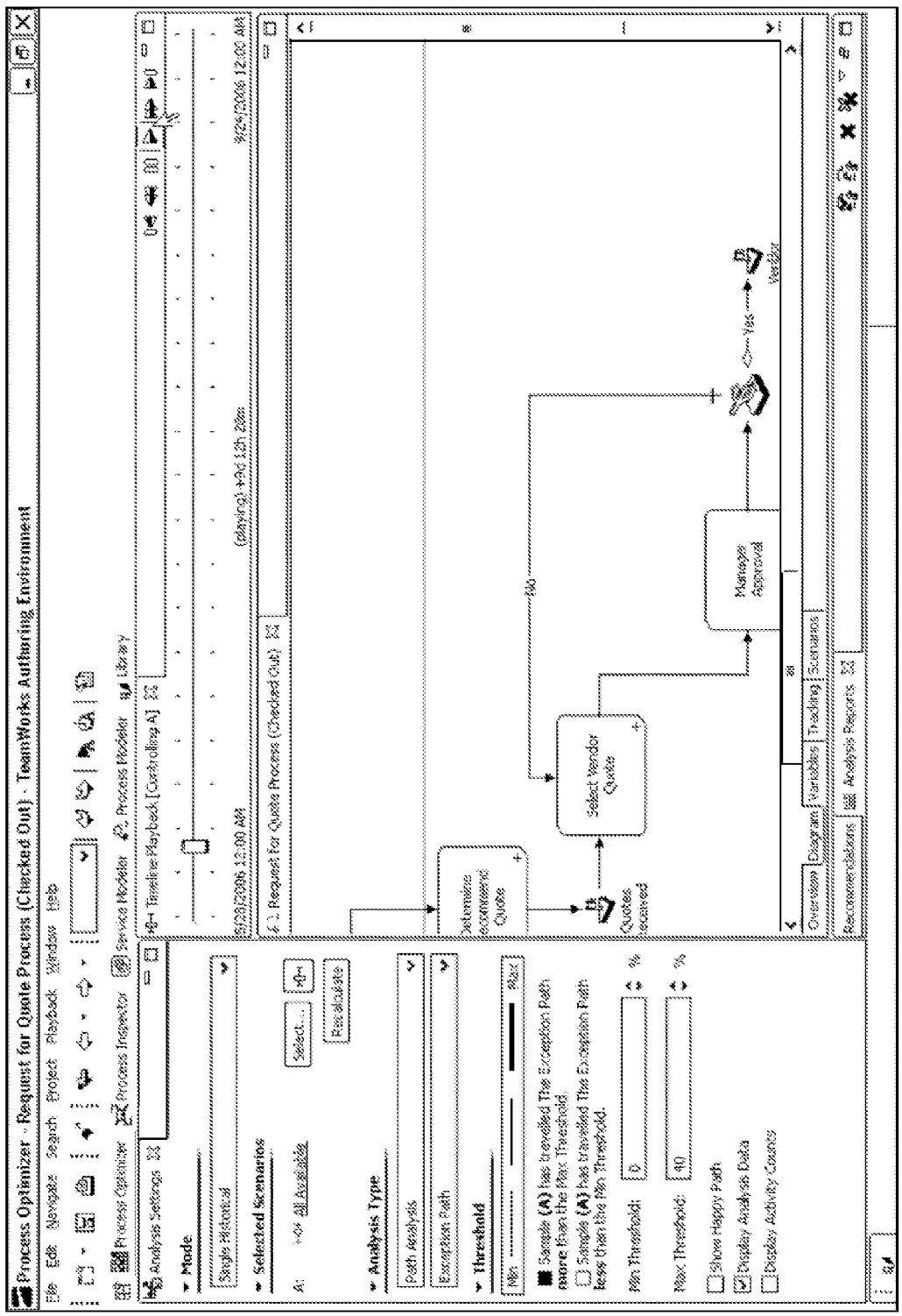

As shown in FIG. 13B, at +9 days, 12 hour, and 28 minutes, no exception path is visually indicated, indicating that no path has followed an exception pathway.

Figure 13C:
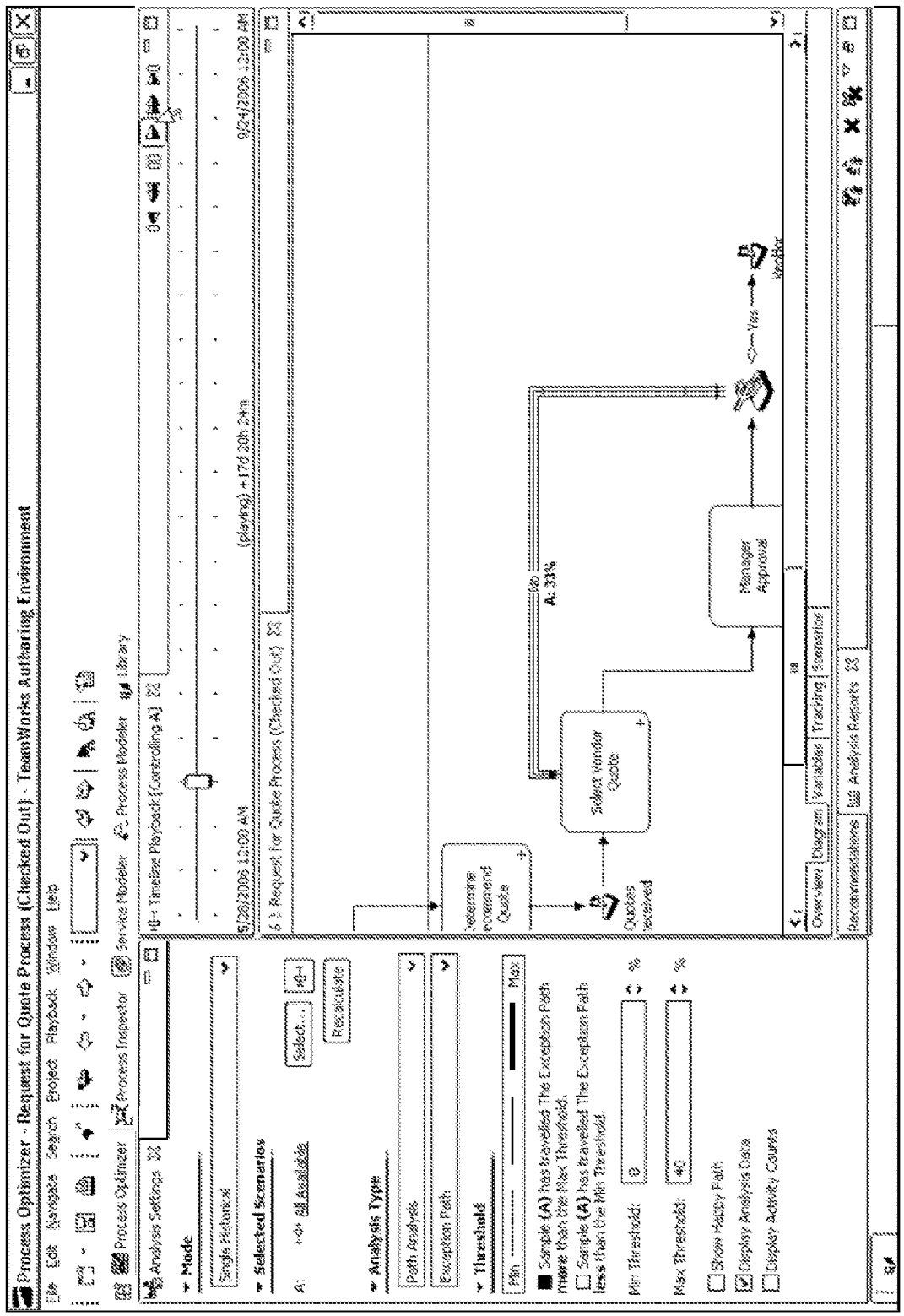

As shown in FIG. 13C, at +17 days, 20 hours, 24 minutes, the exception pathway between "approved?" and "select vendor quote" has been followed 33% and is indicated in a pink highlight in the screen shot (shown as an outlined black in the Figure).

Figure 13D:
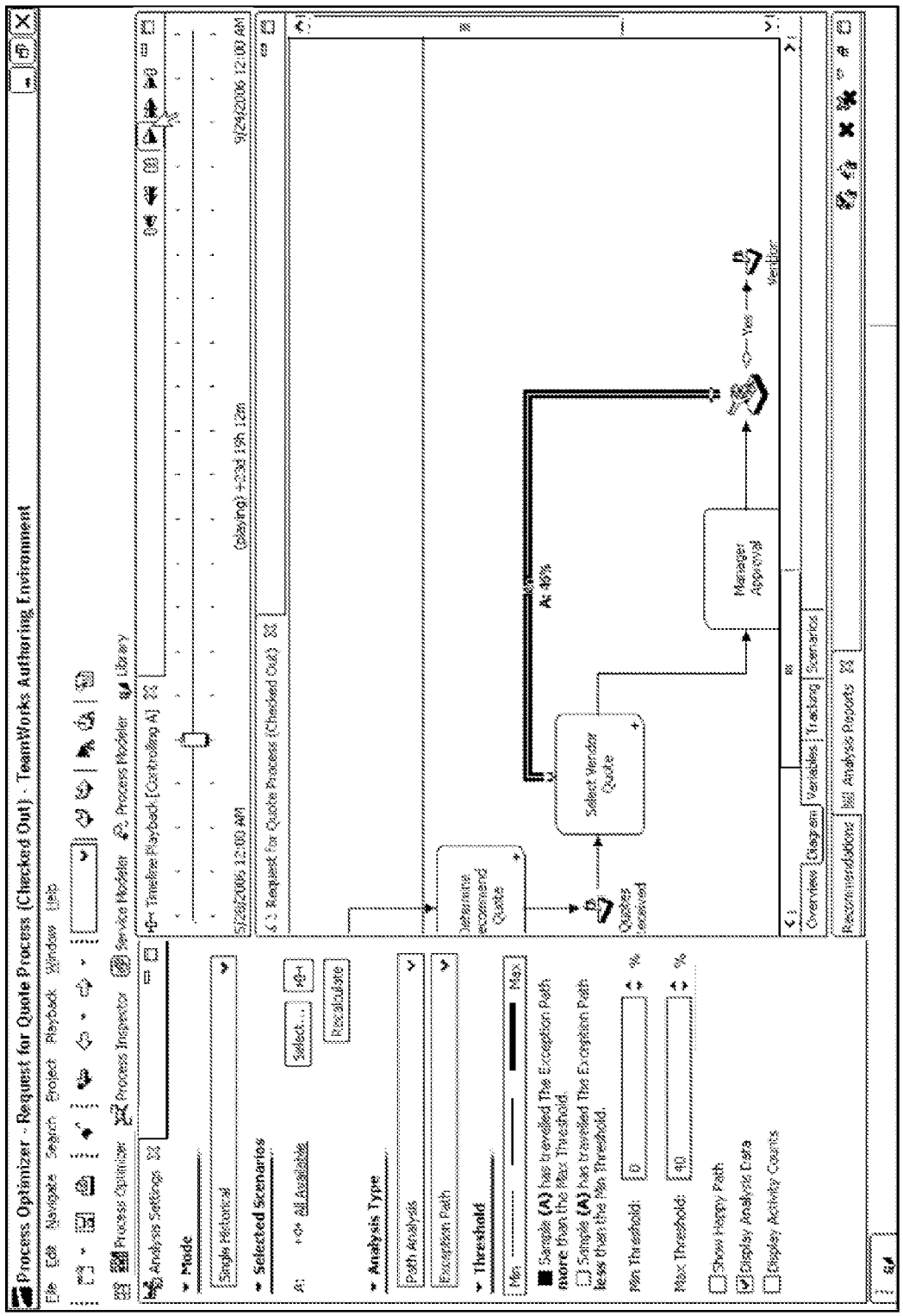

As shown in FIG. 13D, at +23 days, 19 hours, and 12 minutes, the exception pathway between "approved?" and "select vendor quote" has been followed 45% and is indicated in a dark red highlight in the screen shot (shown as an shaded black in the Figure).

Figure 13E:
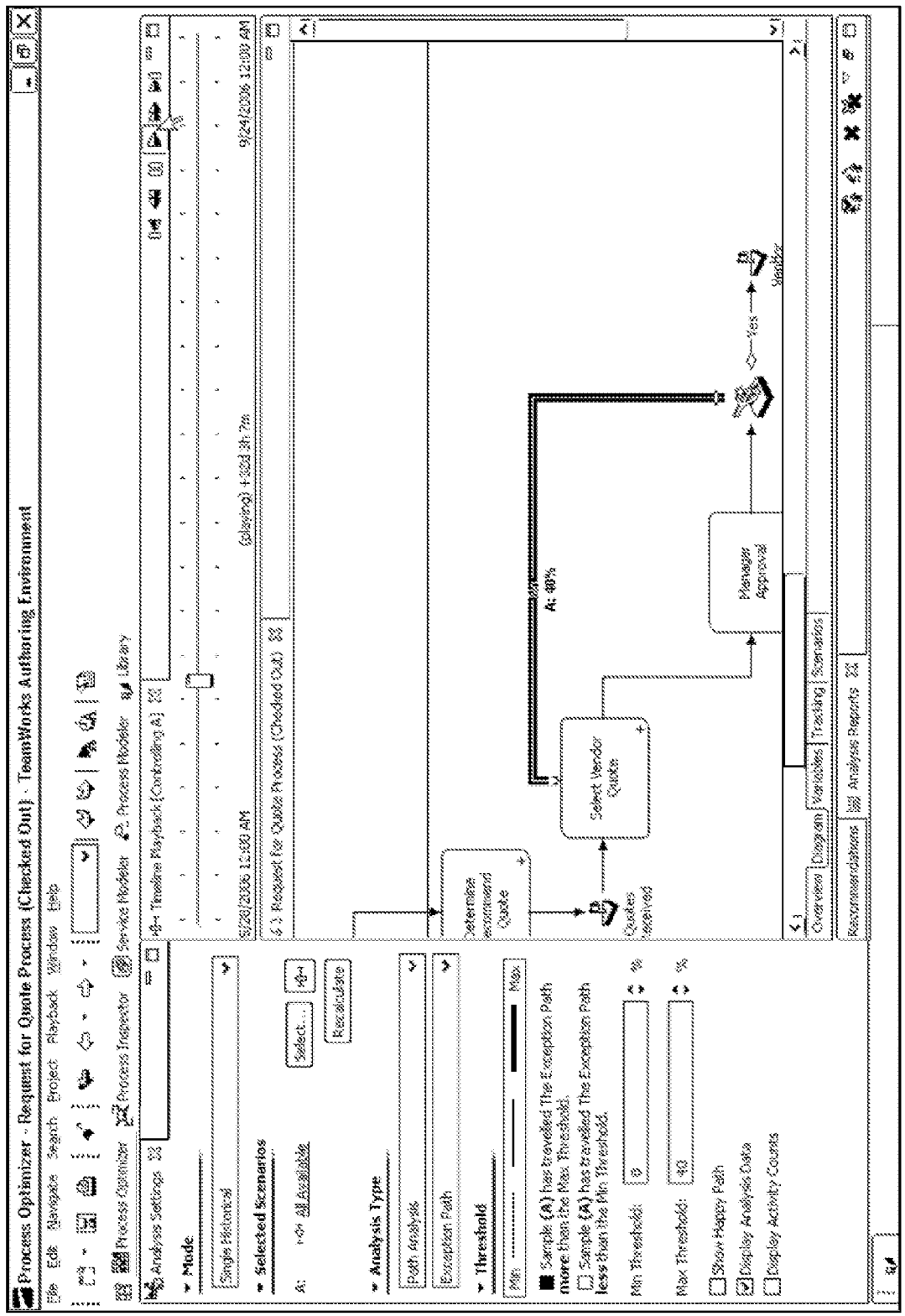

As shown in FIG. 13E, at +32 days, 3 hours, and 7 minutes, the exception pathway between "approved?" and "select vendor quote" has been followed 40% and is indicated in a dark red highlight in the screen shot (shown as an shaded black in the Figure).

Figure 13F:
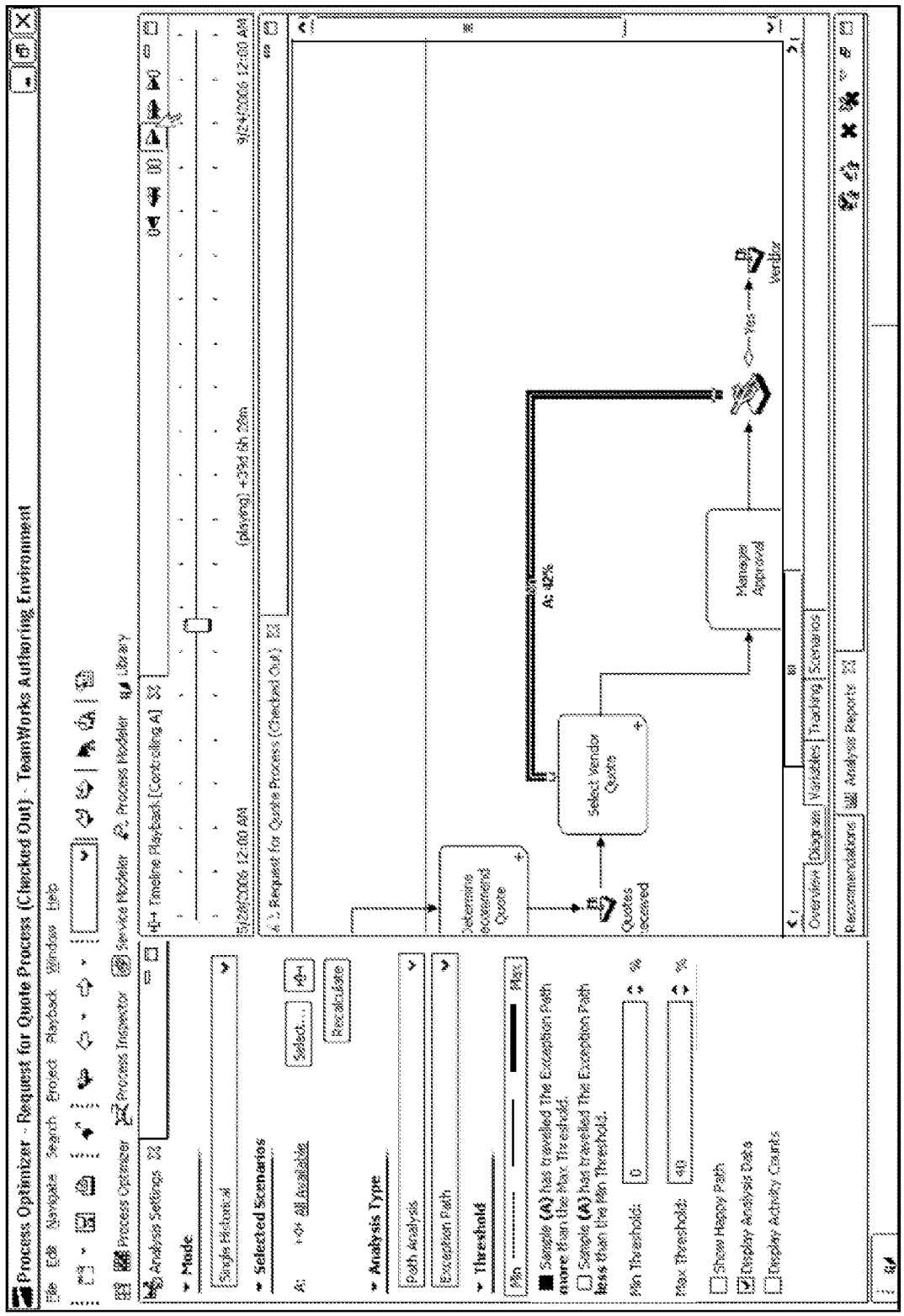

As shown in FIG. 13F, at +39 days, 6 hours, and 28 minutes, the exception pathway between "approved?" and "select vendor quote" has been followed 42% and is indicated in a dark red highlight in the screen shot (shown as an shaded black in the Figure).

Figure 13G:
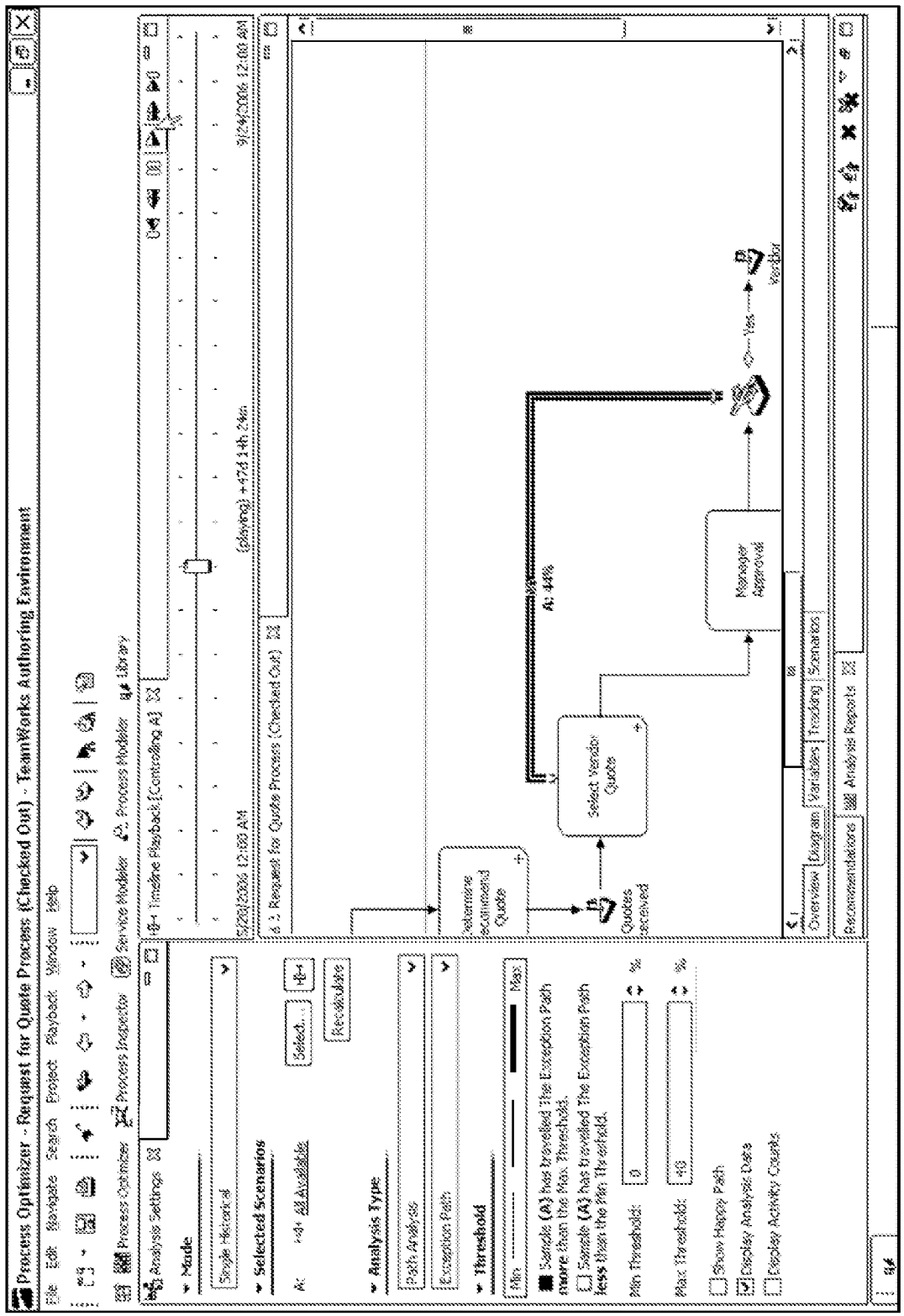

As shown in FIG. 13G, at +47 days, 14 hours, and 24 minutes, the exception pathway between "approved?" and "select vendor quote" has been followed 44% and is indicated in a dark red highlight in the screen shot (shown as an shaded black in the Figure).

Figure 13H:
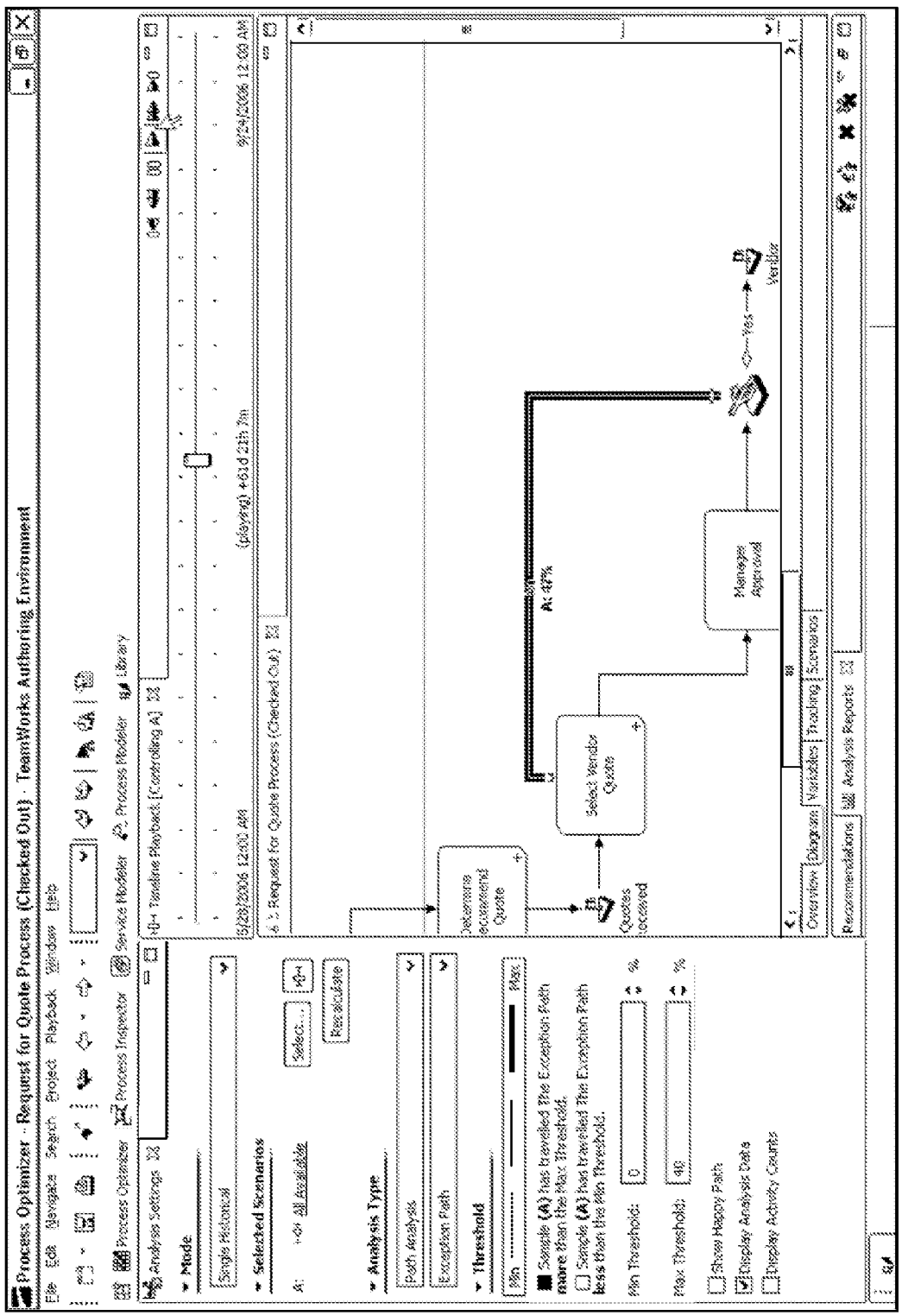

As shown in FIG. 13H, at +61 days, 21 hours, and 7 minutes, the exception pathway between "approved?" and "select vendor quote" has been followed 47% and is indicated in a dark red highlight in the screen shot (shown as an shaded black in the Figure).

Figure 13I:
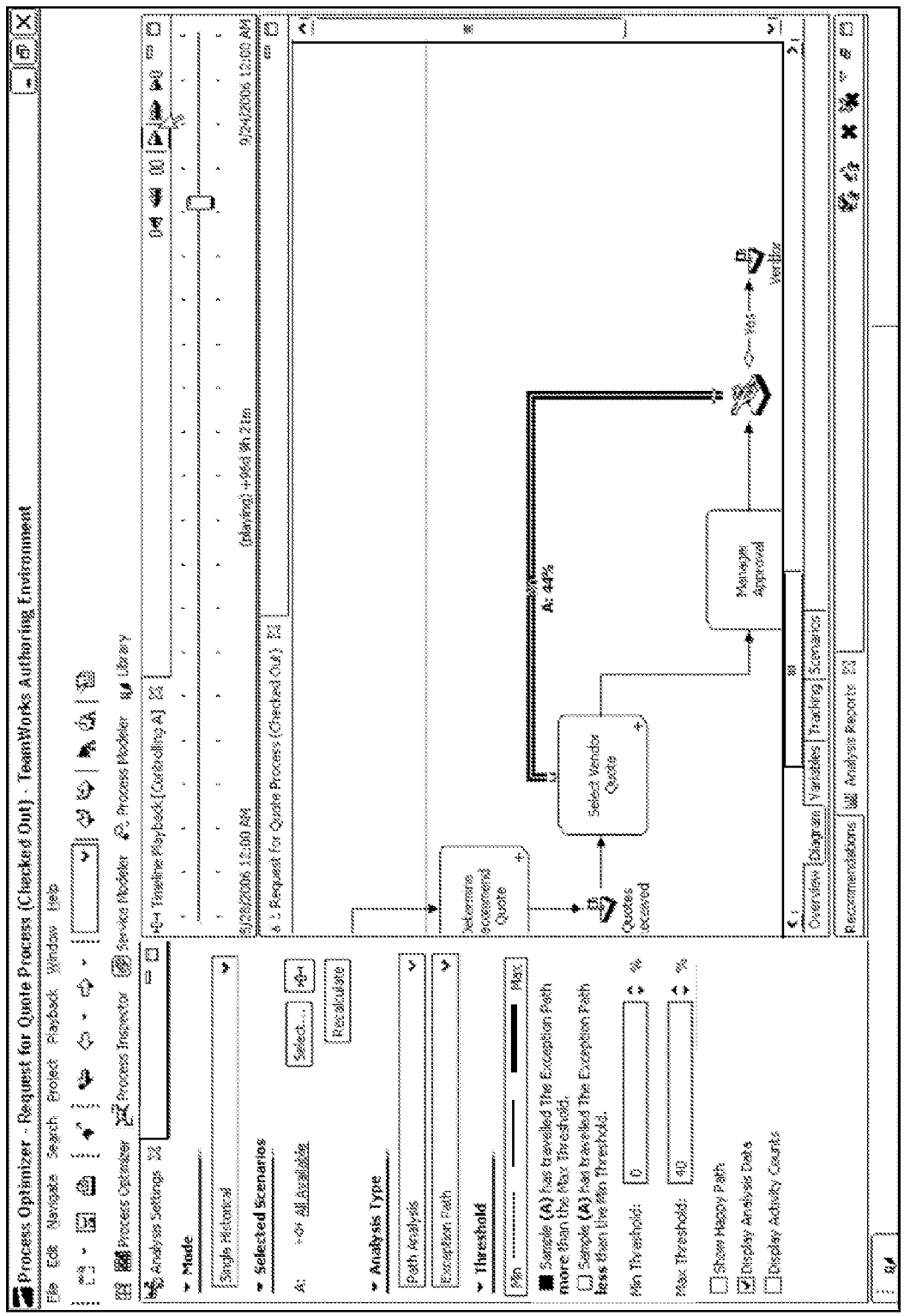

As shown in FIG. 13I, at +96 days, 9 hours, and 21 minutes, the exception pathway between "approved?" and "select vendor quote" has been followed 44% and is indicated in a dark red highlight in the screen shot (shown as an shaded black in the Figure).

Figure 13J:
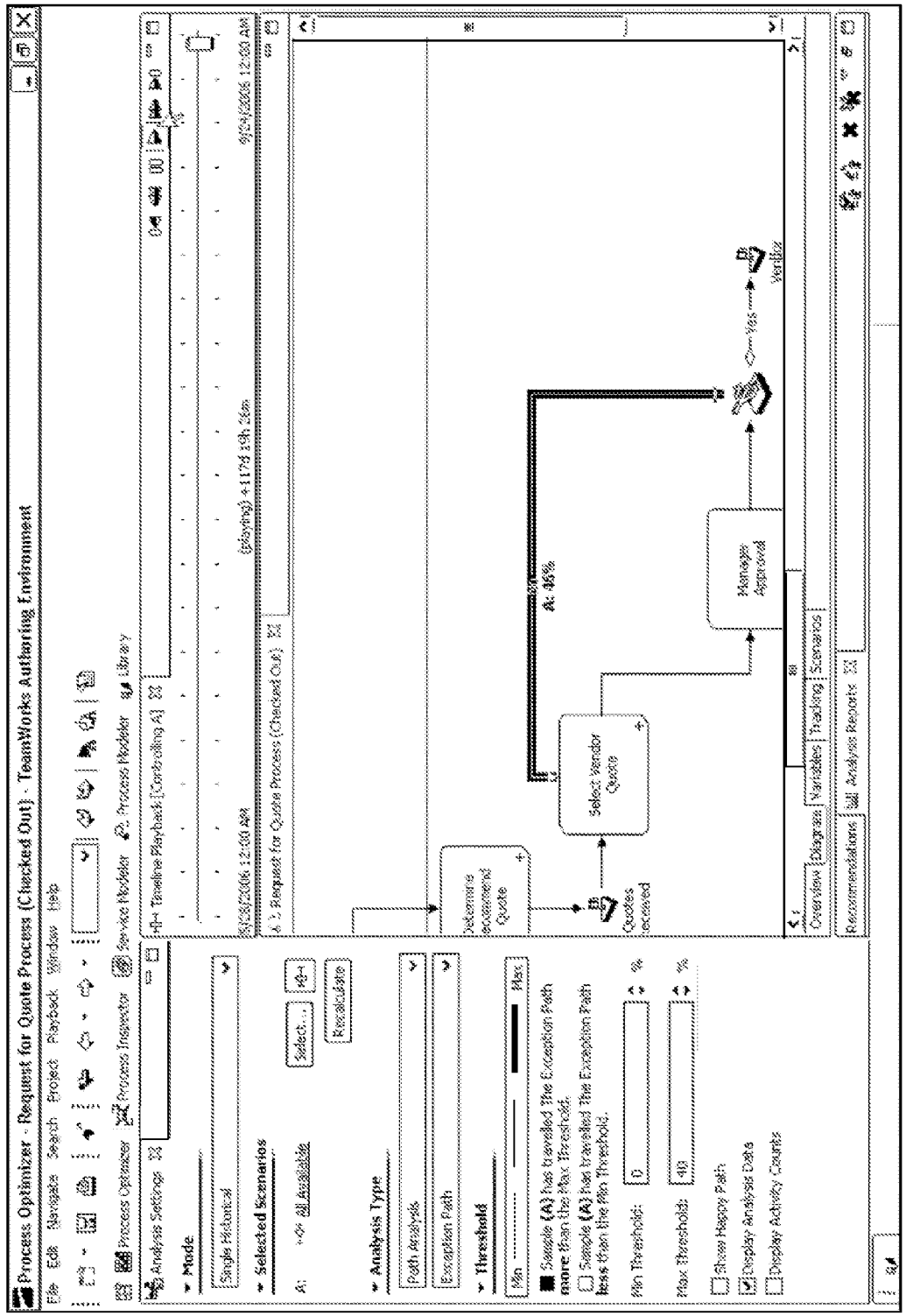

As shown in FIG. 13J, at +117 days, 19 hours, and 26 minutes, the exception pathway between "approved?" and "select vendor quote" has been followed 45% and is indicated in a dark red highlight in the screen shot (shown as an shaded black in the Figure).

Thus, FIGS. 13A-13J illustrate one embodiment of a method which allows a user to specify and view different time portions regarding historical information of a business process.

Figure 14:
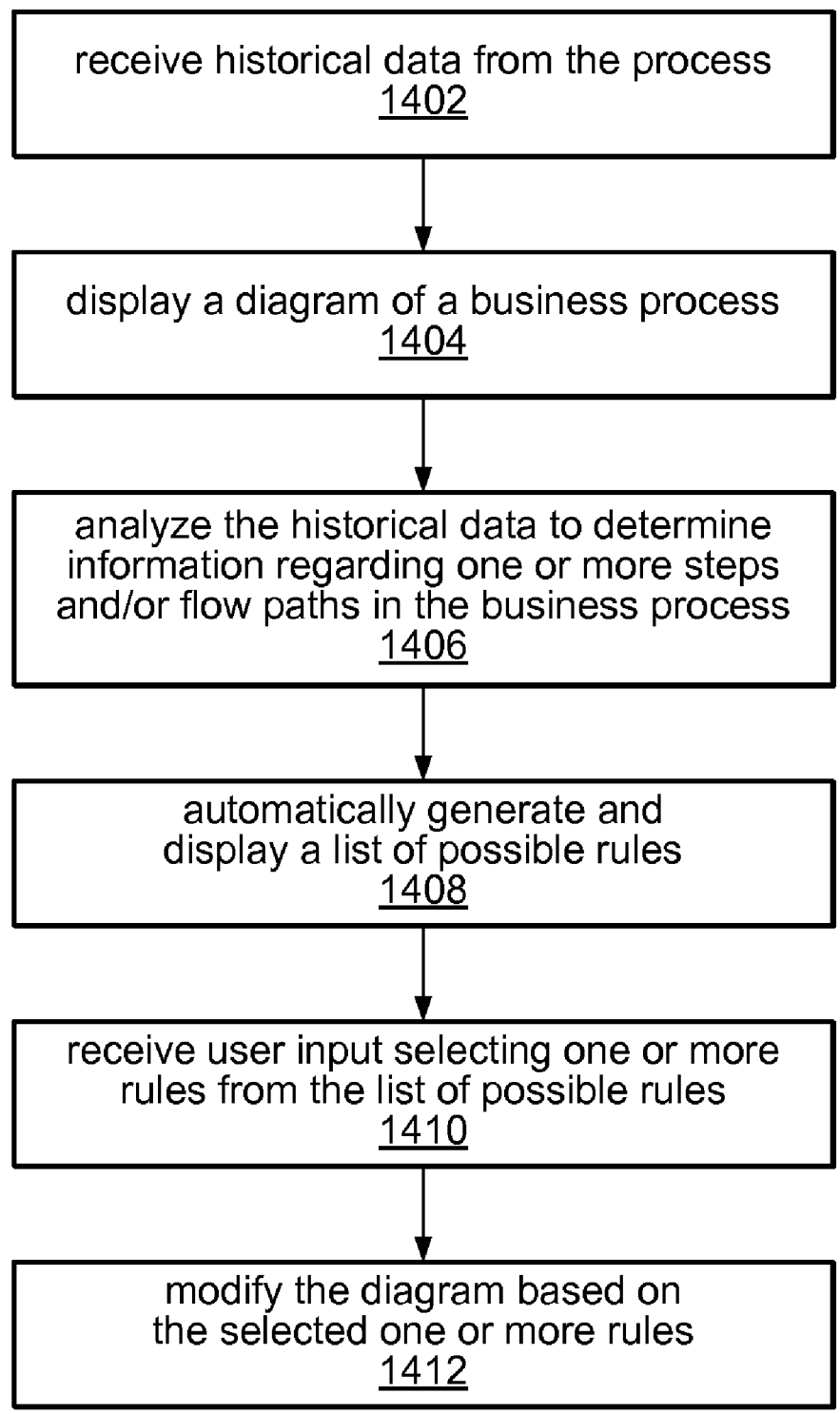
FIGS. 14 and 14A are flow charts illustrating embodiments of a method for guided optimization of a business process.

FIG. 14—Method for Guided Optimization of a Business Process

FIG. 14 illustrates a method for guided optimization of a business process. More specifically, the method of FIG. 14 allows the user to optimize a business process. FIG. 14 may provide one embodiment usable to modify the diagram in response to user input. Said another way, the method of FIG. 14 may be used in conjunction with 808 of the method illustrated in FIG. 8. The method shown in FIG. 14 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1404, historical data from the business process may be received/stored. As described above (regarding FIG. 3), the historical data may be stored in response to executing the diagram displayed in 1402. Alternatively, the historical data may be retrieved from external sources and stored in a memory medium. The historical data may include information regarding lengths of time (e.g., associated with each of the steps in the process), path traversals (e.g., the specific path that was taken throughout the process), values (business information) of attributes of the steps/paths taken during the process (e.g., waiting/execution activities, number of times path was taken, etc.), count information, and/or other information. As also described above, the historical data may be received in response to user input. As indicated above, the user may specify constraints such that the historical data represents only a portion of the data that may be stored, e.g., in a database on a memory medium coupled to, for example, the server 100. Alternatively, the historical data may be received automatically and may not have been constrained by the user.

In 1402, a diagram of the business process may be displayed, e.g., on a display of one or more of the computer systems described above, among others. a diagram of a business process may be displayed, e.g., on a display of the computer systems described above, among others. Similar the above descriptions regarding FIG. 3, the diagram may be displayed in response to user input. The diagram may include a plurality of icons (e.g., representing steps of the process) that are interconnected by lines (e.g., representing flow paths of the process). As also described above, the diagram may be executable; in other words, the diagram may operate to implement the process visually indicated by the diagram during execution of the diagram. In some embodiments, the user may invoke execution of the diagram by pressing an "execute" or "play" button in the process development environment that may display the diagram. During execution, processes, GUIs, and/or applets (among others) may be invoked as execution flows through each of the icons and lines in the diagram. In other words, upon reaching a specific icon or line during execution of the diagram, processes associated with the icon or line may be executed, e.g., as designed by the user. In some embodiments, these processes may be executed locally or remotely (e.g., on a computer coupled through a network such as the network 125 described above, among others. The diagram may include lanes which indicate performers of the steps of the process. For example, the diagram may include a lane for a computer system such as, for example, the server 100. Correspondingly, the server 100 may perform the steps associated with icons placed in this lane during execution of the diagram.

In 1406, the historical data may be analyzed to determine information regarding one or more steps and/or flow paths in the business process. The analysis of the historical data in 1406 may be similar to the analysis described above in 306 of FIG. 3. For example, the analysis may include receiving/storing a portion of the historical data stored in 1402. Additionally, in some embodiments, similar to above, the analysis may involve averaging data or inferring information from the historical data, e.g., via calculations. In some embodiments, the historical data may be analyzed to determine the values of the characteristics described above (among others) associated with a subset of the steps and/or flow paths of the business process (represented by the icons and/or lines in the diagram).

Analyzing the historical data may include building a decision tree based on the historical data. For example, each step and/or flow path in the process may have associated data in the historical data. This information may be separated and fed into a decision tree builder which may analyze information in the historical data regarding that particular step/flow path. Upon passing this parsed/analyzed information into the decision tree builder, a decision tree may be made. In some embodiments, the decision tree may include a plurality of nodes, and each node in the decision tree may represent a question that can be asked of a set of input variables. Child nodes of the nodes may represent possible answers to the question and may be used to generate correlations (described in more detail below).

In some embodiments, the analysis may include determining which steps or flow paths require optimization. In one embodiment, the analysis may determine the steps and/or paths that on average take the longest amount of time (or just has the highest value of time), has a high amount of business cost, and/or are most often excepted (e.g., paths which follow the exception path more than others), as well as other characteristics/attributes that might require optimization.

Additionally, or alternatively, the analysis may be used to display graphical indications similar to the methods described above. In response to viewing the diagram with the graphical indications the user may be able to select individual steps and/or paths in the process for optimization. Thus, various (or possibly all of the) steps and/or paths may be selected (e.g., by the user or automatically) for optimization.

In some embodiments, an optimization GUI or series of GUIs may be executed, e.g., in response to user input, in order to guide the user through possible modifications to the diagram in order to optimize the process. This series of GUIs may act as a "wizard" for guiding the user through the optimization. An exemplary wizard is illustrated in FIGS. 15A-15G and described below. In some embodiments, the wizard may allow the user to select different types of modifications that may be analyzed and generated for the user. For example, in a first GUI of the wizard, the user may select various variables in the process that should be optimized as well as a threshold for confidence. Confidence may refer to probabilities associated with modifications to the process. For example, confidence may describe how often a particular rule, or step bypass might have produced the same outcome as the historical data.

The first GUI may also allow the user to specify how complex the rules/modifications to the diagram can be as well as allowing the user to select which variables should be considered for optimizing various steps/flow paths in the process. Upon entering this information (or portions thereof), the analysis of 1406 or a further analysis (among others) may be performed in order to correlate information in the historical process. For example, in a diagram that includes a manual step, e.g., approval of a purchase order by a manager, the calculated correlations may be used to bypass the approval step by the manager in order to streamline the process. For example, the analysis may reveal that when purchase orders are within a given price range (e.g., 1500-2000 dollars) and are from a particular client (e.g., Wal-Mart), the purchase order is always approved. Other correlations may be calculated related to any of the information stored in the historical data, the analysis of the historical data, and/or the characteristics of the steps and/or flow paths of the process (among others).

Note that the above embodiments where the user interacts with the GUIs/wizard to optimize the process are exemplary only, and that other methods for optimizing are envisioned. For example, the user could interact via textual methods, and/or various ones of the steps described above may be performed automatically and/or according to various default processes/values.

In 1408, a list of possible modifications may be automatically generated and displayed. As indicated above, the list of possible modifications may be automatically generated and displayed in response to input specifying steps and/or paths in the process to be optimized. Additionally, or alternatively, the list of possible modifications may be displayed in response to user input specifying which characteristics and/or attributes of the steps and/or paths in the process should be optimized, e.g., using the wizard described above. In some embodiments, the list of possible rules may be displayed after the user has interacted with a series of GUIs for specifying the types of rules/optimizations that should be generated and displayed. In other words, the list of possible modifications may be displayed in a GUI in the wizard.

In one embodiment, the list of possible modifications may be presented as a list of correlations or possible rules with confidences which may then be used to modify the diagram. For example, the list of possible modifications may only indicate facts (or inferred facts) regarding the process. More specifically, the list of possible indications may indicate confidence of the list of possible modifications. In other words, the list of possible modifications may indicate what percentage of time a particular outcome resulted from a particular set of inputs. As a specific example, the modifications may list that approval of an order occurred, for example, 84% of the time when a specific list of conditions were met (e.g., orders over 10,000 dollars). These listed correlations and/or rules may then be used to modify the diagram/process, e.g., for optimization. In other words, the list of modifications may be a list of any type of information that may then be used to modify/optimize the diagram, e.g., using the methods described herein. For example, the correlations may be used to bypass a particular step by using a rule derived from the correlation.

Following the example above where analyzing the historical data includes building a decision tree. A decision tree may be used to examine data points (more specifically, input and output data points) and find correlations between the input values and the output values. The decision tree may then be used to predict future outputs based on their inputs (e.g., even if the particular combination of inputs have not been encountered or if the same set of inputs have led to different outputs). Thus, in some embodiments, generating the list of possible modifications (e.g., rules) may involve combining the parent nodes (representing questions) and the child nodes (representing answers) in the decision tree in order to make rules that may be used to modify the diagram. The correctness percentage of each child node may become the confidence associated with the generated rules, and thus the "visited percentage" (the percentage of the input data points that followed the particular path) may become the probability of the listed rules. In some embodiments, if the percentage is less than a threshold value (e.g., specified by the user), the rules with that percentage may be dropped (e.g., not displayed to the user). During 1408 (or possibly later in 1410) the rules may be converted to diagram logic, usable to modify the diagram to implement the suggested rules. Thus, the list of possible modifications may include rules that may be used to modify the diagram.

In 1410, user input selecting one or more modifications from the list of possible modifications may be received. In some embodiments, the user may simply click on the modifications that should be implemented in the diagram. For example, the user may "check" check boxes for rules that should be implemented and leave check boxes blank for those that the user does not want implemented in the diagram.

In one embodiment, the user may be able to preview modifications to the diagram, e.g., by clicking a "preview" button. In response to this user input (or other equivalent input), the diagram (or a portion thereof) may be displayed with the possible modification. In some embodiments, the possible modification may be visually indicated in the diagram via a variety of methods, e.g., using colors, animation, and/or other indications such as those described above among others. The user may use this preview button to decide which modifications of the list of possible modifications should be made.

In 1412, the diagram may be modified based on the selected rule(s). In some embodiments, the diagram may be modified automatically, e.g., without any further user input other than 1410. The automatic modification(s) may also be made with confirmation by the user; however, automatic modification(s) of the diagram may not require the user to manually add or change icons and/or lines in the diagram. For example, the method may allow the user to preview the modifications in the diagram (as described above) and then may automatically make the modifications in response to user input confirming or selecting the displayed modification.

Figure 14A:
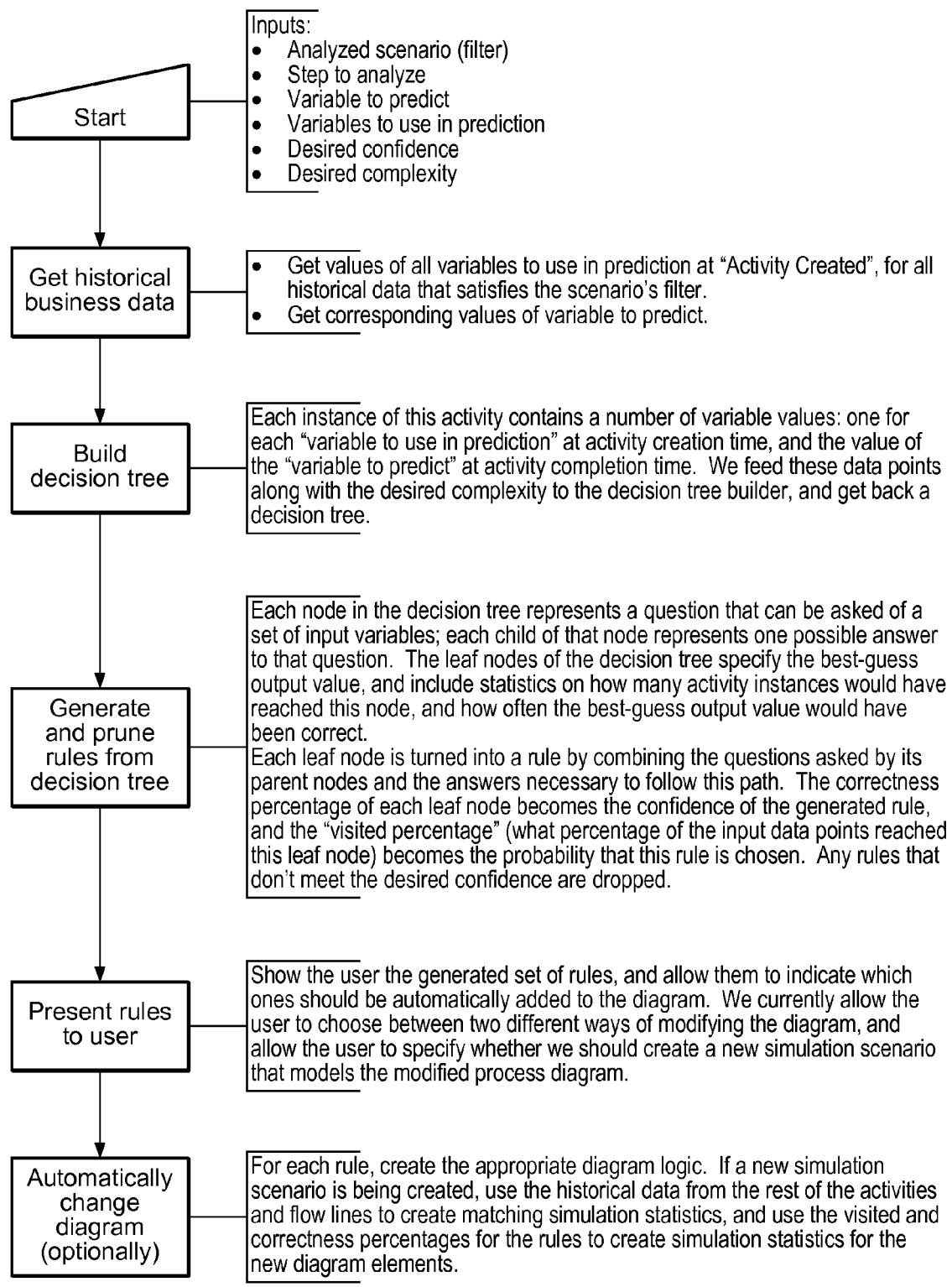

FIG. 14A—Exemplary Method for Guided Optimization of a Business Process

FIG. 14A is a flow chart of an exemplary method for guided optimization of a business process similar to FIG. 14 above. Note that FIG. 14A provides a specific embodiment of the method only; in other words, the guided optimization described herein is not limited to any of the specific methods or descriptions provided in FIG. 14A. Similar to above, the method shown in FIG. 14A may be used in conjunction with any of the computer systems or devices shown in the above Figures, among other devices. In various embodiments, some of the method elements shown may be performed concurrently, in a different order than shown, or may be omitted. Additional method elements may also be performed as desired.

FIGS. 15A-15G—Exemplary Screen Shots

FIGS. 15A-15G are exemplary screen shots of the method illustrated in FIG. 14. More specifically, FIGS. 15A-15G are two exemplary screen shots which show how a user may specify and view different time portions regarding historical information of a business process. It should be noted that these screen shots are exemplary only and other lay outs, options, and/or graphical indications (among others) are envisioned.

Figure 15A:
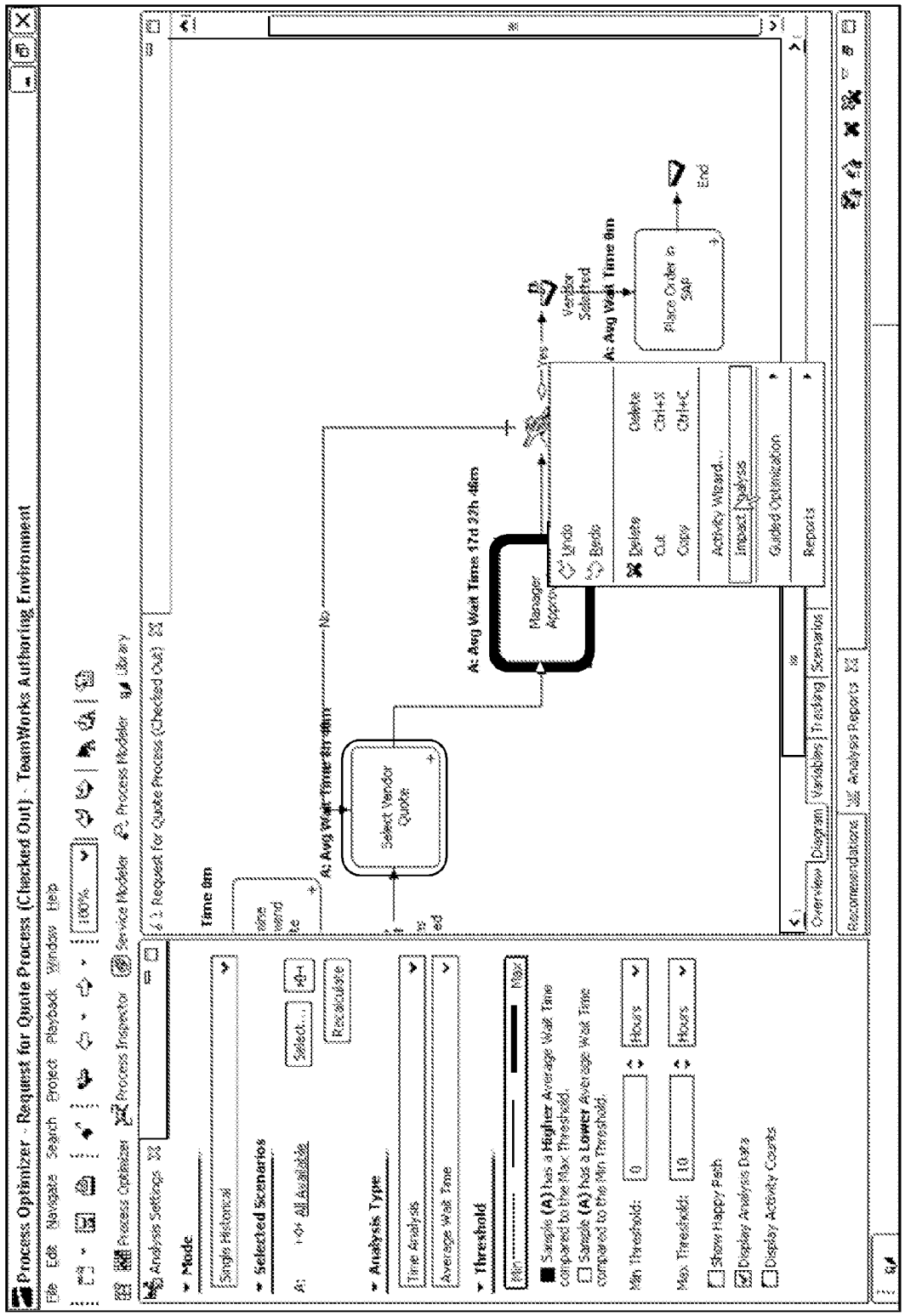
FIGS. 15A-15G are exemplary screen shots illustrating an embodiment of the method illustrated by FIG. 14.

As shown in FIG. 15A, the user may select an icon in the diagram (associated with the manager approval step of the process) and may select an impact analysis, e.g., by clicking the manager approval icon (in this specific case, by right-clicking the icon).

Figure 15B:
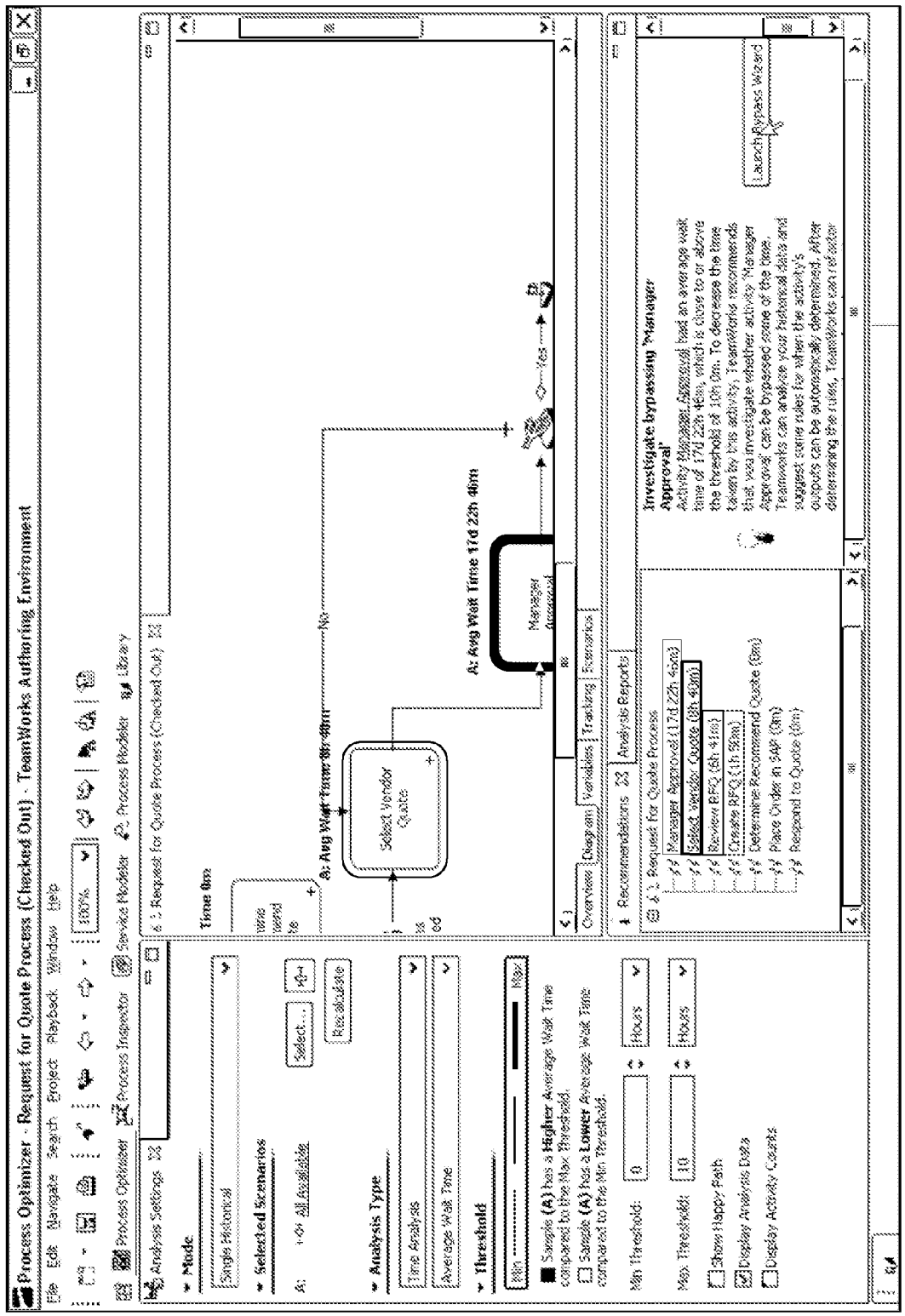

As shown in FIG. 15B, in response to the user selecting the impact analysis, a list of recommendations may appear in the lower right hand GUI of the screen. More specifically, the manager approval recommendation may be highlighted since the user selected that particular icon in the diagram. Accordingly, the user may invoke the optimization wizard by clicking the "launch bypass wizard" located in the bottom-right portion of the GUI.

Figure 15C:
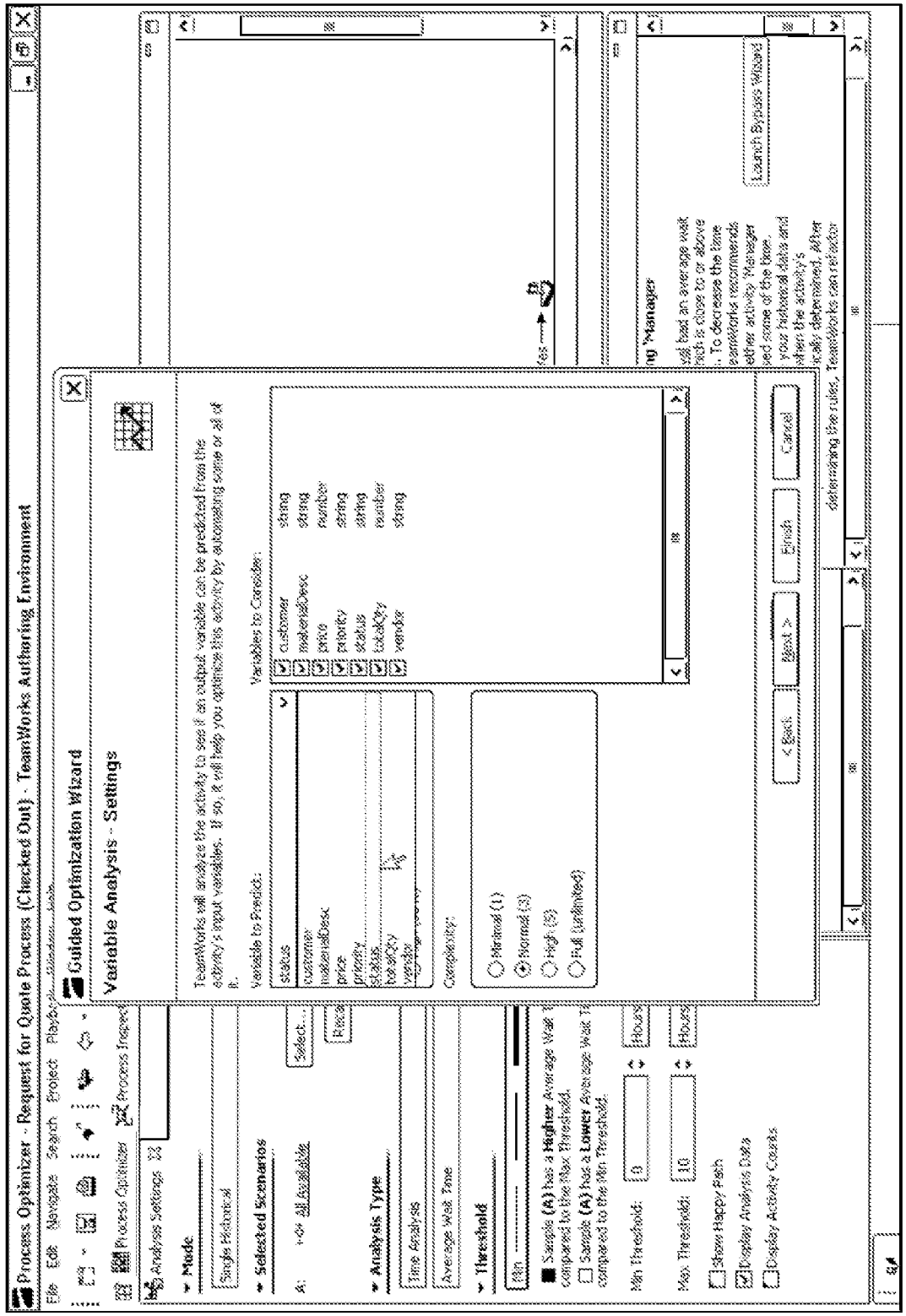

As shown, FIG. 15C, in response to the user selecting the "launch bypass wizard" button, the "Guided Optimization Wizard" may be launched. In the first GUI of this wizard the user may select which variable to predict (in this case "status").

Figure 15D:
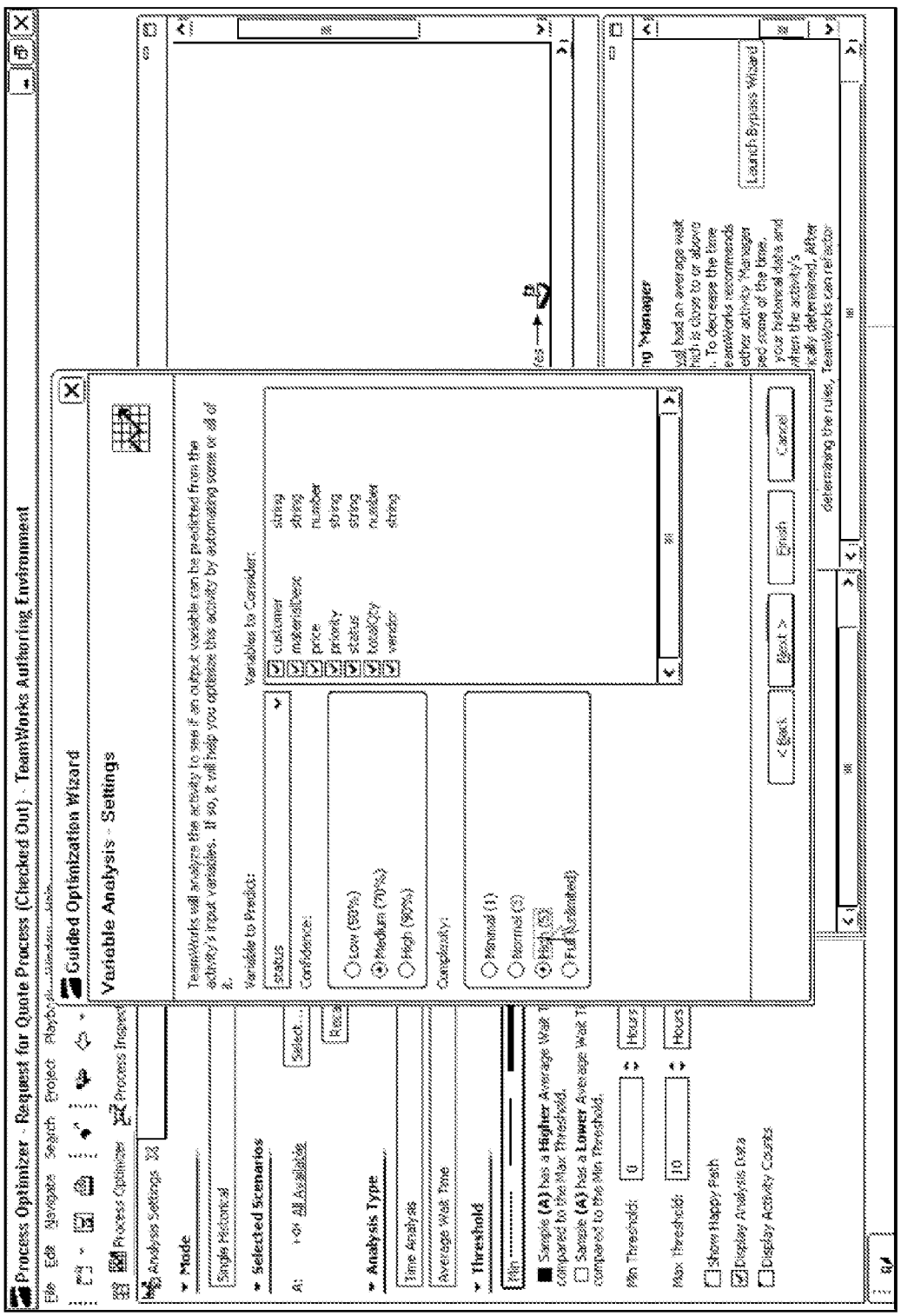

As shown in FIG. 15D, the user may choose the complexity of the list of rules/modifications to be displayed. In this case the user has selected high (5) complexity. The user may also choose which confidence and which variables to consider. In this screen shot, the user has selected medium confidence (meaning that the list of possible modifications may only include those with confidence greater than 70%) and has selected all of the variable for consideration.

Figure 15E:
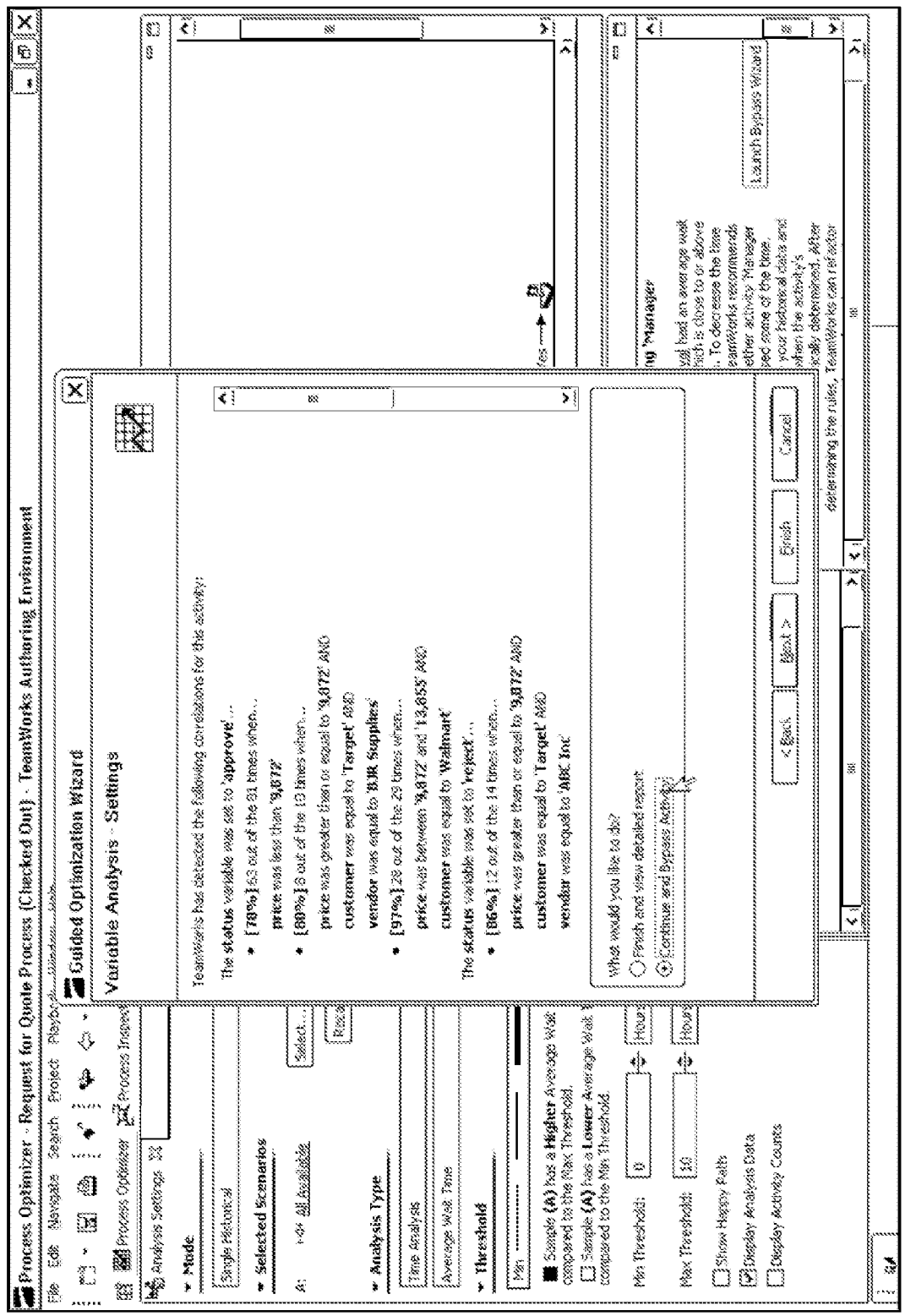

As shown in FIG. 15E, in response to the user clicking the "next" button in the previous Figure, a list of possible modifications may be displayed. In this particular GUI, the list of possible modifications are presented as a list of correlations. A first category (at the top) relates to when the status variable (selected in FIG. 15C) was set to "approve" and a second category relates to when the status variable was set to "reject". For example, the status variable was set to approve 78% of the time when the price variable was less than the value 9,872. This information may have been gathered/determined from historical data (e.g., similar to the methods described above).

As shown, the user can finish and view the detailed report (by selecting the appropriate radio button) or, as is shown, continue and bypass activity.

Figure 15F:
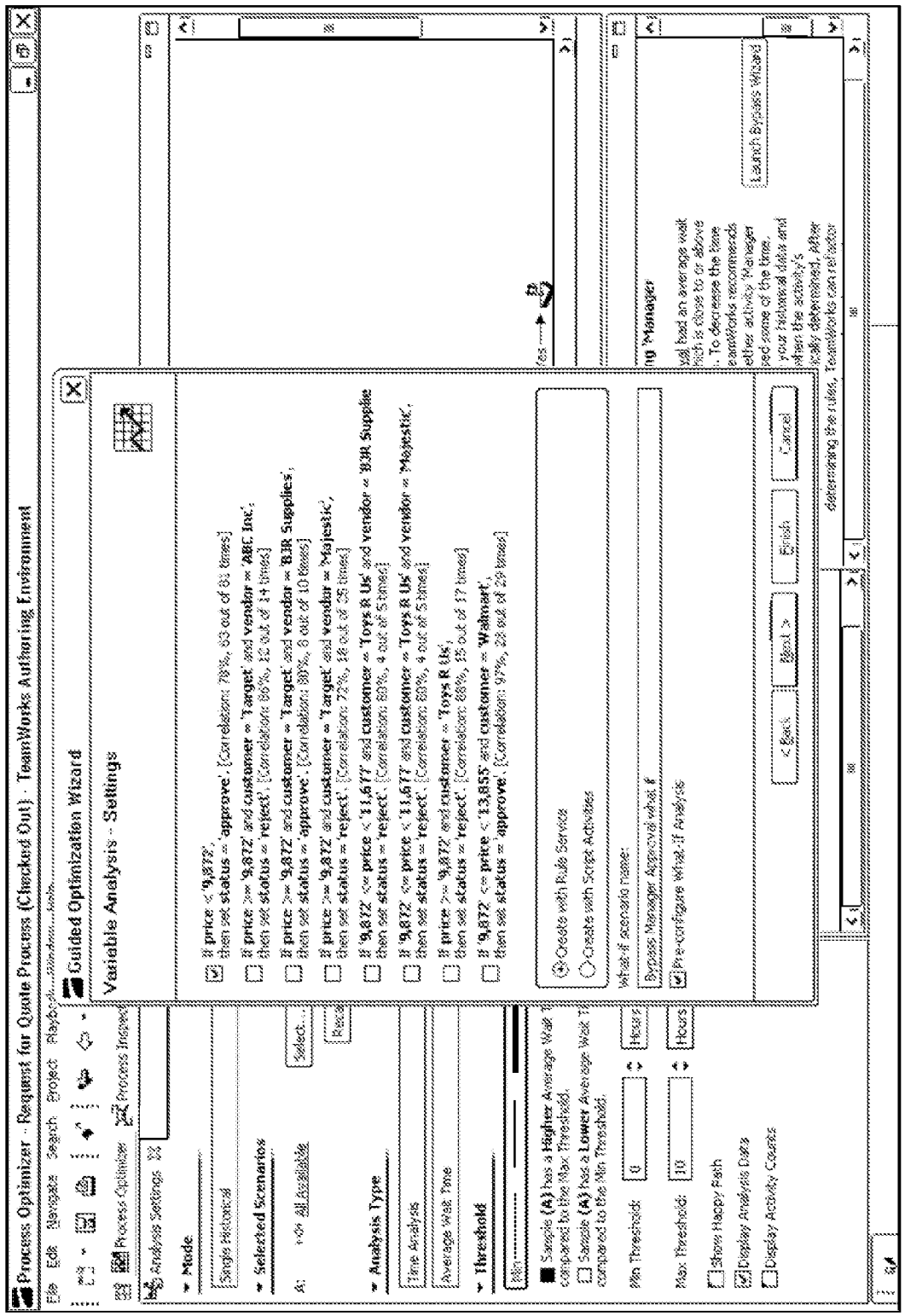

As shown in FIG. 15F, after use selects the "next" button in the previous Figure, the user may select the modifications that may be made to the diagram. In this case, the user may select a set of rules that may be used for bypassing the manager approval step. The user may create this modification with the "rules service" or the "script activities". Additionally, the user can create a new scenario name for the modified diagram that is about to be made. Finally, the user can allow the optimization wizard to pre-configure the what-if analysis by checking the check box in the bottom portion of the GUI.

Figure 15G:
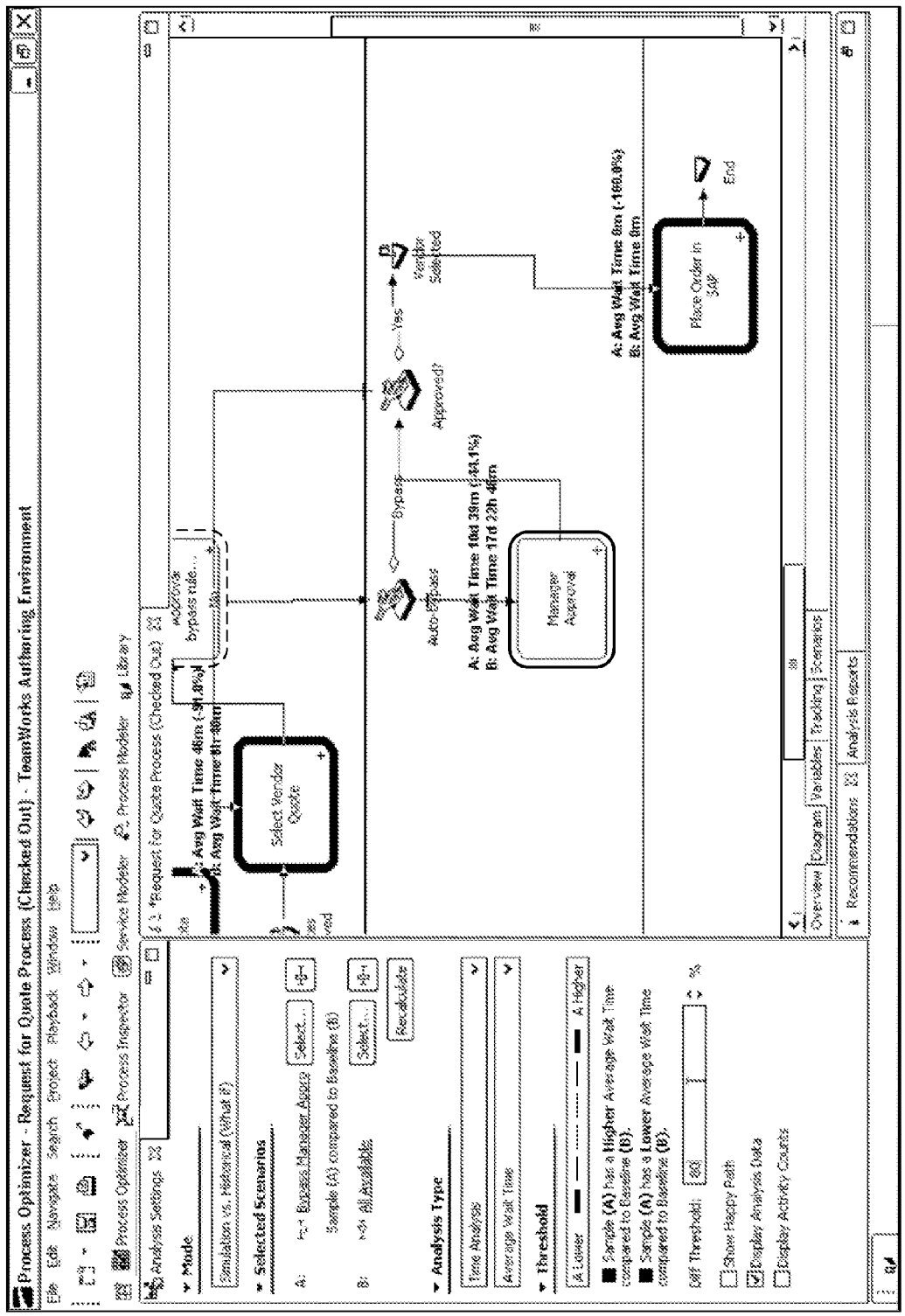

As shown in FIG. 15G, in response to finishing the guided optimization wizard described above, the diagram may be automatically modified to include an approval bypass rule for bypassing the manager approval step. As shown, the diagram may modify the graphical indications to indicate the change in average wait time (from 17 days to 10 days, a 44.1% improvement).

Thus, FIGS. 15A-15G illustrate one embodiment of the guided optimization wizard, automatic modification of the diagram, and comparison of the modified diagram to the previous diagram using a "what-if" scenario.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium comprising program instructions for automatically generating and displaying a list of possible modifications to a diagram of a business process, wherein the program instructions are executable by a computer to:
   store historical data regarding the business process;
   display a diagram of the business process on a display, wherein the diagram comprises a plurality of icons connected by lines, wherein each of the icons represents a respective step in the business process, wherein the lines indicate flow paths between the steps in the business process;
   analyze the historical data to determine first information regarding one or more steps and/or flow paths in the business process; and
   automatically generate and display a list of possible modifications to the diagram based on said analyzing the historical data, wherein
      said automatically generating and displaying the list of possible modifications comprises displaying respective confidence associated with each modification of the list of possible modifications, and
      said confidence associated with each modification comprises a percentage of accuracy for the modification with regard to the historical data.

2. The memory medium of claim 1, wherein the program instructions are further executable to:
   receive user input selecting one or more modifications from the list of possible modifications; and
   modify the diagram based on the selected one or more modifications.

3. The memory medium of claim 2, wherein the program instructions are further executable to automatically modify the diagram, wherein said automatically modifying the diagram comprises adding or modifying icons and/or lines in the diagram without receiving user input specifying said adding or modifying icons and/or lines in the diagram.

4. The memory medium of claim 1, wherein the program instructions are further executable to:
receive user input to select types of modifications;
wherein said automatically generating and displaying the list of possible modifications is performed based on the user input selecting the types of modifications.

5. The memory medium of claim 1, wherein the program instructions are further executable to:
display the diagram with one or more proposed modifications from the list of possible modifications.

6. The memory medium of claim 1, wherein the list of possible modifications are usable to optimize the business process.

7. The memory medium of claim 1,
wherein the list of possible modifications are usable to bypass one or more of the steps of the business process.

8. The memory medium of claim 1, wherein the program instructions are further executable to:
receive user input selecting one or more icons in the diagram, wherein the selected one or more icons are associated with one or more respective steps of the business process;
wherein the list of possible modifications are associated with the one or more respective steps of the business process.

9. A computer-implemented method for automatically generating and displaying a list of possible modifications to a diagram of a business process, comprising:
storing historical data regarding the business process;
displaying a diagram of the business process on a display, wherein the diagram comprises a plurality of icons connected by lines, wherein each of the icons represents a respective step in the business process, wherein the lines indicate flow paths between the steps in the business process;
analyzing the historical data to determine first information regarding one or more steps and/or flow paths in the business process; and
using a computer for automatically generating and displaying a list of possible modifications to the diagram based on said analyzing the historical data; wherein
said automatically generating and displaying the list of possible modifications comprises displaying respective confidence associated with each modification of the list of possible modifications, and
said confidence associated with each modification comprises a percentage of accuracy for the modification with regard to the historical data.

10. The method of claim 9, further comprising:
receiving user input selecting one or more modifications from the list of possible modifications; and
modifying the diagram based on the selected one or more modifications.

11. The method of claim 10, further comprising automatically modifying the diagram, wherein said automatically modifying the diagram comprises adding or modifying icons and/or lines in the diagram without receiving user input specifying said adding or modifying icons and/or lines in the diagram.

12. The method of claim 9, further comprising:
receiving user input to select types of modifications;
wherein said automatically generating and displaying the list of possible modifications is performed based on the user input selecting the types of modifications.

13. The method of claim 9, wherein the list of possible modifications are usable to optimize the business process.

14. A system for automatically generating and displaying a list of possible modifications to a diagram of a business process, comprising:
a processor;
a memory medium coupled to the processor;
a display coupled to the memory medium and the processor, wherein the display is operable to display a diagram of a business process, wherein the diagram comprises a plurality of icons connected by lines, wherein each of the icons represents a respective step in the business process, wherein the lines indicate flow paths between the steps in the business process;
wherein the memory medium stores historical data regarding the business process;
wherein the memory medium stores program instructions executable by the processor to:
analyze the historical data to determine first information regarding one or more steps and/or flow paths in the business process;
automatically generate and display a list of possible modifications to the diagram based on said analyzing the historical data wherein
said automatically generating and displaying the list of possible modifications comprises displaying respective confidence associated with each modification of the list of possible modifications, and
said confidence associated with each modification comprises a percentage of accuracy for the modification with regard to the historical data.

15. The system of claim 14, wherein the program instructions are further executable to:
receive user input selecting one or more modifications from the list of possible modifications; and
modify the diagram based on the selected one or more modifications.

16. The system of claim 15, wherein said modifying the diagram comprises automatically modifying the diagram, wherein said automatically modifying the diagram comprises adding or modifying icons and/or lines in the diagram without receiving user input specifying said adding or modifying icons and/or lines in the diagram.

17. The system of claim 14, wherein the program instructions are further executable to:
receive user input to select types of modifications;
wherein said automatically generating and displaying the list of possible modifications is performed based on the user input selecting the types of modifications.

* * * * *